United States Patent
Lee

(10) Patent No.: US 7,005,669 B1
(45) Date of Patent: Feb. 28, 2006

(54) QUANTUM DOTS, NANOCOMPOSITE MATERIALS WITH QUANTUM DOTS, DEVICES WITH QUANTUM DOTS, AND RELATED FABRICATION METHODS

(75) Inventor: Howard Wing Hoon Lee, Fremont, CA (US)

(73) Assignee: UltraDots, Inc., Fremont, CA (US)

( * ) Notice: Subject to any disclaimer, the term of this patent is extended or adjusted under 35 U.S.C. 154(b) by 228 days.

(21) Appl. No.: 10/212,002

(22) Filed: Aug. 2, 2002

Related U.S. Application Data

(60) Provisional application No. 60/309,898, filed on Aug. 2, 2001, provisional application No. 60/309,905, filed on Aug. 2, 2001, provisional application No. 60/309,979, filed on Aug. 2, 2001, provisional application No. 60/310,090, filed on Aug. 2, 2001, provisional application No. 60/310,095, filed on Aug. 2, 2001.

(51) Int. Cl.
*H01L 31/0352* (2006.01)

(52) U.S. Cl. .............................. 257/21; 257/14; 257/17; 359/248

(58) Field of Classification Search ................ 257/14, 257/17, 21; 359/248
See application file for complete search history.

(56) References Cited

U.S. PATENT DOCUMENTS

| | | |
|---|---|---|
| 3,995,311 A | 11/1976 | Taylor |
| 4,211,467 A | 7/1980 | Cross et al. |
| 4,332,974 A | 6/1982 | Fraas |
| 4,557,551 A | 12/1985 | Dyott |
| 4,688,882 A | 8/1987 | Failes |
| 4,693,547 A | 9/1987 | Soref et al. |
| 4,818,050 A | 4/1989 | Duthie |
| 4,856,859 A | 8/1989 | Imoto |
| 4,894,818 A | 1/1990 | Fujioka et al. |
| 4,906,064 A | 3/1990 | Cheung |
| 4,962,987 A | 10/1990 | Doran |
| 4,973,122 A | 11/1990 | Cotter et al. |
| 5,079,594 A | 1/1992 | Mitsuyu et al. |
| 5,136,669 A | 8/1992 | Gerdt |
| 5,147,841 A | 9/1992 | Wilcoxon |
| 5,191,630 A | 3/1993 | Tajima |
| 5,253,103 A | 10/1993 | Boyd et al. |
| 5,260,957 A | 11/1993 | Hakimi et al. |
| 5,262,357 A | 11/1993 | Alivisatos et al. |
| 5,291,034 A | 3/1994 | Allam et al. |

(Continued)

FOREIGN PATENT DOCUMENTS

EP     0 254 509 A1     1/1988

(Continued)

OTHER PUBLICATIONS

Littau et al, "A luminescent . . . Reaction", J.Phys.Chem. 1993, 97, 1224-1230.*

(Continued)

*Primary Examiner*—Jerome Jackson
(74) *Attorney, Agent, or Firm*—Cooley Godward LLP

(57) ABSTRACT

The invention provides "engineered" nonlinear nanocomposite materials with an extremely large $\chi^{(3)}$ and fast temporal response along with optical properties that can be precisely tuned to satisfy the requirements of a particular application (e.g., optical, thermal, mechanical, etc.). In particular, the magnitude of the linear and nonlinear index of refraction can be adjusted substantially independently of the absorption spectrum of the material. In addition, the optical characteristics can be engineered substantially independently from the mechanical and chemical characteristics, providing exceptional performance and flexibility in terms of device-incorporation and process-stability.

9 Claims, 45 Drawing Sheets

U.S. PATENT DOCUMENTS

| | | | |
|---|---|---|---|
| 5,307,428 A | 4/1994 | Blow et al. | |
| 5,406,407 A | 4/1995 | Wolff | |
| 5,432,873 A | 7/1995 | Hosoya et al. | |
| 5,449,561 A | 9/1995 | Golding et al. | |
| 5,449,582 A | 9/1995 | Hsieh et al. | |
| 5,459,801 A | 10/1995 | Snitzer | |
| 5,460,701 A | 10/1995 | Parker et al. | |
| 5,477,377 A | 12/1995 | Golding et al. | |
| 5,491,114 A | 2/1996 | Goldstein | |
| 5,493,433 A | 2/1996 | Prucnal et al. | |
| 5,496,503 A | 3/1996 | Kurihara et al. | |
| 5,500,054 A | 3/1996 | Goldstein | |
| 5,505,928 A | 4/1996 | Alivisatos et al. | |
| 5,527,386 A | 6/1996 | Statz | |
| 5,535,001 A | 7/1996 | Tajima | |
| 5,537,000 A | 7/1996 | Alivisatos et al. | |
| 5,546,480 A | 8/1996 | Leonard | |
| 5,559,057 A | 9/1996 | Goldstein | |
| 5,559,825 A | 9/1996 | Scalora et al. | |
| 5,576,248 A | 11/1996 | Goldstein | |
| 5,580,655 A | 12/1996 | El-Shall et al. | |
| 5,592,319 A | 1/1997 | Lee et al. | |
| 5,594,818 A | 1/1997 | Murphy | |
| 5,636,309 A | 6/1997 | Henry et al. | |
| 5,642,453 A | 6/1997 | Margulis et al. | |
| 5,646,759 A | 7/1997 | Lichtman et al. | |
| 5,647,040 A | 7/1997 | Modavis et al. | |
| 5,670,279 A | 9/1997 | Goldstein | |
| 5,686,351 A | 11/1997 | Golding et al. | |
| 5,690,807 A | 11/1997 | Clark, Jr. et al. | |
| 5,695,617 A | 12/1997 | Graiver et al. | |
| 5,710,845 A | 1/1998 | Tajima | |
| 5,711,803 A | 1/1998 | Pehnt et al. | |
| 5,728,195 A | 3/1998 | Eastman et al. | |
| 5,737,102 A | 4/1998 | Asher | |
| 5,740,287 A | 4/1998 | Scalora et al. | |
| 5,811,030 A | 9/1998 | Aoki | |
| 5,825,519 A | 10/1998 | Prucnal | |
| 5,834,378 A | 11/1998 | Kurtz et al. | |
| 5,840,111 A | 11/1998 | Wiederhoft et al. | |
| 5,840,562 A | 11/1998 | Diep et al. | |
| 5,850,064 A | 12/1998 | Goldstein | |
| 5,854,868 A | 12/1998 | Yoshimura et al. | |
| 5,881,200 A | 3/1999 | Burt | |
| 5,888,885 A | 3/1999 | Xie | |
| 5,897,331 A | 4/1999 | Sopori | |
| 5,932,309 A | 8/1999 | Smith et al. | |
| 5,959,753 A | 9/1999 | Duling, III et al. | |
| 5,963,360 A | 10/1999 | Sato et al. | |
| 5,963,571 A | 10/1999 | Wingreen | |
| 5,990,479 A | 11/1999 | Weiss et al. | |
| 6,005,707 A | 12/1999 | Berggren et al. | |
| 6,026,205 A | 2/2000 | McCallion et al. | |
| 6,049,090 A | 4/2000 | Clark, Jr. | |
| 6,058,127 A | 5/2000 | Joannopoulos et al. | |
| 6,060,026 A | 5/2000 | Goldstein | |
| 6,064,506 A | 5/2000 | Koops | |
| 6,074,742 A | 6/2000 | Smith et al. | |
| 6,075,203 A | 6/2000 | Wang et al. | |
| 6,075,915 A | 6/2000 | Koops et al. | |
| 6,084,176 A | 7/2000 | Shiratsuchi et al. | |
| 6,086,794 A | 7/2000 | Nobutoki et al. | |
| 6,094,273 A | 7/2000 | Asher et al. | |
| 6,101,300 A | 8/2000 | Fan et al. | |
| 6,139,626 A | 10/2000 | Norris et al. | |
| 6,144,779 A | 11/2000 | Binkley et al. | |
| 6,147,080 A | 11/2000 | Bemis et al. | |
| 6,174,424 B1 | 1/2001 | Wach et al. | |
| 6,179,912 B1 | 1/2001 | Barbera-Guillem et al. | |
| 6,207,229 B1 | 3/2001 | Bawendi et al. | |
| 6,207,392 B1 | 3/2001 | Weiss et al. | |
| 6,225,198 B1 | 5/2001 | Alivisatos et al. | |
| 6,225,647 B1 | 5/2001 | Kurtz et al. | |
| 6,229,633 B1 | 5/2001 | Roberts et al. | |
| 6,239,355 B1 | 5/2001 | Salafsky | |
| 6,268,014 B1 | 7/2001 | Spacher et al. | |
| 6,268,041 B1 | 7/2001 | Goldstein | |
| 6,277,740 B1 | 8/2001 | Goldstein | |
| 6,306,736 B1 | 10/2001 | Alivisatos et al. | |
| 6,313,015 B1 | 11/2001 | Lee et al. | |
| 6,316,715 B1 | 11/2001 | King et al. | |
| 6,319,426 B1 | 11/2001 | Bawendi et al. | |
| 6,322,901 B1 | 11/2001 | Bawendi et al. | |
| 6,344,082 B1 | 2/2002 | Furuya et al. | |
| 6,344,272 B1 | 2/2002 | Oldenburg et al. | |
| 6,361,660 B1 | 3/2002 | Goldstein | |
| 6,366,392 B1 | 4/2002 | Tokushima | |
| 6,369,405 B1 | 4/2002 | Canham et al. | |
| 6,404,940 B1 | 6/2002 | Tsuyama et al. | |
| 6,407,439 B1 | 6/2002 | Hier et al. | |
| 6,416,818 B1 | 7/2002 | Aikens et al. | |
| 6,440,213 B1 | 8/2002 | Alivisatos et al. | |
| 6,444,897 B1 | 9/2002 | Luque-Lopez et al. | |
| 6,452,092 B1 | 9/2002 | Han et al. | |
| 6,456,423 B1 | 9/2002 | Nayfeh et al. | |
| 6,468,808 B1 | 10/2002 | Nie et al. | |
| 6,476,312 B1 | 11/2002 | Barnham | |
| 6,501,014 B1 | 12/2002 | Kubota et al. | |
| 6,501,091 B1 | 12/2002 | Bawendi et al. | |
| 6,503,831 B1 | 1/2003 | Speakman | |
| 6,514,446 B1 | 2/2003 | Smith et al. | |
| 6,515,314 B1 | 2/2003 | Duggal et al. | |
| 6,558,995 B1 | 5/2003 | Gilliland et al. | |
| 6,597,496 B1 * | 7/2003 | Nayfeh et al. | 359/343 |
| 2001/0005495 A1 | 6/2001 | O'Brien et al. | |
| 2001/0028055 A1 | 10/2001 | Fafard et al. | |
| 2001/0033371 A1 | 10/2001 | Lawandy | |
| 2001/0040232 A1 | 11/2001 | Bawendi et al. | |
| 2001/0055764 A1 | 12/2001 | Empedocles et al. | |
| 2002/0006723 A1 | 1/2002 | Goldstein | |
| 2002/0031783 A1 | 3/2002 | Empedocles et al. | |
| 2002/0045045 A1 | 4/2002 | Adams et al. | |
| 2002/0070121 A1 | 6/2002 | Nayfeh et al. | |
| 2002/0071952 A1 | 6/2002 | Bawendi et al. | |
| 2002/0074543 A1 | 6/2002 | Petroff et al. | |
| 2002/0098680 A1 | 7/2002 | Goldstein | |
| 2002/0110180 A1 | 8/2002 | Barney et al. | |
| 2002/0127224 A1 | 9/2002 | Chen | |
| 2002/0144644 A1 | 10/2002 | Zehnder et al. | |
| 2002/0167254 A1 | 11/2002 | Craig et al. | |
| 2003/0003300 A1 | 1/2003 | Korgel et al. | |
| 2003/0008145 A1 | 1/2003 | Goldstein | |
| 2003/0017264 A1 | 1/2003 | Treadway et al. | |
| 2003/0034486 A1 | 2/2003 | Korgel | |
| 2003/0042850 A1 | 3/2003 | Bertram et al. | |
| 2003/0047816 A1 | 3/2003 | Dutta | |

FOREIGN PATENT DOCUMENTS

| | | |
|---|---|---|
| EP | 0 545 595 B1 | 10/1997 |
| EP | 0859386 A1 | 8/1998 |
| EP | 0 886 167 A1 | 12/1998 |
| EP | 0 918 245 A1 | 5/1999 |
| EP | 0774443 B1 | 5/1999 |
| EP | 1 011 008 A1 | 6/2000 |
| EP | 1160888 A1 | 12/2001 |
| EP | 1244168 A1 | 9/2002 |
| GB | 2 341 722 A | 3/2000 |
| JP | 11-264958 A | 9/1999 |
| JP | 2000-29081 A | 1/2000 |
| JP | 2000-321607 A | 11/2000 |
| WO | WO 97/06469 A1 | 2/1997 |
| WO | WO 98/34251 A1 | 8/1998 |
| WO | WO 98/36434 A1 | 8/1998 |

| | | | |
|---|---|---|---|
| WO | WO 98/46799 A1 | 10/1998 | |
| WO | WO 00/07250 A1 | 2/2000 | |
| WO | WO 00/10197 A1 | 2/2000 | |
| WO | WO 00/22682 A2 | 4/2000 | |

OTHER PUBLICATIONS

Bley et al., "Characterization of silicon nanoparticles prepared from porous silicon," *Chem. Mater.* 8:1881-1888, 1996.
Bley et al., "A low-temperature solution phase route for the synthesis of silicon nanoclusters," *J. Am. Chem. Soc.* 118: 12461-12462, 1996.
Chiu et al., "Gas phase synthesis and processing of silicon nanocrystallites: characterization by photoluminescence emission spectroscopy," *Journal of Electronic Materials* 29(3):347-354, 1994.
Cullis, "The structural and luminescence properties of porous silicon," *J. Appl. Phys.* 82(3):909-965, 1997.
Dhas et al., "Preparation of luminescent silicon nanoparticles: a novel sonochemical approach," *Chem. Mater.* 10:3278-3281, 1998.
Heath, "A liquid-solution-phase synthesis of crystalline silicon," *Science* 258:1131-1133, 1992.
Heath et al., "A liquid solution synthesis of single crystal germanium quantum wires," *Chemical Physics Letters* 208: 263-268, 1993.
Heath, "Germanium quantum dots: optical properties and synthesis," *J. Chem. Phys.* 101(2):1607-1615, 1994.
Holmes et al., "Highly luminescent silicon nanocrystals with discrete optical transitions," *J. Am. Chem.,Soc.* 123 3743-3748, 2001.
Kagan et al., "Long-range resonance transfer of electronic excitations in close-packed CdSe quantum-dot solids," *Phys. Rev. B* 54:8633-8643, 1996.
Kanemitsu, "Silicon and germanium nanoparticles," *Semiconductors and Semimetals* 49:157-204, 1998.
Kornowski et al., "Nanometer-sized colloidal germanium particles: wet-chemical synthesis, laser-induced crystallization and particle growth," *Advanced Materials* 5(9):634-636, 1993.
Littau et al., "A luminescent silicon nanocrystal colloid via a high-temperature aerosol reaction," *J. Phys. Chem.* 97: 1224-1230, 1993.
Murray, "Synthesis and characterization of II-VI quantum dots and their assembly into 3-D quantum dot superlattices," Massachusetts Institute of Technology; *thesis*, Cambridge, Massachusetts, 1995.
Murray et al., "Self-organization of CdSe nanocrystallites into three-dimensional quantum dot superlattices," *Science* 270:1335-1338, 1995.
Parker, "Mighty small dots," *S&TR Jul./Aug. 2000*:20-21.
Phely-Bobin, et al, "Characterization of Mechanically Attrited $Si/SiO_x$ Nanoparticles and Their Self-Assembled Composite Films," *Chem. Mater.* 14:1030-1036, 2002.
Prakash et al., "Nonlinear optical properties of silicon nanocrystals grown by plasma-enhanced chemical vapor deposition," *Journal of Applied Physics* 91(7):4607-4610, 2002.
Taylor et al., "Solution synthesis and characterization of quantum confined Ge nanoparticles," *Chem. Mater.* 11: 2493-2500, 1999.
Vuayalakshmi, "Nonlinear optical properties of silicon nanoclusters," *Appl. Phys. Lett.* 7096:708-710, 1997.
Watanabe et al., "Soluble three-dimensional polysilane with organosilicon nanocluster structure," *Jpn. J. Appl. Phys.* 36:L1265-L1267, 1997.

Wilcoxon et al., "Optical and electronic properties of Si nanoclusters synthesized in inverse micelles," *Physical Review B* 60(4):2704-2714, 1999.
Yang et al., "Synthesis of alkyl-terminated silicon nanoclusters by a solution route," *J. Am. Chem. Soc.* 121: 5191-5195, 1999.
Belomoin, et al., "Observation of a magic discrete family of ultrabright Si nanoparticles," *Applied Physics Letters* 80(5): 841-843, 2002.
Berg, et al., "Quantum dot amplifiers with high output power and low noise," *Applied Physics Letters* 82(10):3083-3085, 2003.
Ding, et al., "Electrochemistry and Electrogenerated Chemiluminescence from Silicon Nanocrystal Quantum Dots," *Science* 296:1293-1297, 2002.
Garcia, et al., "Size dependence of lifetime and absorption cross section of Si nanocrystals embedded in $SiO_2$," *Applied Physics Letters* 82(10):1595-1597, 2003.
MA, et al., "Small-Diameter Silicon Nanowire Surfaces," *Science* 299:1874-1877, 2003.
Pizzagalli, et al., "On the structure and stability of germanium nanoparticles," arXiv:cond-mat/0008145 v11-6, 2000.
Schmidt, et al., "Photoluminescence study of the initial stages of island formation for Ge pyramids/domes and hut clusters on Si(001)," *Applied Physics Letters* 72(13):1905-1907, 1999.
Tang, et al., "Spontaneous Organization of Single CdTe Nanoparticles into Luminescent Nanowires," *Science* 297: 237-240, 2002.
Brus, "Quantum crystallites and nonlinear optics," *Appl. Phys. A* 53:465-474, 1991.
Brzozowski et al., "Azobenzenes for photonic network applications: third-order nonlinear optical properties," *Journal of Materials Science: Materials in Electronics* 12: 483-489, 2001.
Coffer et al., "Porous silica glasses doped with quantum-confined cadmium selenide," *Journal of Non-Crystalline Solids* 142:208-214, 1992.
Cotter et al., "Nonlinear optics for high-speed digital information processing," *Science* 286:1523-1528, 1999.
Counio et al., "CdS: Mn nanocrystals in transparent xerogel matrices: synthesis and luminescence properties," *J. Phys. Chem.* 100:20021-20026, 1996.
Dabbousi et al., "(CdSe)ZnS Core-shell quantum dots: synthesis and characterization of a size series of highly luminescent nanocrystallites," *J. Phys. Chem. B* 101:9463-9475, 1997.
Doran et al., "Nonlinear-optical loop mirror," *Optics Letters* 13(1):56-58, 1988.
Friberg et al., "Ultrafast all-optical switching in a dual-core fiber nonlinear coupler," *Appl. Phys. Lett.* 51(15):1135-1137, 1987.
Gacoin et al., "Transparent sol-gel matrices doped with quantum sized PbS particles," *Mat. Res. Soc. Symp. Proc.* 358:247-252, 1995.
Gacoin et al., "New systems related to CdS nanoparticles in sol-gel matrices," *Mat. Res. Soc. Symp. Proc.* 435:643-648, 1996.
Garmire in Handbook of Optics (ed. Bass, M.) 4.1-4.80 (McGraw-Hill, New York), 2001.
Guglielmi, "Sol-gel nonlinear materials based on the incorporation of nanosize crystals and fullerence derivatives," Critical Reviews CR68:25-53, 1997.

Hulin et al., "Ultrafast all-optical gate with subpicosecond on and off response time," *Appl. Phys. Lett.* 49(13):749-751, 1986.

Hutchings et al., "Kramers-Krönig relations in nonlinear optics," *Optical and Quantum Electronics* 24:1-30, 1991.

Jensen, "The nonlinear coherent coupler," *IEEE Journal of Quantum Electronics* QE-18:1580-1583, 1982.

Kang et al., "1 x 2 all-optical switch using photochromic-doped waveguides," *Electron. Lett.* 36(19):1641-1643, 2000.

Lasers and Electro-Optics, CLEO 2001, pp. 147, 149, 151, 153, 155,163, 173, 175, 177, 180, 182, 184, 186, 188.

Lawrence et al., "Large purely refractive nonlinear index of single crystal P-toluene sulphonate (PTS) at 1600nm," *Electron. Lett.* 30:447-448, 1994.

Liu et al., "Fused InP-GaAs vertical coupler filters," *IEEE Photonics Technology Letters* 11:93-95, 1999.

Maier, "Self-switching of light in a directional coupler," *Sov. J. Quantum Electron* 14(1):101-104, 1984.

Murray et al., "Synthesis and characterization of nearly monodisperse CdE (E= sulfur, selenium, tellurium) semiconductor nanocrystallites," *J. Am. Chem. Soc.* 115:8706-8715, 1993.

Patela, "Nonlinear devices of integrated optics—technology and applications," Photonics in Information Processing, Stare Jablonski, 2000.

Peng et al., "Epitaxial growth of highly luminescent CdSe/CdS core/shell nanocrystals with photostability and electronic accessibility," *J. Am. Chem. Soc.* 119:7019-7029, 1997.

Peyghambarian, "Materials for fast switching and logic devices," *Proc. SPIE-Int. Soc. Opt. Eng.* 769(Workshop Photonic Logic Inf. Process): 28-40, 1986.

Peyghambarian et al., "Femtosecond optical nonlinearities of CdSe quantum dots," *IEEE Journal of Quantum Electronics* 25:2516-2522, 1989.

Ramaswami et al., Optical Networks: a practical perspective (Morgan kaufmann Publishers, San Francisco), pp. 199-216, 2002.

Ricolleau et al., "Correlation between structural and optical properties of PbS nanocrystals," *Journal of Crystal Growth* 166:769-733, 1996.

Samir et al., "Signal switching by a control beam in a nonlinear coupler," *J. Opt. Soc. Am. B* 11(11):2193-2205, 1994.

Sasaki et al., "Layer-by-Layer assembly of titania nanosheet/polycation composite films," *Chem. Mater.* 13: 4661-4667, 2001.

Schwerzel, "Nanocomposite photonic polymers. I. third-order nonlinear optical properties of capped cadmium sulfide nanocrystals in an ordered polydiacetylene host," *J. Phys. Chem. A* 102:5622-5626, 1998.

Sheik-Bahae et al., "Dispersion of bound electronic nonlinear refraction in solids," *IEEE Journal of Quantum Electronics* 27:1296-1309, 1991.

Spanhel et al., "Semiconductor clusters in the sol-gel process: synthesis and properties of CdS nanocomposites," *Journal of Non-Crystalline Solids* 147&148:657-662, 1992.

Stegeman in Handbook of Optics (ed. Bass, M.) 21.1-21.8 (McGraw-Hill, New York), 2001.

Takahashi et al., "Ultrafast high-contrast all-optical switching using spin polarization in low-temperature-grown multiple quantum wells," *Appl. Phys. Lett.* 77(19):2958-2960, 2000.

Tykwinski et al., "Structure-property relationships in third-order nonlinear optical chromophores," *J. Phys. Chem. B* 102:4451-4465, 1998.

Williams et al., "Picosecond all-optical logic gate in a nonlinear organic etalon," *Appl. Phys. Lett.* 57(23):2399-2401, 1990.

Wong et al., "Synthesis and third-order nonlinear optical properties of end-functionalized oligo-phenylenevinylenes," *Chem. Mater.* 14:2999-3004, 2002.

Zhang et al., "A novel low-threshold all optical switch," *SPIE* 3556:189-196, 1998.

Agarwal et al., "Tailoring the photonic band gap of a porous silicon dielectric mirror," *Appl. Phys. Lett.* 82(10):1512-1514, 2003.

Ago, et al., "Composites of Carbon Nanotubes and Conjugated Polymers for Photovoltaic Devices," *Advanced Materials* 11(15):1281-1285, 1999.

Anderson, "On quantum well solar cell efficiencies," *Physica E* 14:126-131, 2002.

Aroutiounian, et al., "Quantum dot solar cells," *Journal Of Applied Physics* 89(4):2268-2271, 2001.

The University of New South Wales, "The Generation Photovoltaics 2002 Annual Report," *Special Research Centre for Third Generation Photovoltaics*, 1-35, 2002.

Akazawa, "Self-limiting size control of hemispherical grains of microcrystalline Si self-assembled on an amorphous Si film surface," *Applied Physics Letters* 82(9):1464-1466, 2003.

Barnham, et al., "Quantum-dot concentrator and thermodynamic model for the global redshift," *Applied Physics Letters* 76(9):1197-1199, 2000.

Barnham, et al., "Quantum well solar cells," *Physica E* 14:27-36, 2002.

Brunhes, et al., "Electroluminescence of Ge/Si self-assembled quantum dots grown by chemical vapor deposition," *Applied Physics Letters* 77(12):1822-1824, 2000.

Capellini, et al., "Ordering self-assembled islands without substrate patterning," *Applied Physics Letters* 82(11):1772-1774, 2003.

Das, et al., "High-Efficiency solar cells based on semiconductor Nanostructures," *Solar Energy Materials & Solar Cells* 63:117-123, 2000.

Dashiell, et al., "Photoluminescence investigation of phononless radiative recombination and thermal-stability of germanium hut clusters on silicon(001)," *Applied Physics Letters* 79(14):2261-2263, 2001.

Diehl, et al., "Electroluminescence from strain-compensated $Si_{0.2}Ge_{0.8}$/Si quantum-cascade structures based on a bound-to-continuum transition," *Applied Physics Letters* 81(25): 4700-4702, 2002.

Elkurdi, et al., "Near-infrared waveguide photodetector with Ge/Si self-assembled quantum dots," *Applied Physics Letters* 80(3):509-511, 2002.

Floyd, et al., "Nanometer-scale composition measurements of Ge/Si(100) islands," *Applied Physics Letters* 82(9):1473-1475, 2003.

Gebeyehu, et al., "The interplay of efficiency and morphology in photovoltaic devices based on interpenetrating networks of conjugated polymers with fullerenes," *Synthetic Metals* 118:1-9, 2001.

Goetzberger, et al., "Solar cells: past, present, future," *Solar Energy Materials & Solar Cells* 74:1-11, 2002.

Green, "Third Generation Photovoltaics: Ultra-high Conversion Efficiency at Low Cost," *Prog. Photovolt: Res. Appl.* 9:123-135, 2001.

Green, "Third generation photovoltaics: solar cells for 2020 and beyond," *Physica E* 14:65-70, 2002.

Honsberg, et al., "Design trade-offs and rules for multiple energy level solar cells," *Physica E* 14:136-141, 2002.

Huynh, et al., "CdSe Nanocrystal Rods/Poly(3-hexylthiophene) Composite Photovoltaic Devices," *Adv. Mater.* 11(11):923-927, 1999.

Huynh, et al., "Hybrid Nanorod-Polymer Solar Cells," *Science* 295:2425-2427, 2002.

Könenkamp, et al., "Nano-structures for solar cells with extremely thin absorbers," *Physica E* 14:219-223, 2002.

Konle, et al., "Self-assembled Ge-islands for photovoltaic applications," *Physica E* 16:596-601, 2003.

Kuznicki, "Enhanced absorption and quantum efficiency in locally modified single-crystal Si," *Applied Physics Letters* 81(25):4853-5855, 2002.

Kymakis, et al., "Single-wall carbon nanotube/conjugated polymer photovoltaic devices," *Applied Physics Letters* 80(1):112-114, 2002.

Lander, et al., "SiGe Heterojunction pMOSFETs," *Philips*, date not listed.

Lundszien, et al., "Band-gap profiling in amorphous silicon-germanium solar cells," *Applied Physics Letters* 80(9):1655-1657, 2002.

Meissner, et al., "Photovoltaics of interconnected networks," *Synthetic Metals* 121:1551-1552, 2001.

Melosh, et al., "Ultrahigh-Density Nanowire Lattices and Circuits," *Science* 300:112-115, 2003.

Morf, "Unexplored opportunities for nanostructures in photovoltaics," *Physica E* 14:78-83, 2002.

Nozik, "Quantum dot solar cells," *Physica E* 14:115-120, 2002.

Plass et al., "Quantum Dot Sensitization of Organic-Inorganic Hybrid Solar Cells" *J. Phys. Chem. B*, 106, 7578-7580, 2002.

Qi, et al., "Spectroscopy of individual silicon nanowires," *Applied Physics Letters* 82(16):2616-2618, 2003.

Queisser, "Photovoltaic conversion at reduced dimensions," *Physica E* 14:1-10, 2002.

Raffaelle, et al., "Nanomaterials for Space Solar Power for Space Solar Power," *Space Solar Power Concept & Technology Maturation (SCTM) Program Technical Interchange Meeting*, 2002.

Raffaelle, et al., "Quantum Dot Solar Cells," *Prog. Photovolt: Res. Appl.* 10:433-439, 2002.

Ragan, et al., "Nonlithographic epitaxial $Sn_xGe_{1-x}$ dense nanowire arrays grown on Ge(001)," *Applied Physics Letters* 82(20):3439-3441, 2003.

Rebohle, et al., "Energy level engineering in InAs quantum dot nanostructures," *Applied Physics Letters* 81(11):2079-2081, 2002.

Roth, et al., "Self-assembled gradient nanoparticle-polymer multilayers investigated by an advanced characterization method: microbeam grazing incidence x-ray scattering," *Applied Physics Letters* 82(11):1935-1937, 2003.

Sutter, et al., "Continuous formation and faceting of SiGe islands on Si(100)," *Applied Physics Letters* 82(20):3454-3456, 2003.

Tada Tetsuya, "Fabrication of Si Nanopillars and its Application", AIST Today 3:2:10, 2003.

Tennakone, et al., "A dye-sensitized nano-porous solid-state photovoltaic cell," *Semicond. Sd. Technol.* 10:1689-1693, 1995.

Tessler, et al., "Efficient Near-Infrared Polymer Nanocrystal Light-Emitting Diodes," *Science* 295:1506-1508, 2002.

Trindade, et al., "Nanocrystalline Semiconductors: Synthesis, Properties, and Perspectives," *Chem. Mater.* 13: 3843-3858, 2001.

Trupke, et al., "Very efficient light emission from bulk crystalline silicon," *Applied Physics Letters* 82(18) 1996-1998, 2003.

Underwood, et al., "Charge carrier dynamics in CdSe nanocrystals: implications for the use of quantum dots in novel photovoltaics," *Eur. Phys. J. D* 16:241-244, 2001.

Vescan, et al., "Self-assembling of Ge on finite Si(100) areas comparable with the island size," *Applied Physics Letters* 82(20):3517-3519, 2003.

* cited by examiner

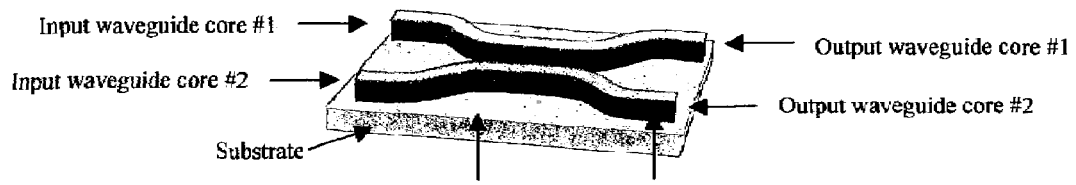
FIG. 6A  Optical coupler with air on 3 sides
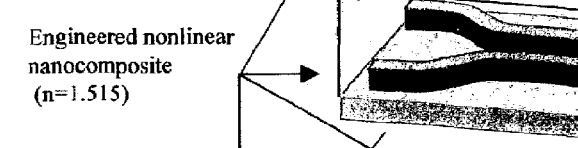
FIG. 6B
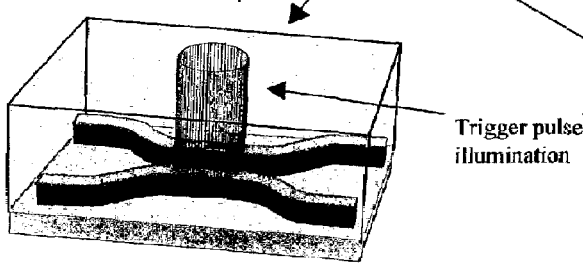
FIG. 6C
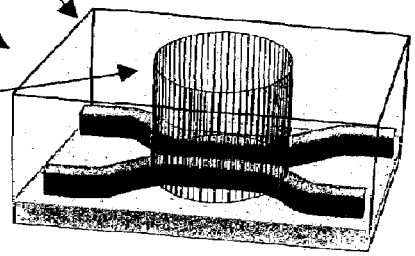
FIG. 6D          FIG. 6E
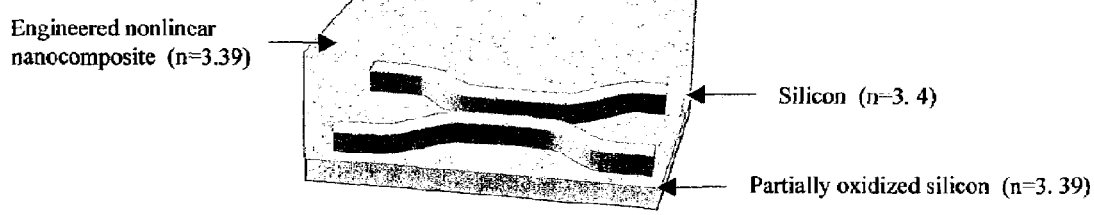
FIG. 6F MZI with cladding on 3 sides Coat surface with engineered nanocomposite Remove excess Illuminate active region

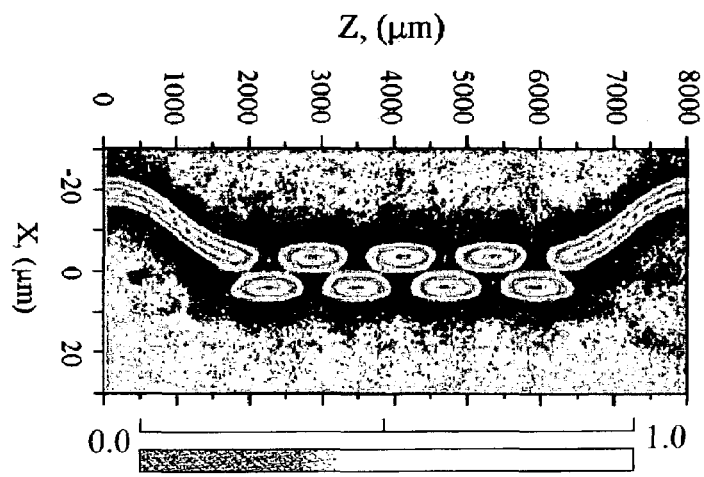
*FIG. 10A.1*
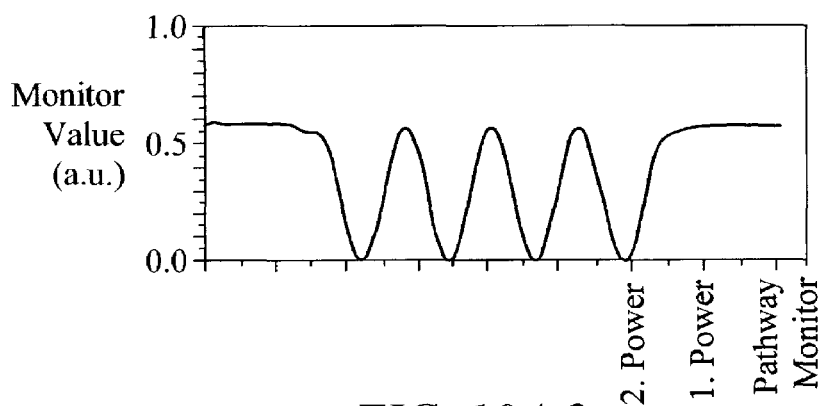
*FIG. 10A.2*
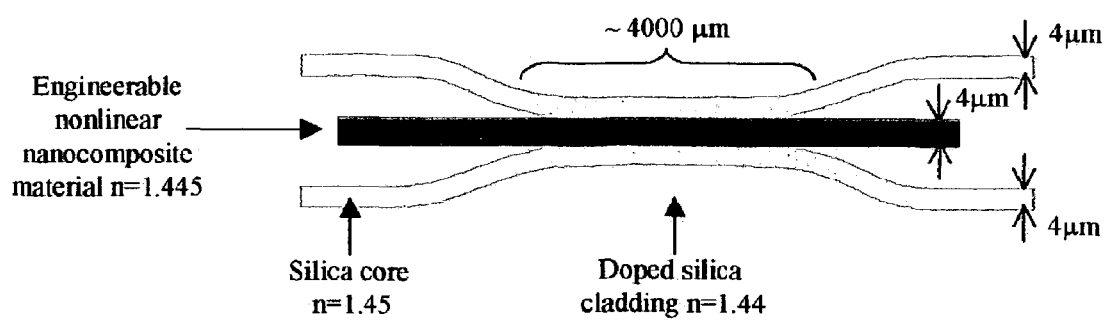
*FIG. 10A.3*

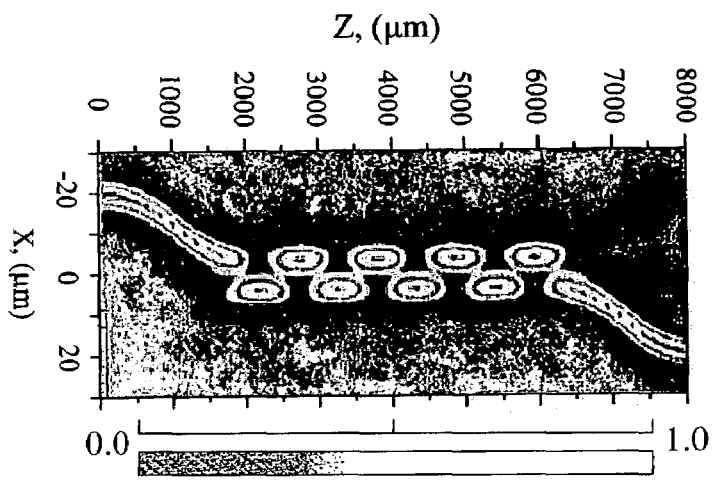
*FIG. 10B.1*
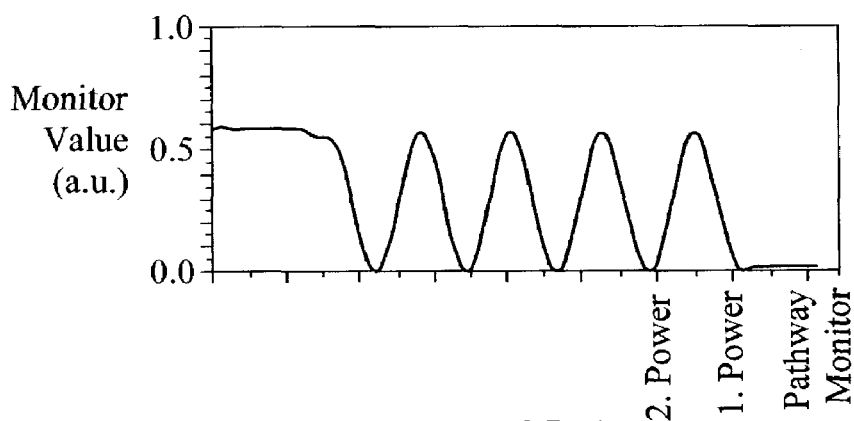
*FIG. 10B.2*
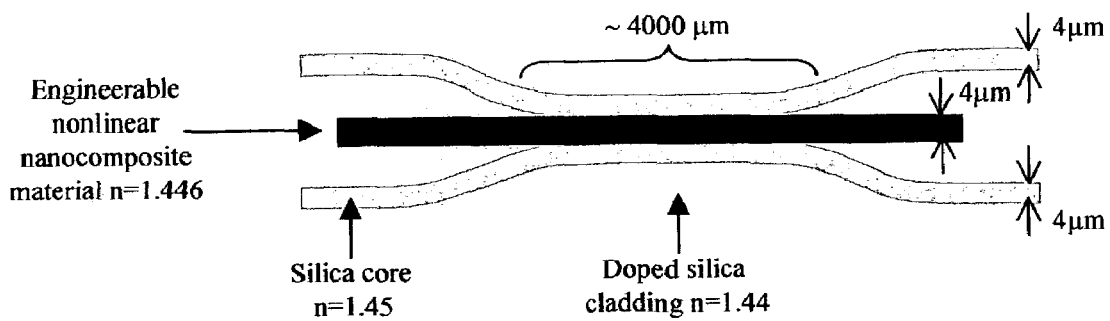
*FIG. 10B.3*

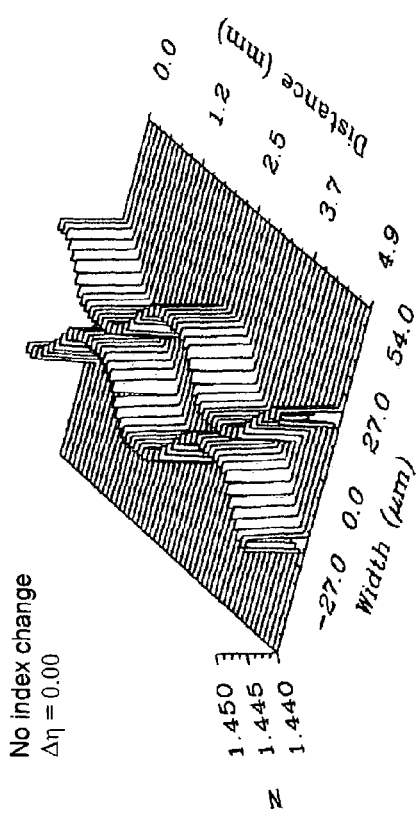
FIG. 12A.2
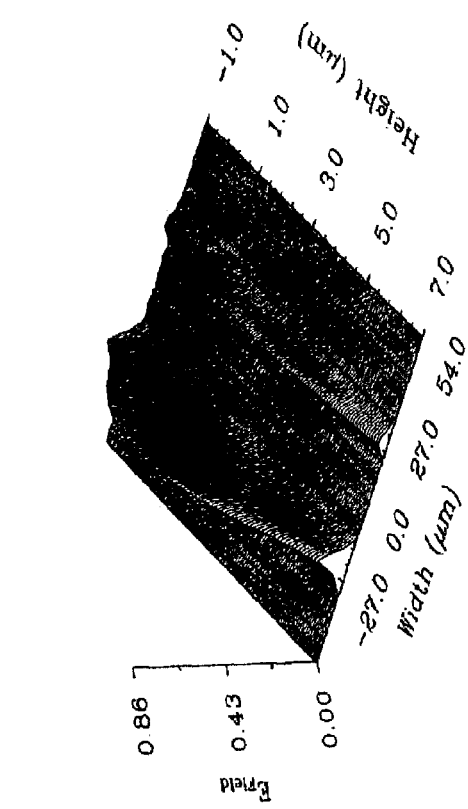
FIG. 12A.1

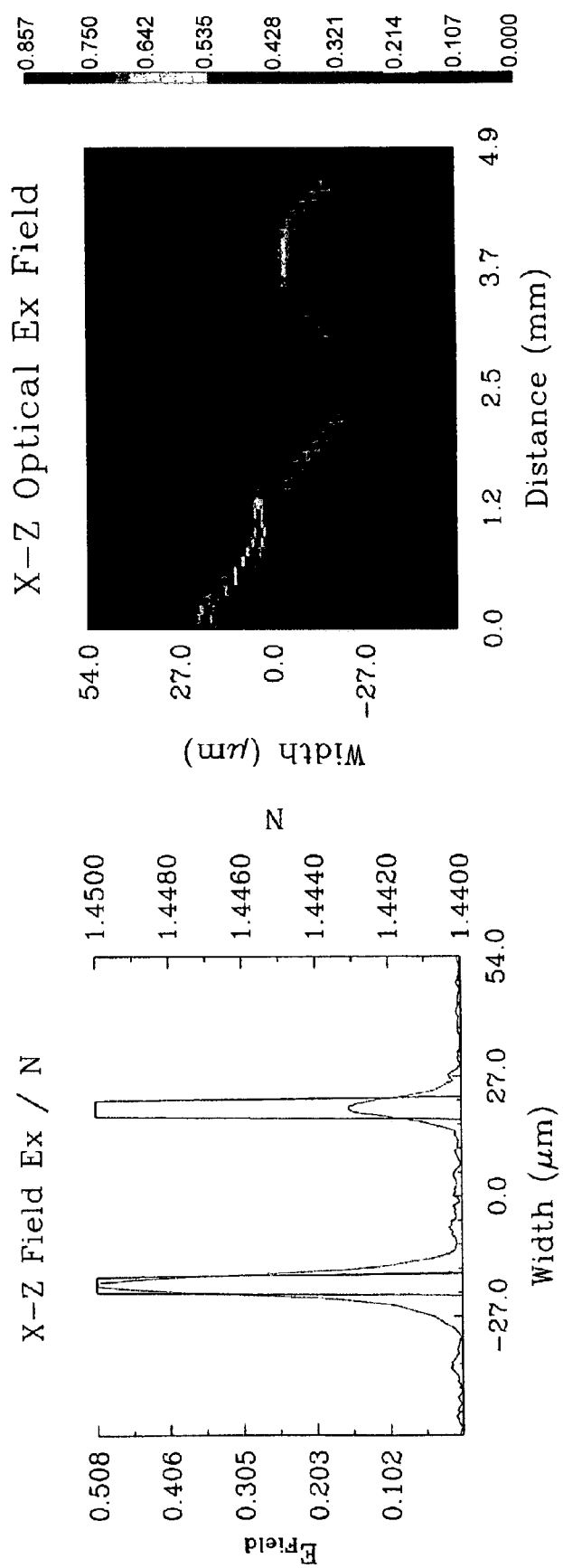
FIG. 12A.4
FIG. 12A.3

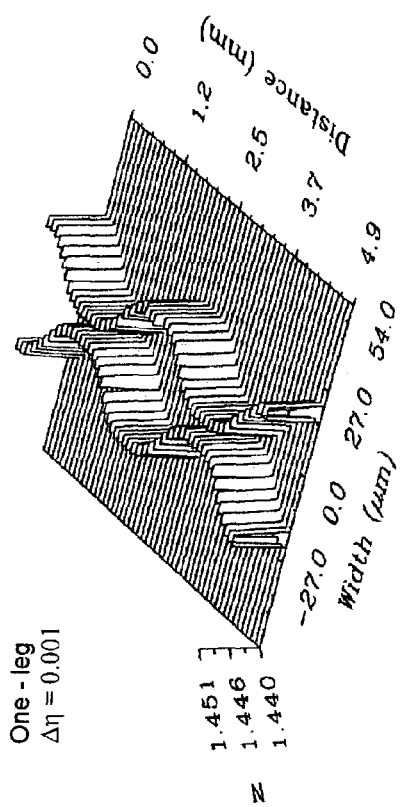
FIG. 12B.2
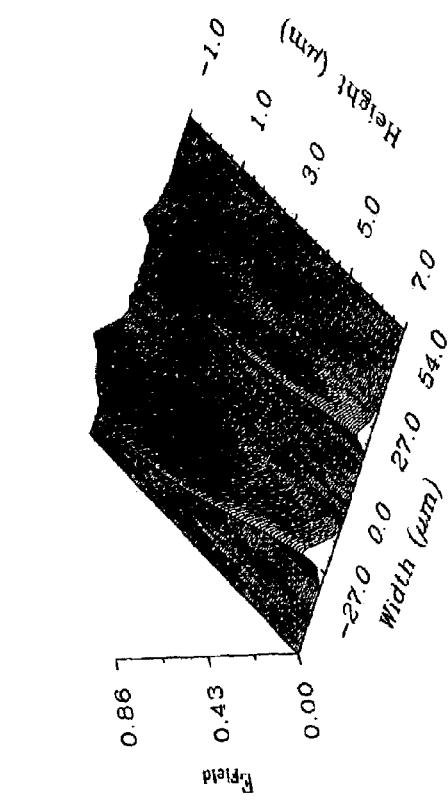
FIG. 12B.1

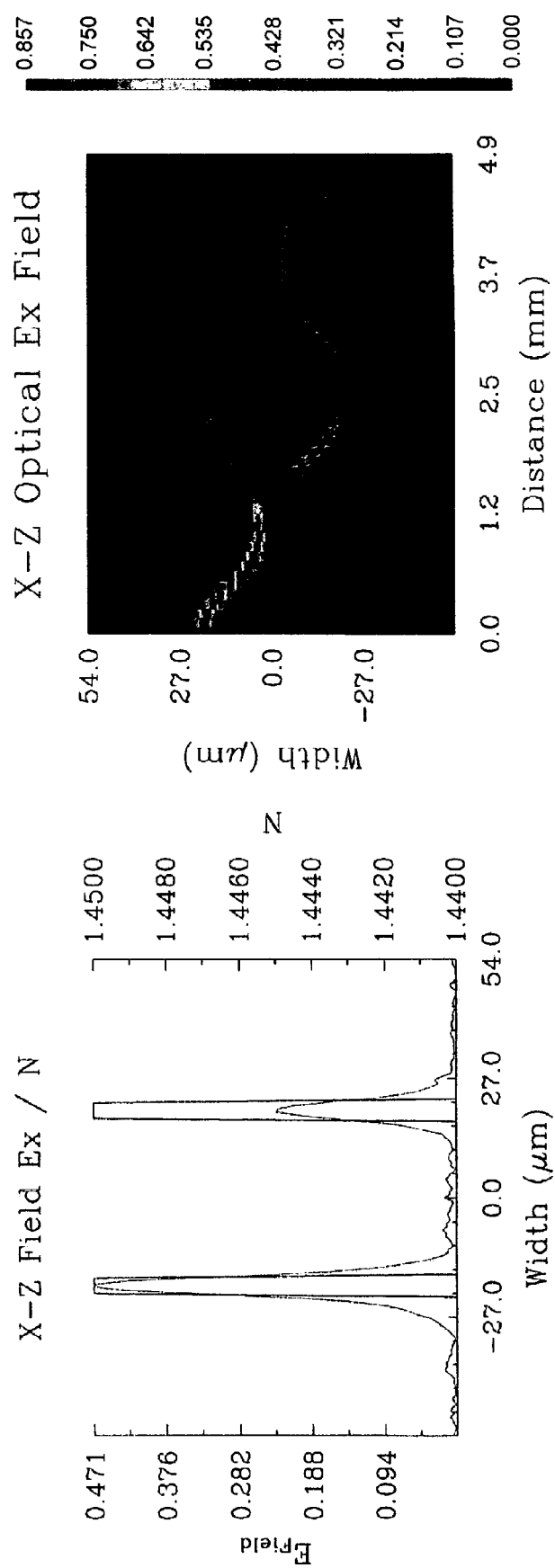
FIG. 12B.4
FIG. 12B.3

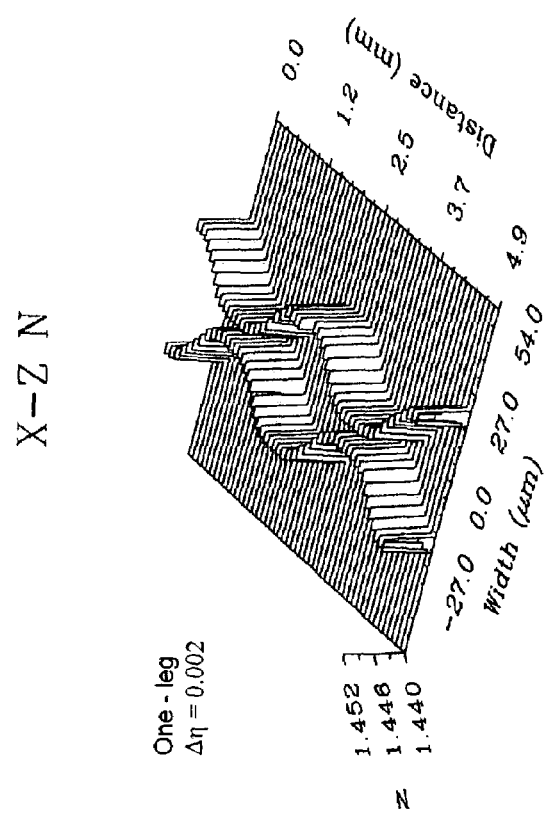
*FIG. 12C.2*
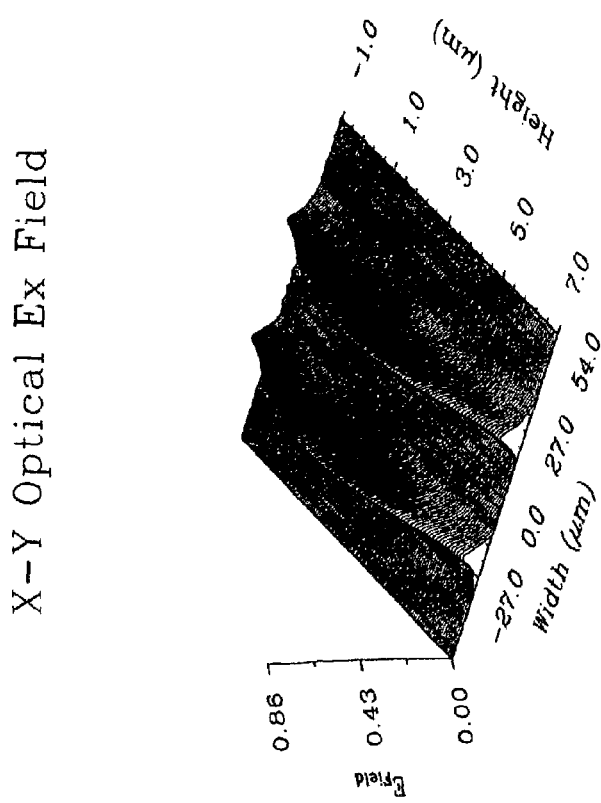
*FIG. 12C.1*

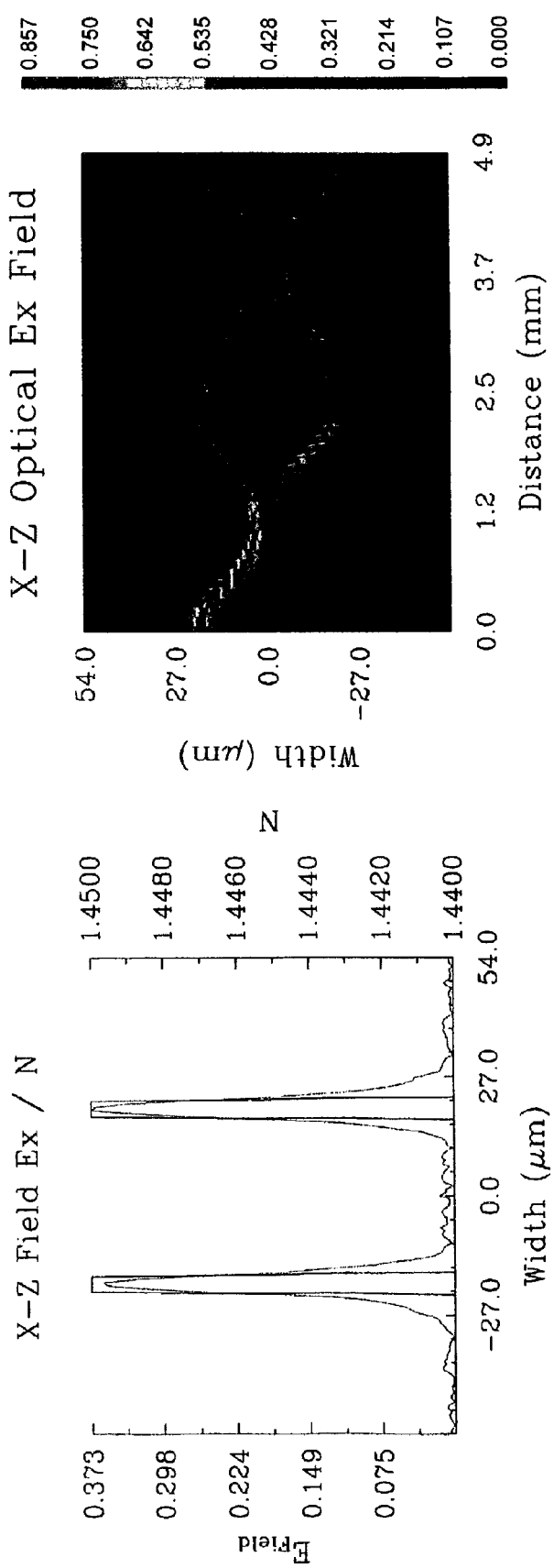
FIG. 12C.4
FIG. 12C.3

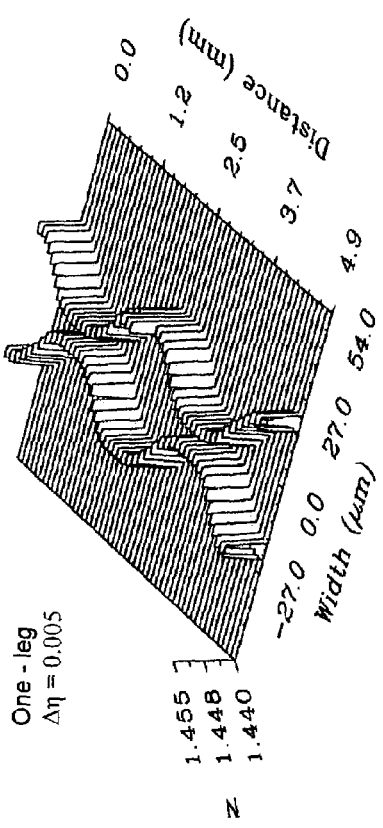
FIG. 12D.2
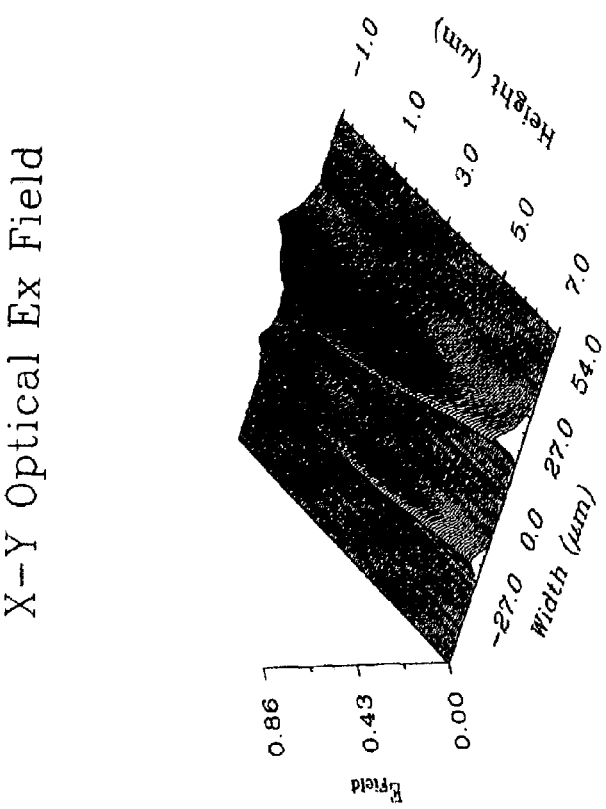
FIG. 12D.1

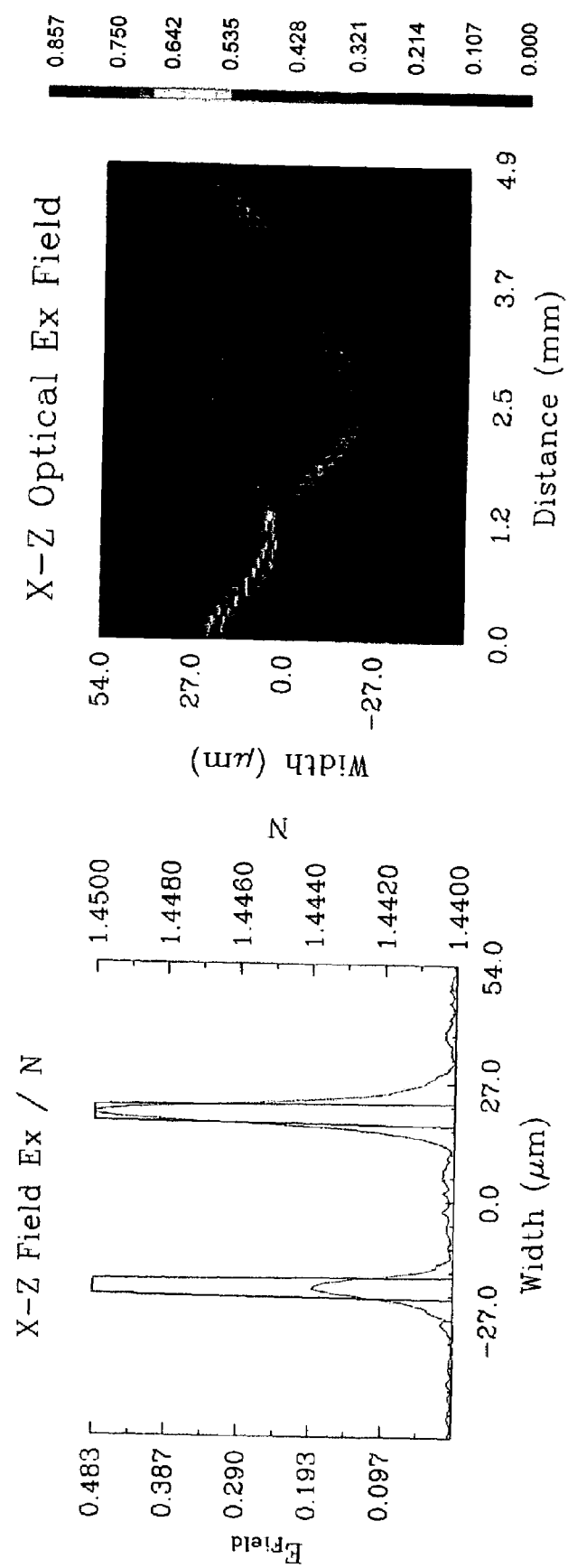
FIG. 12D.4
FIG. 12D.3

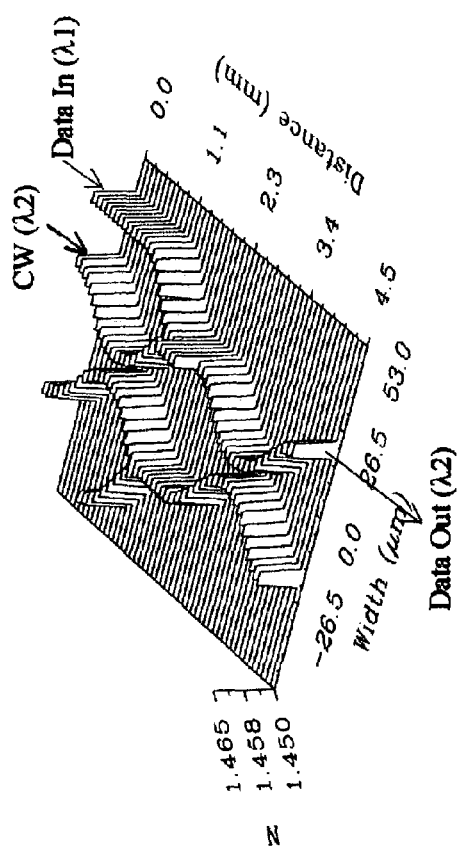
FIG. 13F.2
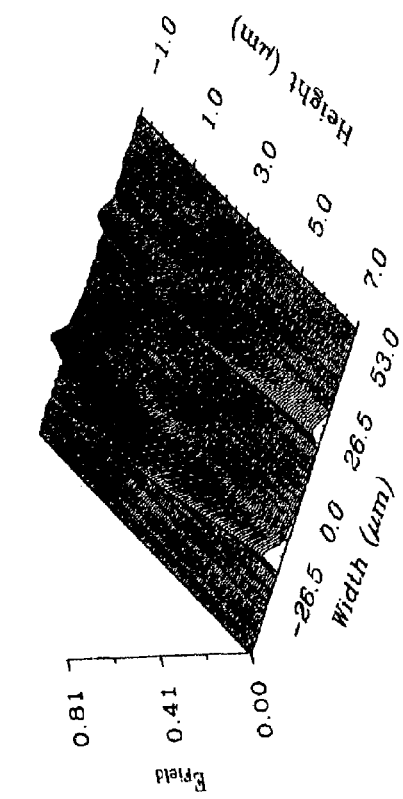
FIG. 13F.1

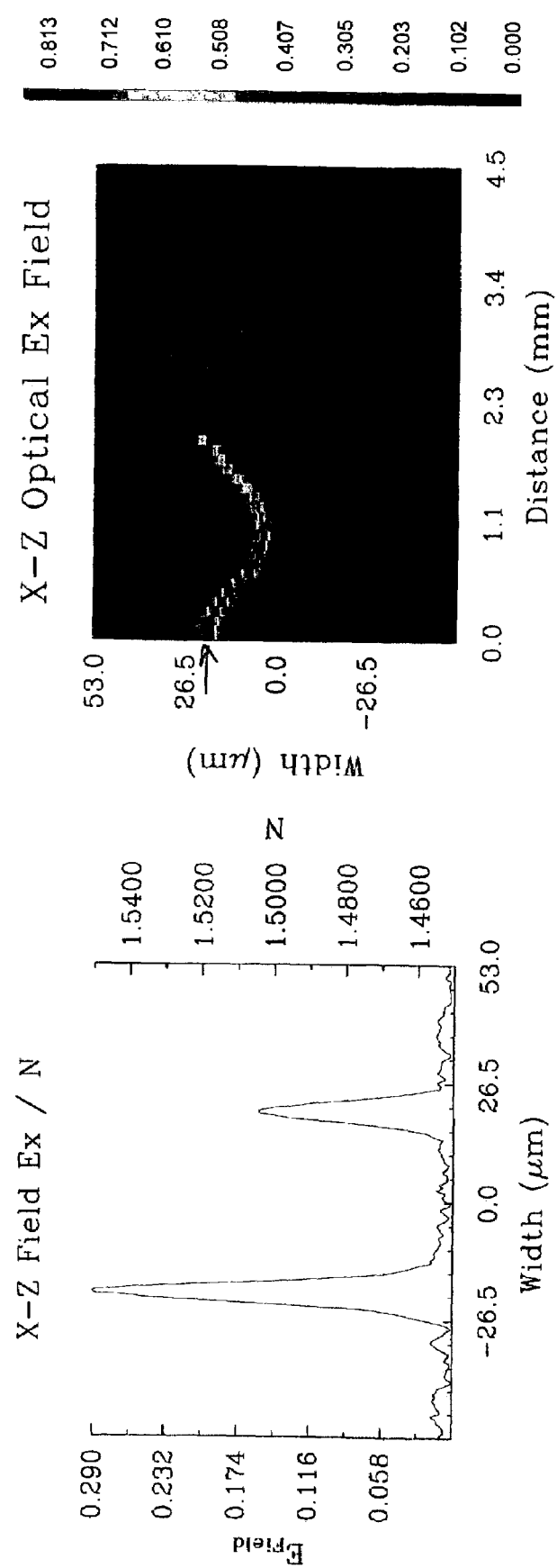
FIG. 13F.4
FIG. 13F.3

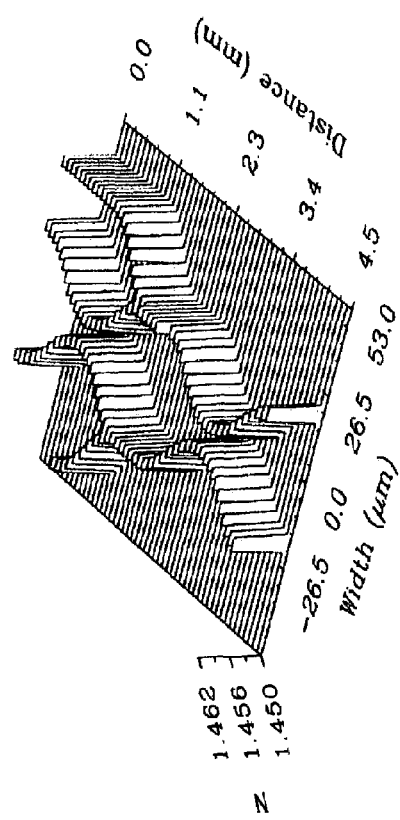
FIG. 13G.2
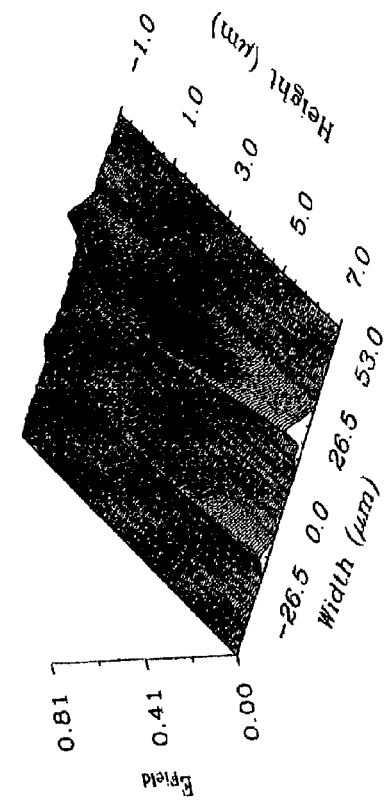
FIG. 13G.1

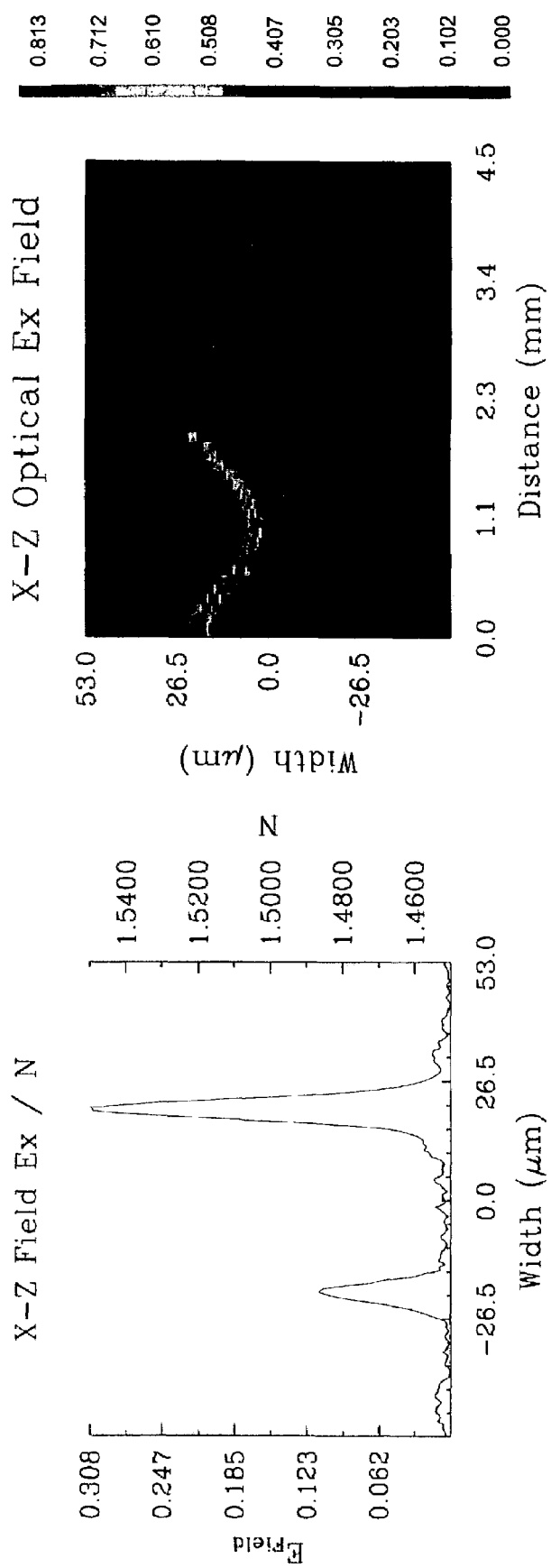
FIG. 13G.4
FIG. 13G.3

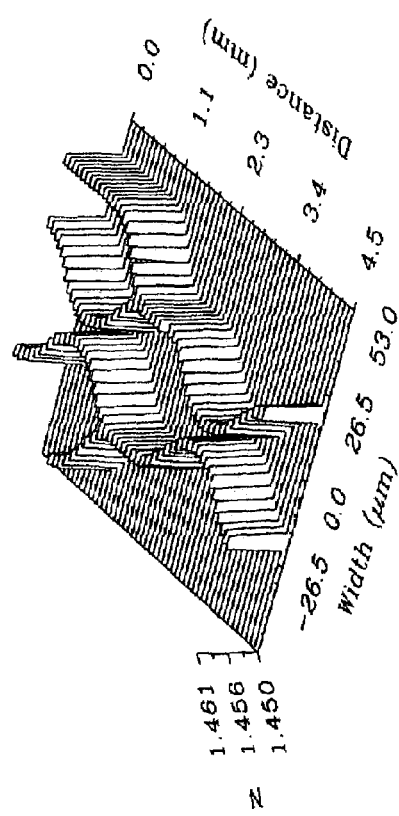
FIG. 13H.2
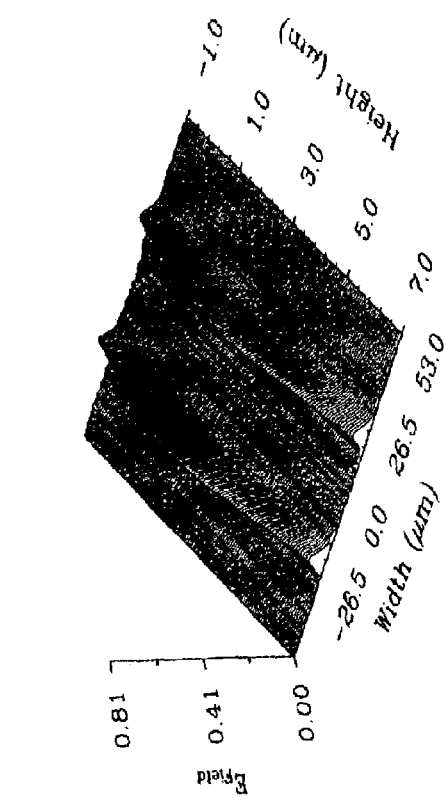
FIG. 13H.1

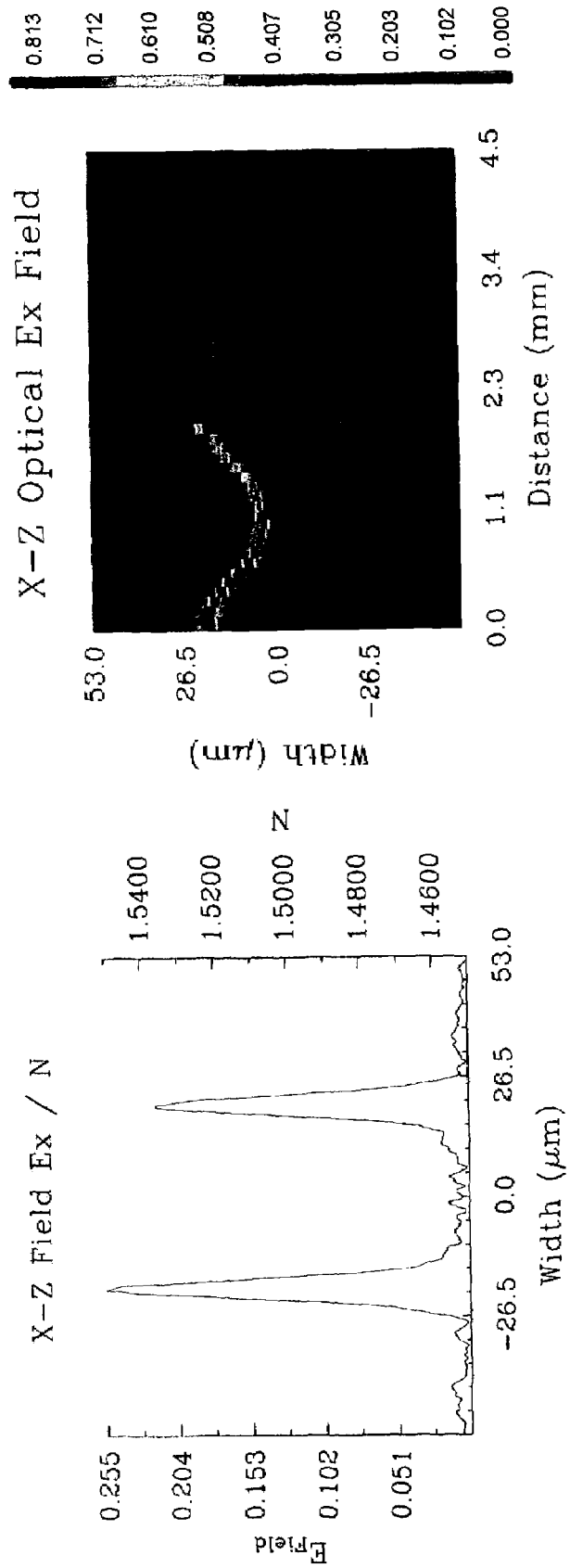
FIG. 1H.4
FIG. 13H.3

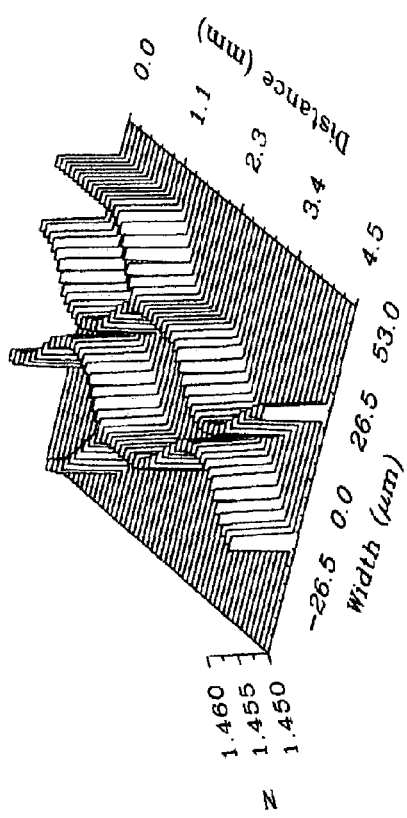
FIG. 13I.2
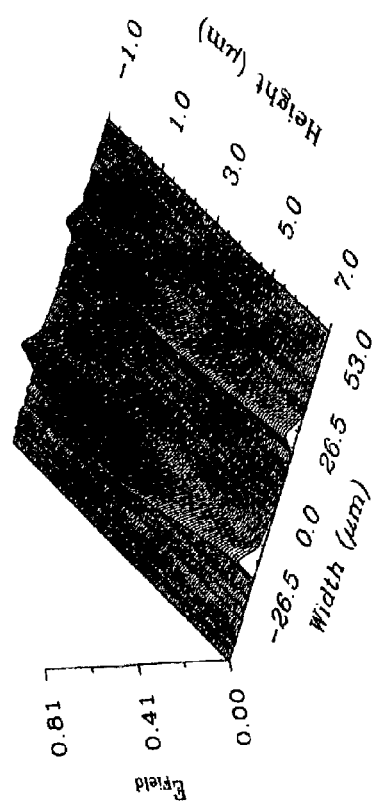
FIG. 13I.1

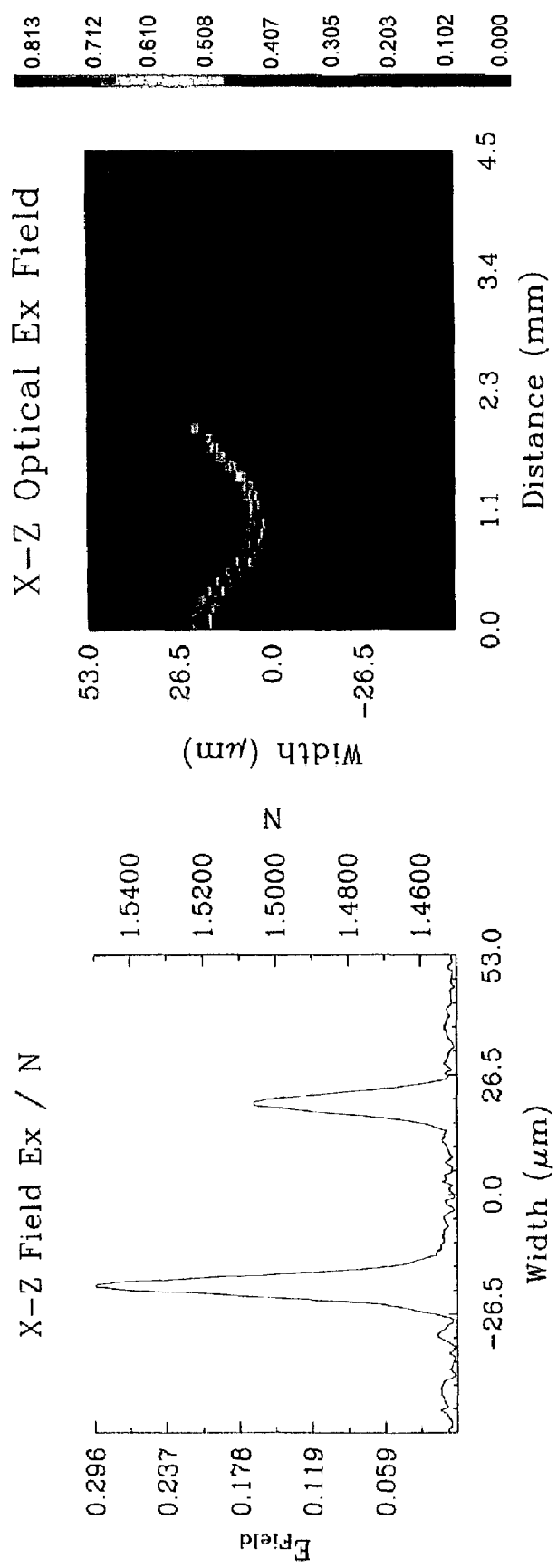
FIG. 131.4
FIG. 131.3

Generic device with active cores

Generic device with active cladding

Generic device with active cores and MMIs

Generic device with activated cores and MMIs $n0 > n1 > n2$

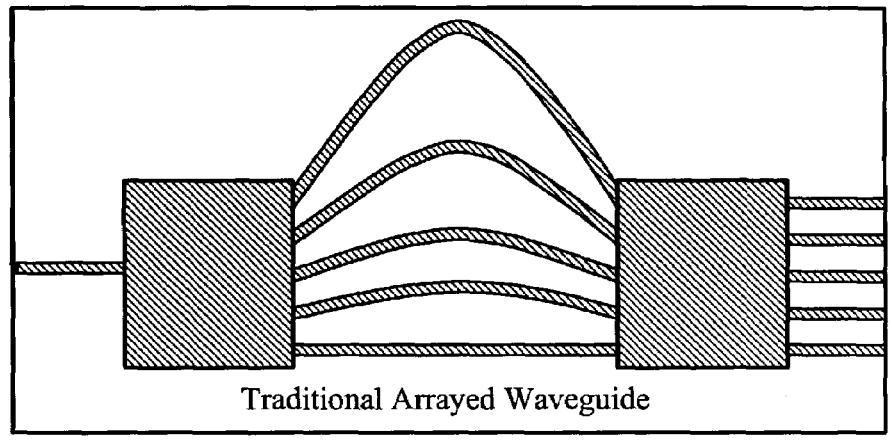
FIG. 26A
*(Prior Art)*  Traditional Arrayed Waveguide
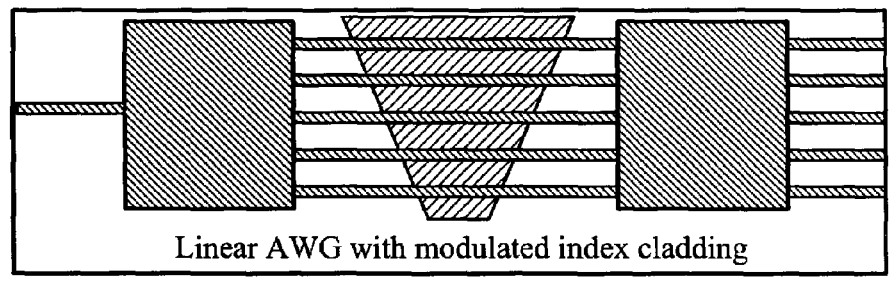
FIG. 26B  Linear AWG with modulated index cladding
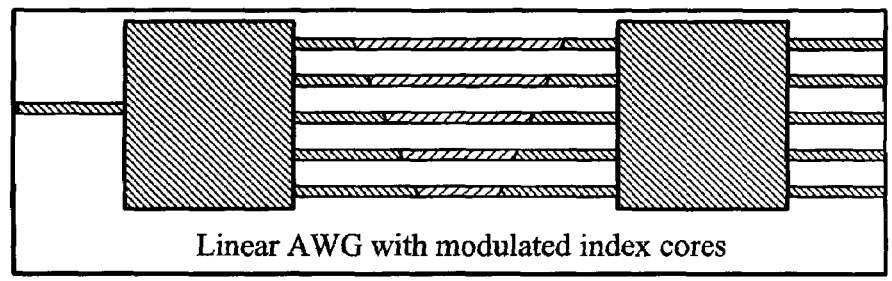
FIG. 26C  Linear AWG with modulated index cores
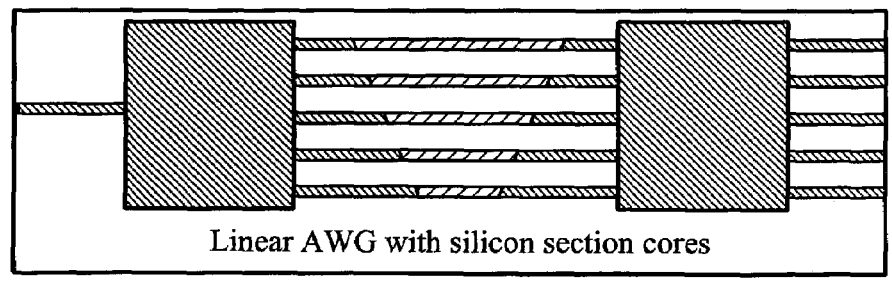
FIG. 26D  Linear AWG with silicon section cores FOM for an engineerable nonlinear nanocomposite material comprising silicon quantum dots We measured the all-optical switching efficiency as a function of wavelength separation between data and λ - converted pulses

QUANTUM DOTS, NANOCOMPOSITE MATERIALS WITH QUANTUM DOTS, DEVICES WITH QUANTUM DOTS, AND RELATED FABRICATION METHODS

CROSS-REFERENCE TO RELATED APPLICATIONS

This application claims the benefit of U.S. Provisional Application Ser. No. 60/309,898, filed on Aug. 2, 2001, U.S. Provisional Application Ser. No. 60/309,905, filed on Aug. 2, 2001, U.S. Provisional Application Ser. No. 60/309,979, filed on Aug. 2, 2001, U.S. Provisional Application Ser. No. 60/310,090, filed on Aug. 2, 2001, and U.S. Provisional Application Ser. No. 60/310,095, filed on Aug. 2, 2001, the disclosures of which are incorporated herein by reference in their entirety.

FIELD OF THE INVENTION

The current invention relates to a nonlinear nanocomposite material with independently engineered optical, chemical and mechanical characteristics.

BACKGROUND OF THE INVENTION

As telecommunications networks continue to expand their need for bandwidth, it is becoming increasingly necessary to introduce new technologies to keep up with growing demands. These technologies must not only facilitate the need for bandwidth, but be easily incorporated into today's network infrastructure. At the same time, they must expand to fit the requirements of the future. While current telecommunication systems comprise a combination of electronic and optical data-transmission, there is pressure to move toward all-optical networks due to the increased bandwidth provided by high bit-rates and parallel transmission through wavelength division multiplexing.

Currently, optical networks use light for much of the transmission of data between nodes in an optical circuit. Optical cross-connects function as switches in these nodes; routing signals arriving at one input-port to one of a variety of output-ports. Currently, the majority of optical cross-connect systems consist of high-speed electronic cores, which are complex, cumbersome, and expensive. These switches typically require the light signal to be translated into an electronic signal, which is switched or routed to an output-port before being reconverted to light. The complexity, size, and expense of such optical-to-electronic-to-optical (OEO) components become even more problematic with higher bit-rates and port counts, even as the cost of electronic components decreases, due to cross-talk and RF transport issues.

OEO devices are typically the rate-limiting component in any optical network. As such, many options are being considered to reduce the need for both OEO conversions, as well as electronic-signal processing in optical network components. This has lead to emphasis being placed on the development of "all-optical" switching technology, in which optical signals passing through a switch are diverted to the appropriate destination without being converted to electrons.

For most current applications, electronically controlled optical cross-connects with optical-cores can be used as an all-optical switch. In these devices, light routing does not require OEO conversion, but operation of the switch is electronic. The various all-optical switching technologies that currently support such systems include electromechanical switches (MEMS or bulk optics), thermo-optic switches (phase shift, capillary, or "bubble"), and electro-optic switches (LiNbO$_3$, liquid crystal). In addition, a variety of nonlinear optical switches (e.g., semiconductor optical amplifiers) use a light beam, rather than electronics, to operate the switch.

Many all-optical switching technologies are relatively slow, and are therefore only appropriate for static configuration control. Applications such as basic fiber/wavelength routing, provisioning and restoration typically require switching speeds around 1 ms. These slow all-optical switches, however, are inadequate for fast switching applications such as dynamic packet switching (~1 ns), header reading in packet switched networks (<25 ps), and all-optical data-processing (<1 ps).

Currently, only devices based on nonresonant nonlinear optical phenomena, such as cross-gain modulation (XGM) in semiconductor optical amplifiers, $\chi^{(2)}$ based pheonomena [e.g., difference-frequency mixing (DFM)], $\chi^{(3)}$ (or Kerr) based phenomena [e.g., cross-phase modulation (XPM) and four-wave mixing (FWM)], have the potential to switch at rates required for packet-switching, optical data processing and other high-speed switching applications. Such devices have the potential for switching speeds approaching (and even exceeding) ten terabits per second (10 Thit/s), or 10 trillion bits per second.

Research involving $\chi^{(3)}$-based all-optical switching has been pursued since the mid-1980s, when the development of ultrashort laser sources enabled the widespread study of $\chi^{(3)}$ nonlinear optical phenomena in a variety of materials. This research has primarily focused on all-optical switching in silica fiber-based devices. This is due to the relatively large figure-of-merit (FOM) of silica. There are many practical definitions of a FOM that takes into account many parameters that are important and relevant to all-optical switching. One example of such a FOM is defined as $$\frac{\Delta n}{\alpha \cdot \tau},$$

where $\Delta n$ is the induced refractive index change, $\alpha$ is the linear and nonlinear absorption coefficient, and $\tau$ is the response time of the material. In general, the larger the FOM, the better will be the performance of the all-optical switching. Another definition of an important FOM is $2\gamma/\beta\lambda$, where $\gamma$ is the nonlinear index of refraction, $\beta$ is the two-photon absorption coefficient, and $\lambda$ is the wavelength of operation. In this case, useful all-optical switching occurs when FOM>1. Due to the extremely low linear and nonlinear losses of light at telecommunications wavelengths in silica, the FOM of silica is large even though $\Delta n$ and $\gamma$ (which are related to Re[$\chi^{(3)}$]) are small.

Many all-optical switching devices using silica fiber have been demonstrated (e.g. nonlinear directional couplers, nonlinear optical loop mirrors, and soliton-based switches). Due to the small $\gamma$ of silica, however, impractical fiber lengths (~1000 km) are required for these devices to operate at typical telecommunication powers (~10 mW). As a result, there is a great deal of interest in developing materials with both a large FOM and a large $\gamma$ to reduce overall device sizes and latency. Device sizes ~1 mm or less are desirable for integration of multiple devices and to provide insensitivity to temperature fluctuations and manufacturing fluctuations (i.e. tight tolerance over long distances). In addition, low latency is needed as the data rates increase.

In addition to large nonlinearities, it is critical that commercial optical switching components are low cost and compatible with high-throughput automated fabrication. Historically, semiconductor processing, used to make microprocessor chips, has been one of the most cost-effective and automated processes for miniaturization. While this technology is extremely advanced in the field of microelectronics, it is still in its infancy with respect to optics. While waveguide structures have been fabricated using these techniques, they are rarely automated due to the incompatibility of the available active materials. For instance, crystalline $LiNiO_3$ cannot be arbitrarily inserted within a waveguide created by these techniques. In addition, polymeric nonlinear materials, which are more easily processed, typically have $\chi^{(3)}$ that is too low for efficient switching.

Presently, there is a variety of approaches being pursued to reduce the size of $\chi^{(3)}$-based all-optical switches. Approaches being considered include using semiconductor optical amplifiers (SOAs); manufacturing photonic bandgap structures with nonlinear materials; enhancing nonresonant optical nonlinearities using local field effects; and developing new crystalline materials and polymeric materials with high optical nonlinearities.

While proof-of-concept for all-optical switches based on SOAs has been shown, problems with amplified spontaneous emission buildup currently make cascading many of these switches problematic. In addition, the materials used for SOAs (typically InP) are expensive and create inherent difficulties with coupling to standard silica fibers and waveguides. Photonic bandgap materials are another promising approach, but manufacturing is still beyond current practical capabilities. While enhancing nonlinearities using local field effects is an interesting approach, enhancement factors of only ~10x have been achieved to date. Finally, new nonlinear crystalline materials have been developed (e.g. periodically poled $LiNbO_3$), but are typically expensive, and difficult to process, making incorporation into waveguide devices problematic. Nonlinear polymers, with more appealing mechanical properties, have also been developed, but problems such as kinks in the polymer chains limit the maximum nonlinearity to a value still unsuitable for practical all-optical applications. In cases where highly nonlinear polymers have been produced (e.g. polyacetylene), many of the appealing mechanical properties are lost, creating problems similar to those found in crystalline materials.

In addition to high nonlinearity and processability, nonlinear materials must also be low-loss in the wavelength range-of-interest (e.g. from absorption or scattering). They must also have a linear index of refraction that is compatible with the specific architecture of the device in which they are to be used (e.g. a nonlinear waveguide core must have an index of refraction higher than the cladding surrounding it). As such, it has been extremely difficult to find a practical material that simultaneously satisfies all of the requirements for a commercial $\chi^{(3)}$-based nonlinear device.

The ideal $\chi^{(3)}$-based nonlinear optical material will have the following characteristics:
1. Large $Re[\chi^{(3)}]$ in the wavelength range-of-interest ($Re[\chi^{(3)}]$ is directly related to $\Delta n$ and $\gamma$).
2. Extremely low optical losses from single- and multi-photon absorption, and/or resonant and nonresonant scattering in the wavelength range-of-interest.
3. A multiphoton transition near the wavelength range-of-interest (for resonant and near resonant enhancement of $\chi^{(3)}$).
4. A precisely selected linear index of refraction, compatible with waveguides of the intended device architecture.
5. Physical and chemical compatibility with the specific device architecture and materials with which it will be used.
6. The ability to be processed for incorporation into optical devices.
7. Low cost.

While many materials may have one or more of these desirable characteristics, at present, no single material comprises all of the optical and physical properties required for an optimal $\chi^{(3)}$-based optical switch. In fact, besides SOAs, no commercial devices are currently available, primarily due to a lack of appropriate nonlinear optical materials. The current invention provides a solution to this problem by providing a novel nonlinear material, as well as structures, devices and applications enabled by this material.

SUMMARY OF THE INVENTION

The current invention describes a novel type of nonlinear material that overcomes the optical, chemical and mechanical limitations associated with existing nonlinear materials. The invention provides "engineered" nonlinear nanocomposite materials with an extremely large $\chi^{(3)}$ and fast temporal response along with optical properties that can be precisely tuned to satisfy the requirements of a particular application (e.g., optical, thermal, mechanical, etc.). In particular, the magnitude of the linear and nonlinear index of refraction can be adjusted substantially independently of the absorption spectrum of the material. In addition, the optical characteristics can be engineered substantially independently from the mechanical and chemical characteristics, providing exceptional performance and flexibility in terms of device-incorporation and process-stability.

BRIEF DESCRIPTION OF DRAWINGS

FIG. 6A, FIG. 6B, FIG. 6C, FIG. 6D, FIG. 6E, and FIG. 6F illustrate one preferred embodiment of a nonlinear directional coupler comprising an engineered nonlinear nanocomposite material.

FIG. 10A.1, FIG. 10A.2, FIG. 10A.3, FIG. 10B.1, FIG. 10B.2, and FIG. 10B.3 illustrate a schematic drawing and simulation for switching in a directional coupler comprising an engineered nonlinear nanocomposite material.

FIG. 12A.1, FIG. 12A.2, FIG. 12A.3, FIG. 12A.4, FIG. 12B.1, FIG. 12B.2, FIG. 12B.3, FIG. 12B.4, FIG. 12C.1, FIG. 12C.2, FIG. 12C.3, FIG. 12C.4, FIG. 12D.1, FIG. 12D.2, FIG. 12D.3, and FIG. 12D.4 illustrate a schematic drawing and simulation for switching in a MZ interferometer switch comprising an engineered nonlinear nanocomposite material.

FIG. 13F.1, FIG. 13F.2, FIG. 13F.3, FIG. 13F.4, FIG. 13G.1, FIG. 13G.2, FIG. 13G.3, FIG. 13G.4, FIG. 13H.1, FIG. 13H.2, FIG. 13H.3, FIG. 13H.4, FIG. 13I.1, FIG. 13I.2, FIG. 11.3, and FIG. 13I.4 illustrate simulations of an optical transistor comprising an engineered nonlinear nanocomposite material.

FIG. 26A, FIG. 26B, FIG. 26C, and FIG. 26D illustrate a schematic drawing of three preferred embodiments of a Linear Arrayed Waveguide Device plus a schematic drawing of one prior art AWG.

DETAILED DESCRIPTION OF THE INVENTION

Definitions:

As used in this specification and the appended claims, the singular forms "a," "an" and "the" include plural references unless the content clearly dictates otherwise. Thus, for example, reference to "a semiconductor quantum dot" includes a mixture of two or more such semiconductor quantum dots, and may include a population of such quantum dots.

"Optional" or "optionally" means that the subsequently described event or circumstance may or may not occur, and that the description includes instances where the event or circumstance occurs and instances in which it does not. For example, the phrase "optionally surrounded with a shell material" means that the shell material may or may not be present in order to fall within the scope of the invention, and that the description includes both the presence and absence of such a shell.

Unless otherwise defined, all technical and scientific terms used herein have the meaning commonly understood by a person skilled in the art to which this invention belongs. As used herein, the following terms have the meanings ascribed to them unless specified otherwise:

The present invention relates to a class of novel materials comprising semiconductor nanocrystals or quantum dots. As used herein, the terms "quantum dot", "dot" and "nanocrystal" are synonymous, and refer to any semiconductor crystal with size dependent optical and electrical properties along at least three orthogonal dimensions. A quantum dot is differentiated from a quantum wire and a quantum well, which are crystals with size-dependent optical and electronic properties along at most two or one dimension respectively.

It will be appreciated by one of skill in the art that quantum dots can exist in a variety of shapes, including but not limited to spheroids, rods, disks, pyramids, cubes and a plurality of alternative geometric and non-geometric shapes. While these shapes can dramatically affect the physical, optical and electronic characteristics of the quantum dot, the specific shape does not bear on the qualification of the crystal as a quantum dot.

For convenience, we will describe the size of quantum dots in terms of "diameter". In the case of spherically shaped quantum dots, diameter is used as is commonly understood. For non-spherical quantum dots, the term diameter, unless otherwise defined, refers to the radius of revolution in which the entire non-spherical quantum dot would fit.

Figure 1:
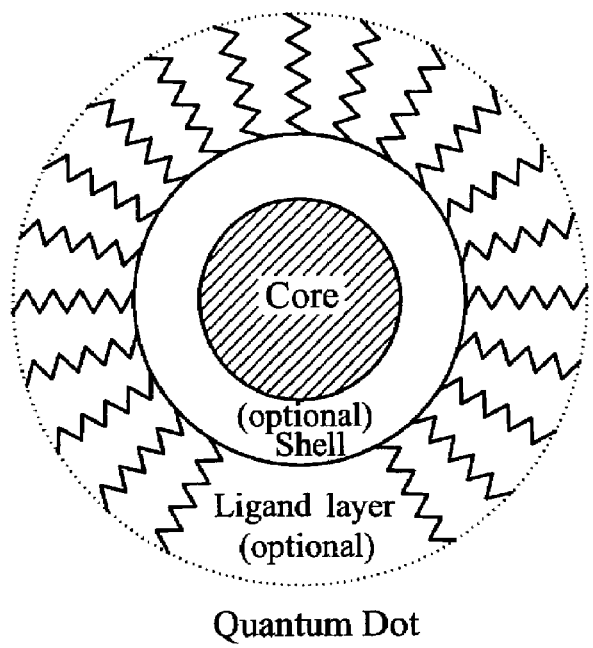
FIG. 1 provides a graphic representation of an "ideal" quantum dot, depicting distinct core, shell and ligand-layer regions.

A quantum dot will typically comprise a "core" of one or more first materials, and can optionally be surrounded by a "shell" of a second material. A quantum dot core surrounded by a shell is referred to as a "core-shell" quantum dot (FIG. 1).

The term "core" refers to the inner-portion of the quantum dot such that the core-region is substantially a single homogeneous monoatomic or polyatomic material. The core can be either crystalline, polycrystalline or amorphous. The core may be "defect" free or contain a range of defect densities. In this case, "defect" refers to any crystal stacking error, vacancy, insertion or impurity entity (e.g. dopant) placed within the core-material. Impurities can be either atomic or molecular.

While the core may herein be referred to as "crystalline", it will be understood by one of skill in the art that the surface of the core may be polycrystalline or amorphous and that this non-crystalline surface may extend a measurable depth within the core. The potentially non-crystalline nature of the "core-surface" does not change what is described herein as a substantially crystalline core. The core-surface region optionally contains defects or impurities. The core-surface region will preferably range in depth between one and five atomic-layers, and may be either substantially homogeneous, substantially inhomogeneous or continuously varying as a function of position within the core-surface region.

Quantum dots may optionally comprise a "shell" of a second material that surrounds the outside of the inner core. A "shell" is a layer of material, either organic or inorganic, that covers the surface of the core region of the quantum dot. A shell may be crystalline, polycrystalline or amorphous and optionally comprises dopants or defects. The shell material is preferably an inorganic semiconductor with a bandgap that is larger than the core material. In addition, preferred shell materials have good conduction and valence band offsets with respect to the core such that the conduction band is desirably higher and the valence band is desirably lower than those of the core. Alternatively, the shell material may have a bandgap that is smaller than that of the core material, and/or the band offsets of the valence or conduction bands may be lower or higher, respectively, than those of the core. The shell material may be optionally selected to have an atomic spacing close to that of the core material.

Shells may be "complete", indicating that substantially all surface atoms of the core are covered with shell material. Alternatively, the shell may be "incomplete" such that only partial coverage of the core atoms is achieved. In addition, it is possible to create shells of a variety of thicknesses, defined in terms of the number of "monolayers" of shell material that are bound to each core. "Monolayer" is a term known in the art referring to a single complete coating of a shell material (with no additional material added beyond complete coverage). In the current invention, shells will preferably be of a thickness between 0 and 10 monolayers, where it is understood that non-integer numbers of monolayers correspond to the state in which incomplete monolayers exist. Incomplete monolayers may be either homogeneous or inhomogeneous, forming islands or clumps of shell material on the surface of the quantum dot. Shells may be either uniform or nonuniform in thickness. In the case of a nonuniform thickness shell, it is possible to have an "incomplete shell" that contains more than "one monolayer" of shell material. Finally, shell thickness will preferably range from about 1 Å to 100 Å.

It will be understood by one of skill in the art that there is a region between the core and shell referred to herein as the "interface". The interface may comprise an atomically discrete transition between the material of the core and the material of the shell, or may comprise an alloy of materials between the core and shell. The interface may be lattice-matched or unmatched, and may be crystalline or noncrystalline. The interface may contain defects or be defect-free, and may optionally contain impurities. The interface may be homogeneous or inhomogeneous, and may comprise chemical characteristics that are graded between the core and shell materials such that a continuous transition is made between the core and shell. Alternatively, the transition can be discontinuous. The width of the interface region can range from an atomically discrete transition to a continuous graded alloy of core and shell materials that are only purely core material in the center of the quantum dot and purely shell material at the outer surface. Preferably, the interface region will be between one and five atomic layers thick.

A shell may optionally comprise multiple layers of a plurality of materials in an onion-like structure, such that each material acts as a shell for the next-most inner layer. Between each layer there is optionally an interface region. The term "shell" is used herein to describe shells formed from substantially one material as well as multi-layer shells.

A quantum dot may optionally comprise a "ligand layer", comprising a plurality of organic molecules bound either covalently or non-covalently to the outer surface of the quantum dot. A quantum dot comprising a ligand layer may or may not also comprise a shell. As such, the organic ligands of the ligand layer may bind to either the core or the shell material or both (in the case of an incomplete shell). The ligand layer may comprise a single molecular species, or a mixture of two or more molecular species. Each molecular species will have an affinity for, and bind selectively to, the quantum dot core, shell or both at least at one point on the molecule. The molecular species may optionally bind at multiple points along the molecule. The molecular species may optionally contain additional active groups that do not interact specifically with the surface of the quantum dot. The molecular species may be substantially hydrophilic, substantially hydrophobic or substantially amphiphilic. In general, the molecular species can be an isolated organic molecule, a polymer (or a monomer for a polymerization reaction), an inorganic complex, and an extended crystalline structure.

It will be understood by one of skill in the art that when referring to a population of quantum dots as being of a particular "size", what is meant is that the population is made up of a distribution of sizes around the stated "size". Unless otherwise stated, the "size" used to describe a particular population of quantum dots will be the mode of the size distribution (i.e. the peak size).

For purposes of this invention, the "size" of a quantum dot will refer to the diameter of the core material. If appropriate, a separate value will be used to describe the "shell-thickness" surrounding the core. For instance, a 3 nm silicon quantum dot with a 1.5 nm $SiO_2$ shell is a quantum dot comprising a 3 nm diameter core of silicon surrounded by a 1.5 nm thick layer of $SiO_2$, for a total diameter of 6 nm.

Unless otherwise stated, the thickness of the ligand layer is assumed to be at most a single monolayer and many times will be substantially less than a complete monolayer.

As used herein, the term "monodisperse" refers to a population of quantum dots wherein at least about 60% of the population, preferably 75% to 90% of the population, or any integer or noninteger there between, fall within a specified particle size range. A population of monodispersed particles deviates less than 20% rms (root-mean-square) in diameter, more preferably less than 10% rms and most preferably less than 5% rms.

"Optically pure" refers to a condition in which light passing through or past a material is substantially unchanged in mode quality as a result of inhomogeneities in the material or modulations at the interface between materials. This does not include mode disruption resulting from changes in index of refraction of waveguides. For instance, a material with large aggregates of quantum dots capable of scattering light would not be optically pure. The same material with aggregates of a size that do not significantly scatter light, however, would be optically pure. It will be apparent to one of skill in the art that what is meant above by "substantially unchanged" will depend on the optical requirements of a particular application. To this end, "optically pure" refers to the level of optical purity required for the application in which the material is to be used.

"Optically homogeneous" is defined as being homogeneous across a length scale that is significant for optical waves; preferably less than 500 nm, more preferably less than 300 nm and most preferably less than 250 nm.

A "waveguide structure" is a term of art, and refers to an optical system capable of transporting light from one location to another through the use of total internal reflection within a "waveguide core", with an index of refraction of $n_1$, surrounded by a "cladding", with an index of refraction of $n_2$, wherein $n_1 > n_2$.

"Cladding" is any material that surrounds the waveguide core in a waveguide structure such that $n_1 > n_2$. In a typical waveguide structure, light propagates as a traveling wave within and along the length of the "waveguide core", and evanescently decays within the cladding with a decay constant related to the ratio of $n_1$ to $n_2$. Light trapped within, and traveling along, the length of a waveguide core is referred to as being "guided".

The shape of a waveguide core can typically be described in terms of its "cross-section". The cross-section is the shape created by cutting the waveguide along the axes perpendicular to the longitudinal axis of the waveguide. The longitudinal axis is the axis in which guided light travels.

"Optical fibers" and "planar waveguides" are two common forms of waveguides know in the art. "Optical fiber", as the term is commonly used, refers to a freestanding structure comprising a substantially cylindrical waveguide core surrounded by a substantially cylindrical cladding and optionally comprising a flexible, protective outer-coating.

"Planar waveguides" are waveguides fabricated on a substrate by a variety of methods. "Planar waveguides" typically comprise a substantially rectangular waveguide core, and optionally comprise non-rectangular waveguide cores with cross-sections of circles, ovals, triangles, and a plurality of other geometric and nongeometric shapes. While the term "planar" suggests a flat structure, the term "planar waveguide", as used herein, also refers to structures comprising multiple flat layers. Optionally, one or more layers in a planar waveguide are not flat. One of skill in the art will appreciate that the key aspect of a "planar waveguide" is that it is a waveguide structure fabricated on a "substrate". Unless otherwise stated, the term "waveguide" will be used herein to describe a planar waveguide.

"Waveguide substrate" or "substrate" is used herein to describe the material on which a planar waveguide is located. It is common that a planar waveguide is fabricated directly on the surface of the substrate. The substrate typically comprises a solid support such as a silicon wafer, and optionally comprises an additional "buffer layer" that separates the waveguide structure from the solid support. The buffer layer optionally comprises a plurality of layers comprising one or more materials or combination of materials. The buffer layer may optionally act, in part, as a cladding material. Alternatively, the waveguide substrate may be a flexible substrate serving the same purpose.

"Single mode" waveguides are those waveguide structures (either planar or fiber optic) that typically support only a single optical mode (e.g. TEM00). Such waveguides are used extensively in the current invention. "Multi-mode" waveguides are those waveguides that typically support multiple optical modes simultaneously. Unless otherwise stated, all waveguides used herein are single mode waveguides.

"Waveguide diameter" is herein used to describe the diameter of the cylindrical waveguide core of an optical fiber. Waveguide diameter is also used to describe a substantially cylindrical core on a planar waveguide.

"Waveguide width" or "width" is used herein to describe the cross-sectional dimension of a rectangular waveguide that is oriented parallel to the substrate surface. This is also referred to as the "horizontal dimension" of the waveguide. "Waveguide height" or "height" is used herein to describe the cross-sectional dimension of a rectangular waveguide that is oriented perpendicular to the substrate surface. This is also referred to as the "vertical dimension" of the waveguide. Based on the definitions of "width" and "height" described here, one of ordinary skill in the art will understand the translation of these terms to other geometrically shaped waveguides. Unless otherwise stated, the standard definitions of width and height used in geometry will be used to describe geometric cross-sectional shapes.

"Core taper" refers to a region of the waveguide core in which the geometry of the waveguide core is changed. This may comprise changing the size and/or shape of the waveguide core in one or two dimensions. A core taper, for example, may comprise a transition of a waveguide core with a square cross-section of 15 μm×15 μm to a waveguide core with a square cross-section of 7 μm×7 μm. A core taper may also, for example, comprise a transition from a waveguide core with a square cross-section of 15 μm×15 μm to a waveguide core with a circular cross-section of 10 μm in diameter. Many other forms of core-tapers are possible and will be understood from the above definition.

A core taper is typically engineered to gradually change the characteristics of the waveguide over a defined distance, referred to as the "taper length". Ideally, the taper length will be long enough so that the transition preserves the mode structure of an optical signal through the taper. In particular, it is preferred that a single optical mode entering a waveguide taper remains single mode after exiting the taper. Perfect retention of the mode-structure is referred to as an "adiabatic transition". While the term "adiabatic transition" is commonly used, those of skill in the art will recognize that it is not possible to have a perfectly adiabatic transition, and that this term is used to describe a transition in which the mode structure is substantially undisrupted. It is not necessary for a transition to be considered adiabatic in order for the junction to be considered a taper.

A "cladding taper" is a novel invention disclosed herein that is similar to a core taper; however, it refers to a change in width of the cladding around the waveguide core. Similar to a core-taper, a cladding taper can be used to change the dimension or shape of the cladding, and can be defined to have a taper length. The taper length can be such as to produce an adiabatic or nonadiabatic transition.

Both core and cladding tapers may optionally refer to the case in which the index of refraction of the materials in the core or cladding are gradually changed, or "graded" over the taper length. As used herein, the term "gradually" refers to changes that occur continuously or in small steps over a given nonzero distance. Core and cladding tapers may optionally comprise simultaneous changes to the index, size and/or shape of the core or cladding respectively.

A "bend" is used herein to describe a portion of a planar waveguide in which the waveguide displays a degree of curvature in at least one dimension such that the cross-section of the waveguide is substantially unchanged. Typically, bends will be smooth and continuous, and can be described in terms of a radius of curvature at any given point within the bend. While bends can curve the waveguide both parallel and perpendicular to the substrate (i.e. horizontal or vertical bends respectively), unless otherwise stated, the term "bend" will herein refer to horizontal bends. Optionally, bends can also comprise tapers.

"Waveguide coupler", "optical coupler", and "directional coupler" are synonymous, and refer to a waveguide structure in which light is evanescently coupled between two or more waveguide cores such that the intensity of the light within each of the individual cores oscillates periodically as a function of the length of the coupling region. A more detailed description of a waveguide coupler is disclosed below.

A "nonlinear waveguide coupler" is a waveguide coupler in which the region between and/or around the two or more coupled waveguide cores is filled with a material with an index of refraction that can be changed (the "active material"). By changing the index of the active material, the coupling characteristics of the nonlinear waveguide coupler can be modified. Alternatively, the active material may be contained within one or more of the coupled waveguide cores.

A "Mach-Zehnder interferometer" or "MZ interferometer" is a waveguide structure in which light from a single waveguide core (the "input waveguide") is split into two or more separate waveguides (the "waveguide arms" or "arms"). Light travels a defined distance within the arms and is then recombined into a single "output waveguide". In a MZ interferometer, the history of the optical signals in each arm affects the resulting signal in the output waveguide. A more detailed description of a MZ interferometer is disclosed below.

A "nonlinear MZ interferometer" is a MZ interferometer in which one or more of the waveguide arms comprise an active material. The active material may be in the core or cladding of the waveguide arm. Modifying the index of refraction of the active material modulates the signal in the output waveguide by changing the degree of constructive and destructive interference from the arms.

"Active material" refers to any material with nonlinear optical properties that are intentionally exploited to manipulate light in the current invention. While the term active material will typically be used to refer to an engineered nonlinear nanocomposite material of the current invention, the term may also be used to describe other nonlinear materials known in the art.

"Active region" refers to the region of an optical device in which the index of refraction of the active material is intentionally modulated in order to manipulate light. In the case of an electro-optic modulator, the active region is that area of the device where a voltage is applied. In a $\chi^{(3)}$-based device, the active region is that area to which a trigger-signal is applied. Note that while the active region is the only region of the device in which an intentional change in optical properties occurs, it does not restrict the location of the active material, which may extend beyond the active region. Regions containing active materials outside the active region are not modulated during normal operation of the device. "Active length" describes the length of the active region along the longitudinal axis of the waveguide.

In the case of devices employing evanescent coupling of light between two waveguide cores (e.g. a waveguide coupler), the "interaction region" or "coupling region" is the region of the waveguide structure in which the coupling is intended to occur. As is typically understood in the art, all waveguides couple at some theoretically non-zero level. The interaction region, however, is considered only that region of the coupled device in which evanescent fields of the waveguides overlap to a significant extent. Here again, the interaction region does not restrict the extent of either the active region or the active material, which may be greater or lesser in extent than the interaction region.

"Interaction length" describes the length of the interaction region. "Interaction width" is the spacing between two coupled waveguides within the interaction region. Unless otherwise stated, the interaction width is assumed constant across the interaction length.

"Trigger pulse" and "trigger signal" are synonymous and refer to light that is used to create a transient change in the index of refraction in the materials of the present invention. In this case the term "transient" is used to describe the changes that result from either pulsed or CW trigger signals.

"Data pulse" and "Data signal" are synonymous and refer to a signal used in the present invention to transmit information through a switch. A data pulse can optionally be a trigger pulse. A Data pulse can either be pulsed or CW.

"CW light" and "CW signal" are synonymous and refer to light that is not pulsed.

"Wavelength range-of-interest" refers to any range of wavelengths that will be used with a particular device. Typically, this will include both the trigger and data signals. For instance, if a device is fabricated for use in the 1550 nm telecom range, the wavelength range-of-interest may be defined as 1.5 $\mu$m to 1.6 $\mu$m. For devices in the 1300 nm range, the wavelength range-of-interest may be defined as 1.251 $\mu$m–1.35 $\mu$m. While these are preferred wavelength range-of-interests, in light of the present invention, it will be understood that the specific wavelength range-of-interest is only limited by a specific application, and not the current invention. The ability to tune the materials of the current invention implies that any wavelength range-of-interest may be preferred. In particular, 300 nm to 4000 nm is a preferred wavelength range-of-interest, more preferably 750 nm to 2000 nm, more preferably 1260 nm to 1625 nm, most preferably 1310±50 nm and 1580±50 nm.

Quantum Dots

Definition

The current invention, in part, exploits the extraordinary optical and chemical properties of a new type of material: Semiconductor quantum dots. Quantum dots are nanometer sized semiconductor crystals with optical and electronic properties that are strongly dependent on both the size and the material of the crystal.

In nature, it is the size range between about one and ten nanometers in which the quantum mechanical characteristics of atoms and molecules begin to give way to the classical mechanics of everyday life. In this transition regime, the majority of a material's electronic and optical properties change, and are therefore strongly dependent on size. In addition, as the size of a material gets smaller, and therefore more atomic-like, many characteristics are enhanced due to a redistribution of oscillator strength and density of states. These effects, referred to as "quantum confinement", result in the ability to finely tune the optical properties of quantum dots by carefully controlling their size. This control provides one critical aspect of the current invention.

A quantum dot will typically be in a size range between about 1 nm and about 1000 nm in diameter or any integer or fraction of an integer there between. Preferably, the size will be between about 1 nm and about 50 nm, and more preferably between about 2 nm to about 20 nm (such as about 2, 3, 4, 5, 6, 7, 8, 9, 10, 11, 12, 13, 14, 15, 16, 17, 18, 19, or 20 nm or any fraction of a nanometer therebetween).

The core of a quantum dot may comprise inorganic crystals of Group IV compounds, including but not limited to Si and Ge; Group II–VI compounds, including but not limited to ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe and BaO; Group III–V semiconductor compounds, including but not limited to AlN, AlP, AlAs, AlSb, GaN, GaP, GaAs, GaSb, InN, InP, InAs and InSb; and tertiary or alloyed compounds of any combination between or within these groups. Alternatively, it is possible for the core to be formed from a crystalline organic semiconductor material, or an inorganic and/or organic material in either polycrystalline or amorphous form.

A quantum dot core may optionally be surrounded by a shell of a second organic or inorganic material. The shell may comprise inorganic crystals of Group IV compounds, including but not limited to Si and Ge; Group II–VI compounds, including but not limited to ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe and BaO; Group III–V compounds, including but not limited to AlN, AlP, AlAs, AlSb, GaN, GaP, GaAs, GaSb, InN, InP, InAs and InSb; and tertiary or alloyed compounds of any combination between or within these groups. The shell may be doped or undoped, and in the case of doped shells, the dopants may be either atomic or molecular. Alternatively, the shell may comprise a crystalline organic semiconductor material, as well as non-crystalline inorganic and/or organic materials. The shell may optionally comprise multiple materials, in which different materials are stacked on top of each other to form a multi-layered shell structure.

Optical Properties

Figure 2:
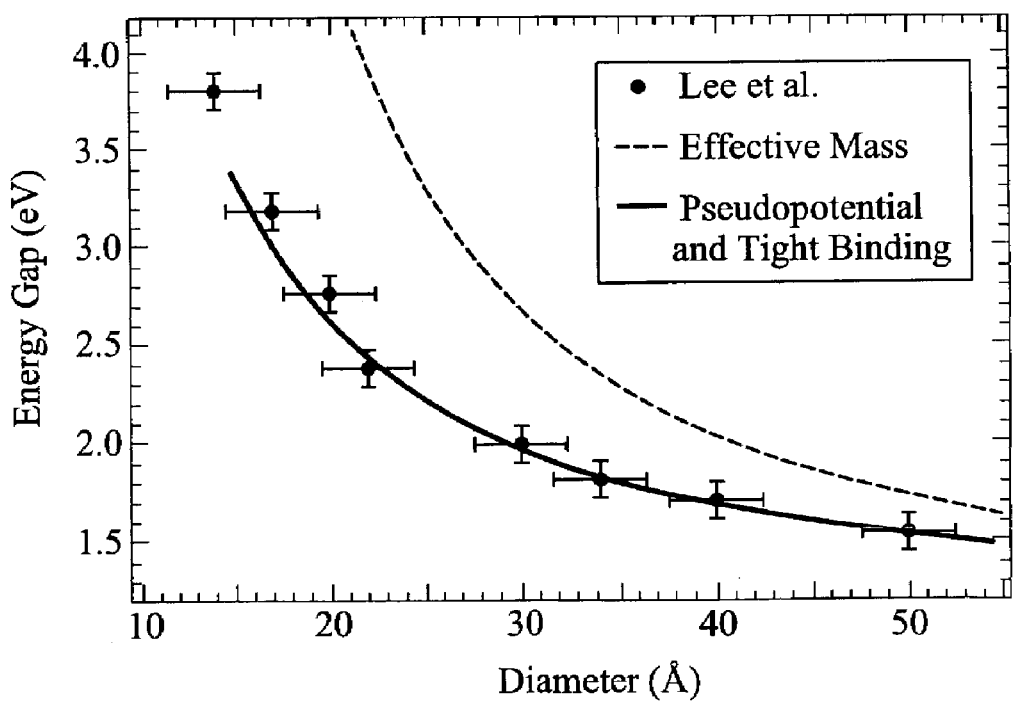
FIG. 2 illustrates energy of the first absorbing state as a function of size for silicon quantum dots.
Figure 3:
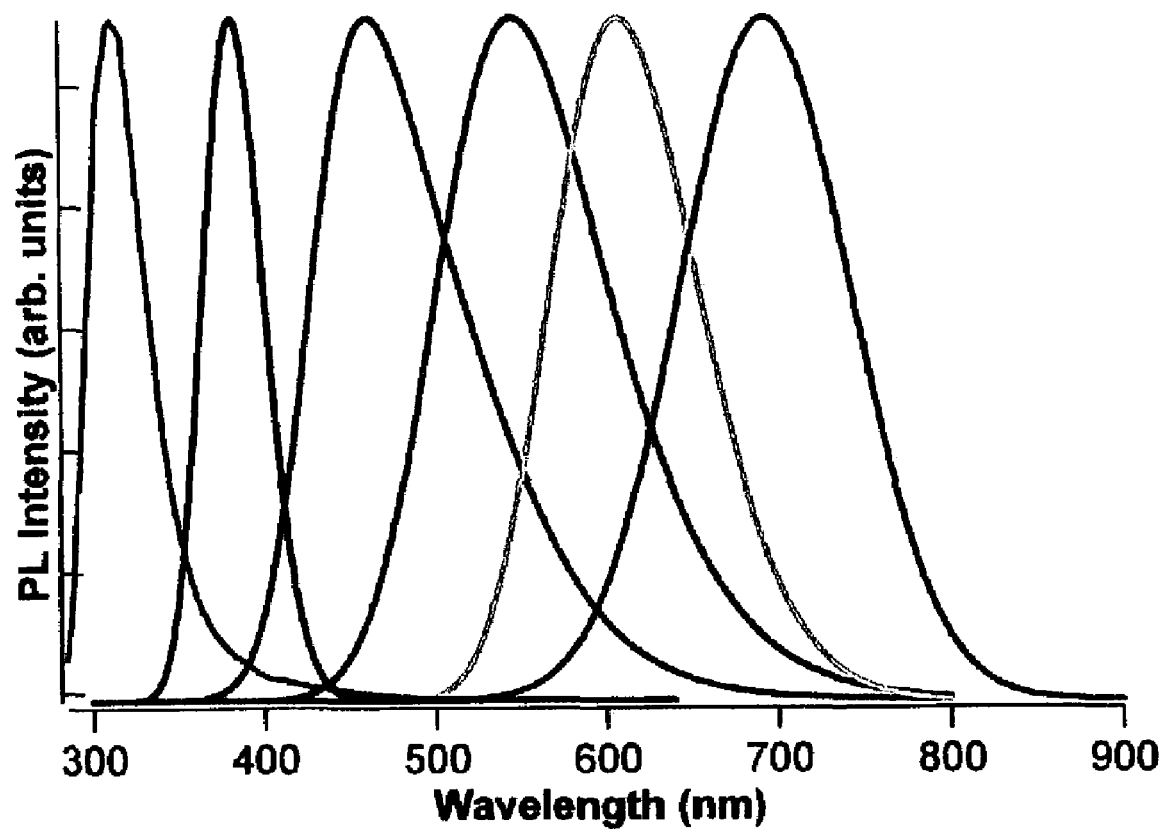
FIG. 3 illustrates emission spectra from silicon quantum dots as a function of size.

Linear Optical Properties:

One of the most dramatic examples of "quantum confinement" is that, for a single semiconductor material, the bandgap energy shifts as a function of size. This can be seen in FIG. 2, where the energy of the first absorbing state of quantum dots fabricated from silicon, referred to herein as "silicon quantum dots", is plotted as a function size. The same can be seen for the emission wavelength as a function of size (FIG. 3). This characteristic alone provides us with unprecedented control over the absorption properties of a solid-state material.

Through a series of relations called the Kramers-Kroenig equations, the properties of refractive index and dielectric constant are directly related to absorption. As such, size-dependent control of absorption directly results in control of refractive index.

Figure 4A:
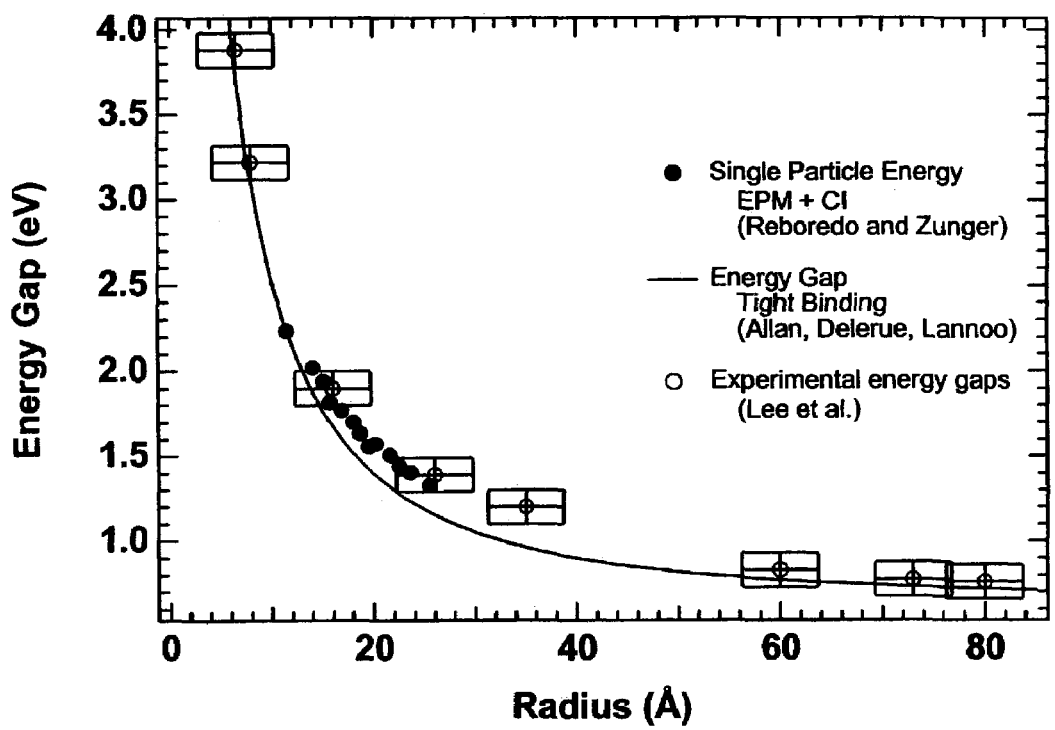
FIG. 4A and FIG. 4B illustrate absorption and emission spectra from germanium quantum dots as a function of size.
Figure 4B:
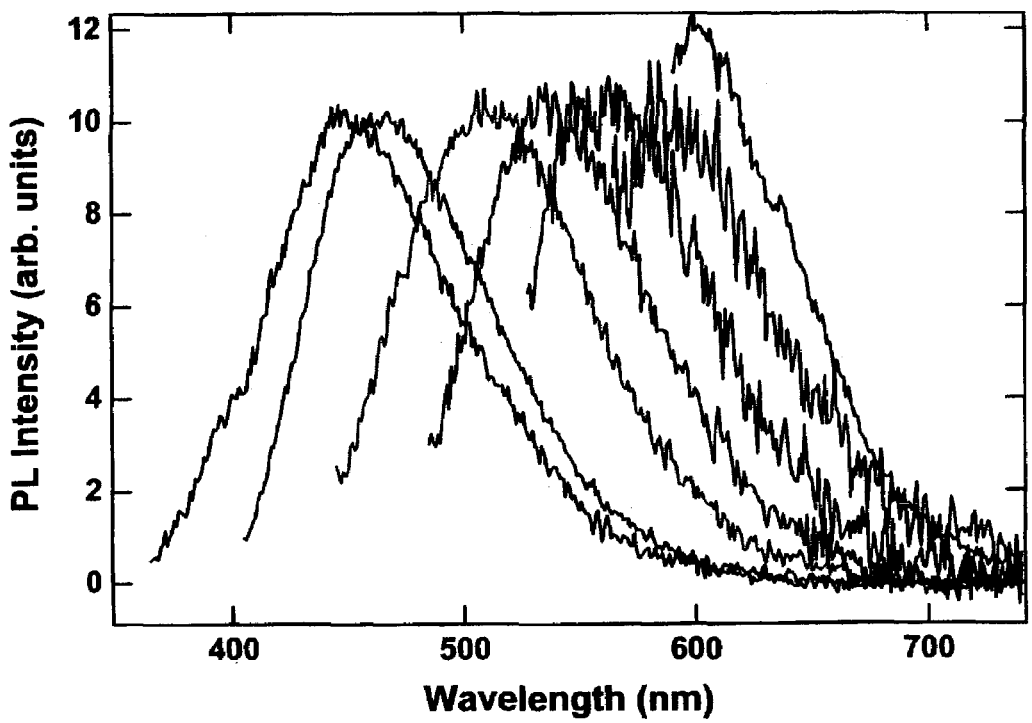

In addition to the size of a quantum dot, the optical and electronic properties are also strongly influence by the material from which it is fabricated. Quantum confinement is a modulation of the properties of the bulk material. As such, any changes resulting from a reduction in size are made relative to the bulk characteristics. As an example, FIG. 4A and FIG. 4B show the size dependent absorption and emission of germanium quantum dots, which differ from those of silicon. By independently selecting the appropriate combination of size and material, even greater control of the optical and electronic properties of a quantum dot is provided.

Relation of Size and Material to Dielectric Constant and Index of Refraction in the Infrared For most materials, the index of refraction far from resonance decreases as the bandgap energy of the material increases (a consequence of the Kramers-Kroenig relation). This explains, for example, why the index of refraction of transparent materials (e.g., silica, metal halides, organics) is less than that for inorganic semiconductors with smaller relative absorption energies. This effect also applies to quantum-confined semiconductors. In this case, as the size of the quantum dot decreases, the energy gap increases, decreasing the index of refraction. Thus, for quantum dots, the off-resonant index of refraction decreases as a function of size, affording another method to control the optical properties of the material.

Nonlinear Optical Properties

In general, a wide variety of nonlinear optical phenomena arise when materials are exposed to high-intensity light. Some of these nonlinear phenomena are used in aspects of telecommunications (e.g. Raman amplifiers) and many are being considered for future use (e.g. four-wave mixing, cross-phase modulation, solitons). Although nonlinear effects are typically associated with high-intensities, these effects are also observed at lower intensities due to phase matching, resonant enhancement, and/or long interaction lengths.

A material responds to incident light by creating a polarization, which can be expressed as $$P = \chi E = \chi^{(1)} E + \chi^{(2)} E \times E + \chi^{(3)} E \times E \times E + \ldots,$$

where E is the electric field strength, $\chi$ is the overall optical susceptibility, and $\chi^{(n)}$ is the nth order susceptibility. Since $\chi^{(2)}$ phenomena are only present in materials that lack inversion symmetry, we are primarily interested in $\chi^{(3)}$ phenomena (exhibited by all materials). (Note that $\chi^{(3)}$ is a complex number where $\Delta n$ and $\gamma$ are related to the real part of $\chi^{(3)}$, i.e. $\mathrm{Re}[\chi^{(3)}]$). In particular, we are interested in phenomena that change the linear index of refraction by creating an effective linear optical susceptibility $$\chi_{eff} = \chi^{(1)} + \chi^{(3)} E \times E = \chi^{(1)} + \chi^{(3)} I,$$

where I is the intensity of the particular light beam creating the effective linear optical susceptibility. This leads to an effective refractive index, given by $$n(I) = n_0 + n_2 \langle E^2 \rangle = n_0 + \gamma I,$$

where $n_0$ is the low-intensity refractive index, and $$n_2 = \frac{12\pi}{n_0} \chi^{(3)}.$$

This intensity dependent refractive index can be exploited for all-optical switching.

Nonlinear Optical Properties in Quantum Dots

In general, three mechanisms are principally responsible for $\chi^{(3)}$ nonlinearities in quantum dots. These effects fall into the broad categories of resonant, nonresonant and near-resonant effects.

1) Resonant Effects:

In all materials, resonant processes result from a change in electronic properties upon resonant excitation (e.g. the absorption of light). This leads to a corresponding change in refractive index, following the Kramers-Kroenig relations.

The magnitude of an absorption change, and hence the optical nonlinearity, is directly related to the ground state absorption cross-section modified by any excited state absorption. In the case of a material with discrete states, such as molecules or quantum dots, the optical nonlinearity results from state-filling, and is related to $(\sigma_g - \sigma_e)$, where $\sigma_g$ and $\sigma_e$ are the absorption cross sections of the material in the ground and excited states respectively. For quantum dots, further enhancement of $\chi^{(3)}$ results from unique physical phenomena such as quantum confinement, local electric field effects and quantum interference effects.

As indicated above, optical nonlinearity is related to $(\sigma_g - \sigma_e)$, so that increasing the oscillator strength of optical transitions from the ground state generally increases optical nonlinearity. In the case of quantum dots, a decrease in size increases the spatial overlap of the electron and hole wave functions, in turn increasing the oscillator strength. Resonant nonlinearity therefore tends to increase with decreasing size. This enhancement, however, is limited by any size dispersion.

Another important effect arises from the presence of trap states within the quantum dot. Due to the enormous surface to volume ratio in the size range of quantum dots, most relevant traps exist on the surface. If not passivated correctly, resonant excitation of a quantum dot creates electron-hole pairs that quickly relax into these surface-states. Holes, with their relatively large effective mass, tend to trap more easily, while the lighter electrons remain largely delocalized. The result is a spatial separation of the electron and hole wavefunctions, and a decrease in oscillator strength, reducing the magnitude of the resulting nonlinearity. Furthermore, by tailoring the rate of relaxation between the delocalized quantum dot states and the localized surface states, it is possible to control the response time of the resonant optical nonlinearity.

2) Nonresonant Effects:

In contrast to resonant processes, non-resonant nonlinear effects arise from local electric fields. In a nanocomposite material in which quantum dots with dielectric constant 61 are imbedded in a matrix with dielectric constant 62, an externally applied electric field (such as that originating from an electromagnetic light source) can be locally enhanced at the particles if $\epsilon_1 > \epsilon_2$, with the magnitude of the enhancement related to $\Delta\epsilon = \epsilon_1 - \epsilon_2$. Such a situation arises by embedding quantum dots in a lower index matrix. When illuminated by light, the electric field at the quantum dot is enhanced compared to the incident external field, in turn leading to an increase in the overall nonlinear response. This enhancement increases with size as the quantum dot bandgap energy decreases, resulting in an increase in dielectric constant $(\epsilon_1)$.

Size Dependence

From the discussion above, the size dependence of both resonant and nonresonant nonlinear processes can be derived. For resonant optical nonlinearity, the magnitude of the nonlinearity increases as the quantum dot size decreases; decreases as the number of quantum dots with traps that localize electrons or holes increases; and decreases as the size dispersion increases.

For nonresonant processes, optical nonlinearity increases with increasing quantum dot size; increases with increasing index of refraction of the quantum dot; increases with decreasing index of refraction of the surrounding matrix. By carefully tailoring the specific size of the quantum dot, a combination of resonant and nonresonant effects can be used to optimize the nonlinear response of these materials.

Quantum Dot Material Dependence

One important material consideration is that for bound electrons, the optical nonlinearity generally depends on the energy gap of the material as $1/E_g^6$. The optical nonlinearity therefore increases significantly as the energy gap decreases. This trend favors a combination of large quantum dot sizes and materials with intrinsically small bandgap energies. At the same time, however, the photon energy in the wavelength range-of-interest affects the choice of material and size, in order to avoid significant linear and nonlinear absorption. Specifically, the material in the bulk form must have a bandgap roughly equal to or greater than the photon energy in the wavelength range-of-interest in order to exploit quantum confinement effects that shift the energy gap to higher energies. At the same time, to avoid multi-photon absorption effects, the energy gap of the material must be sufficiently large that the bandgap of the resulting quantum dot is greater than two times the photon energy.

For the case of nonresonant optical nonlinearities, these two concerns specify opposing trends that bracket the energy gap of the material of choice for quantum dots of the present invention. Additionally, the material in the bulk form must have an energy gap less than this bracketed energy in order to exploit quantum confinement effects that shift the energy gap to higher energies. As an example, to avoid two-photon losses in all-optical switching components operating near 1550 nm ($E_g = 0.8$ eV) and to also take advantage of the $1/E_g^6$ behavior of the nonlinear response, the quantum dot bandgap should be less than but close to 775 nm ($E_g > 1.6$ eV).

Enhanced Optical Properties

In addition to size-dependent spectral characteristics, quantum confinement also results in an enhancement in the magnitude of various optical and electronic properties due to a redistribution of the density of states. Properties such as absorption cross-section and excited-state polarizability have been found to be enhanced by several orders of magnitude over bulk materials. $\chi^{(3)}$ is also enhanced by quantum confinement, and the underlying physics is well understood.

As an example, silicon quantum dots are found to have a $\gamma$ as high as $8 \times 10^{-8}$ cm$^2$/W, 6 orders of magnitude larger than the bulk material from which they are fabricated (e.g. bulk silicon has a $\gamma$ of $8 \times 10^{-14}$ cm$^2$/W). For silicon and germanium quantum dots, $\gamma$ is plotted as a function of quantum dot concentration in FIG. 5. Also shown are $\gamma$ values for the bulk materials.

Additional Effects

While there has been much speculation and abstract analysis surrounding the potential benefits of quantum confined semiconductor structures as nonlinear optical materials, no materials have been presented with a figure-of-merit in a usable range for practical optical switching. While the physics of quantum confinement and the effects on optical nonlinearities are understood, there are additional physical requirements that have not been considered. These additional, unexpected effects constitute novel components of the present invetion:

1) The effect of Defects on FOM:

Defects within quantum dot materials can have a substantial negative impact on performance as a nonlinear optical material. Defects in the core or surface of the quantum dot yield direct absorption of below-bandgap photons, increasing optical losses, and decreasing the overall FOM. As a result, while $\chi^{(3)}$ may be high, the material is still inappropriate for optical switching. The effect of defects on optical switching in quantum dots has not been previously considered, and therefore the proposed solutions included herein constitute a significant improvement over the prior art.

One important aspect of the current invention is that for quantum dots to be used as a nonlinear optical material, they should comprise a substantially defect-free core. In this case, the term "defect" preferably refers to defects with energy below the bandgap energy of the quantum dot core, more preferably in the energy range of the wavelength range-of-interest. Additionally, the surface of quantum dots should be well passivated, such that there are substantially no defect states. Passivation can be through the inclusion of appropriate ligands in the ligand layer to bind to defect sites and remove them from the bandgap. Alternatively, passivation can be achieved by applying a shell layer to the quantum dot core to fill the defect sites. In this case, the shell material is preferably a material with energy that is higher than that of the wavelength range of interest, more preferably higher than the energy of the quantum dot core. Additionally, the shell layer should be substantially defect-free or should have defects that can be eliminated through the inclusion of appropriate surface ligands.

Figure 5:
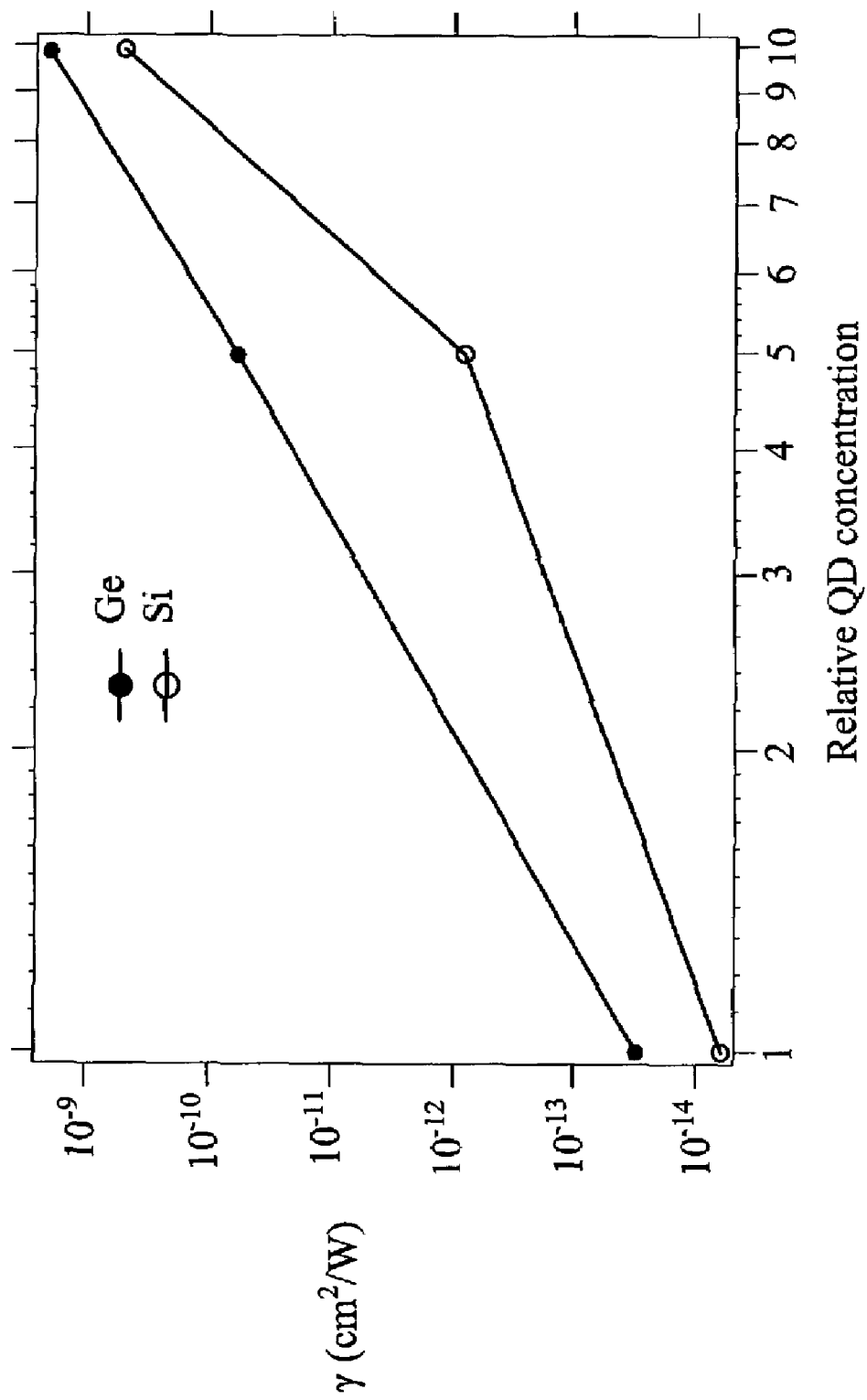
FIG. 5 illustrates concentration dependence of the nonlinearity of an engineered nonlinear nanocomposite material as a function of the concentration of silicon or germanium quantum dots within the matrix.

2) Concentration Effects:

While it has been speculated that quantum dots will have large nonlinear properties, descriptions in the prior art have dealt only with the characteristics of individual particles. Quite surprisingly, however, we have found that the nonlinear properties of a quantum dot material are substantially affected by correlated interactions between two or more quantum dots. Therefore, while $\chi^{(3)}$ is proportional to concentration at low concentrations, as the concentration increases, the individual quantum dots get close enough to interact with each other, produce collective phenomena that further enhance nonlinearity. This effect is seen in FIG. 5 where $\gamma$ increases superlinearly with concentration at high concentrations. Additional nonlinear enhancement can be induced through the appropriate selection of molecular species in the ligand layer (see discussion below on Molecular Tethers).

Summary of Nonlinear Optical Properties in Quantum Dots

Extreme enhancement and tunability of $\gamma$ in individual quantum dots and multi-quantum dot composites, combined with substantially defect free and well passivated quantum dot cores provides the engineered nonlinear nanocomposite materials of the current invention with several of the critical characteristics for an ideal $\chi^{(3)}$-based optical material: large $Re[\chi^{(3)}]$ in the wavelength range-of-interest, a multi-photon transition that can be tuned to maximize near-resonance enhancement while minimizing optical loss due to absorption, and low optical loss due to absorption by defects.

Colloidal Quantum Dots

The term quantum dot describes a family of materials comprising size-dependent properties (e.g., optical, electronic, chemical). Quantum dots have been fabricated using vapor deposition, ion-implantation, photolithography, spatially modulated electric fields, semiconductor doped glasses, strain-induced potential variations in quantum wells, atomic width fluctuations in quantum wells and a variety of other techniques. While all of these structures have size dependent optical properties, and many have been found to have a large $\chi^{(3)}$, these quantum dots are formed on or in a matrix, and can therefore not be easily incorporated into flexible or engineered optical materials or devices. In addition, it is often not possible to separate the optical properties of the quantum dots from those of the matrix, often leading to low FOM due to absorption and/or scattering by the matrix.

In a preferred embodiment, the current invention comprises colloidal nanocrystal quantum dots. Colloidal quantum dots are freestanding nanostructures that can be dispersed in a solvent or matrix. Such colloidal quantum dots are a particularly preferred material for the current invention because they can be more easily purified, manipulated, and incorporated into a matrix material.

It will be apparent to one of skill in the art that the defining characteristic for a "colloidal" quantum dot is that it is a freestanding colloid. The method of fabrication, size and shape of the particular colloidal quantum dot do not bear on its classification. Unless otherwise stated, the term "quantum dot" is herein used to refer to colloidal quantum dots.

Chemical properties

Chemically Controllable Surface

A unique physical characteristic of quantum dots is that, while the core comprises a crystalline semiconductor, the surface can be coated with a variety of different organic and/or inorganic materials. These surface coatings (e.g. shells and ligand layers) impart stability and chemical activity, as well as passivation of electrically and optically active defect sites on the quantum dot surface. These surface coatings are optionally substantially different in chemical nature than the inorganic core. As a result, while quantum dots consist primarily of a highly nonlinear semiconductor material, they appear to the surrounding as purely surface ligands. As such, the processability and chemical stability of this highly nonlinear and tunable optical material is primarily a function of the surface layer, and not the material that provides the majority of the optical characteristics.

Surface ligands are preferably bi-functional. By bi-functional, we mean that there are at least two portions of the ligand such that one portion interacts primarily with the quantum dot surface, while the second portion interacts primarily with the surrounding environment (e.g. solvent, matrix, etc.). These at least two portions may be the same or different, contiguous or noncontiguous, and are optionally contained within two or more different molecular species that interact with each other to form the ligand layer. The at least two portions can be selected from a list consisting of hydrophilic groups, hydrophobic groups or amphiphilic groups. The interaction of each of the at least two portions and the quantum dot or environment can be covalent or noncovalent, strongly interacting or weakly interacting, and can be labile or non-labile. The at least two portions can be selected independently or together.

In one aspect of the current invention, the surface ligands are selected such that the portion that interacts with the quantum dot passivates defects on the surface such that the surface is made substantially defect-free according to the definition above. At the same time, the portion that interacts with the environment is selected specifically to impart stability and compatibility of the quantum dot within a matrix that is selected for a specific application. Simultaneously satisfying both of these requirements is an important and novel aspect of the current invention, and is critical in the development of an engineered nonlinear nanocomposite material. Alternative methods of achieving this critical requirement include: 1) Passivating the surface independent of the ligand layer (e.g. using a shell or creating an intrinsically defect free surface) while the environmental compatibility is imparted by the surface ligands, or 2) imparting both passivation and environmental compatibility independent of the ligand layer.

Through the appropriate selection of surface ligands, quantum dots can be incorporated into a variety of matrices such as liquids, glasses, polymers, crystalline solids, and even close-packed ordered or disordered quantum dot arrays. These materials can be formed into homogeneous, high-quality optical films of quantum dots. Alternatively, the chemistry can be selected to allow dispersion of the quantum dots into a matrix with a controllable degree of aggregation, forming micron or sub-micron sized clusters. The result is an increased local fill-factor and an enhanced local field effect (R. W. Boyd, "Development of Composite Nonlinear Optical Materials Based on Local Field Enhancement" Publisher, pp. #-#, Date) that may further increase the nonlinear response of the nanocomposites of the present invention. Surprisingly, surface chemistry of a quantum dot is not strongly influenced by the particular size or material of the quantum dot itself. As such, this aspect of the invention effectively separates the optical properties of the quantum dot from the chemical and mechanical properties of the matrix. In this novel aspect of the current invention one can combine the highest nonlinearities of any known material with the ease of handling and processability of a standard polymer. This aspect of the present invention provides two additional features of an ideal $\chi^{(3)}$-based optical material: physical and chemical compatibility with specific device architectures, and the ability to be easily processed for incorporation.

Molecular Tethers:

In addition to conveying stability and chemical compatibility with the surroundings, the ligand layer can optionally be used to tailor the physical and optical properties of the quantum dots themselves. In this case, it is not just the chemical nature of the surface ligand, but the interaction of the surface ligand with the quantum dot that imparts an additional level of control over the physical and/or optical properties of the material. We refer herein to any molecular group chemically attached to the surface of a quantum dot that imparts additional functionality to the quantum dot as a "molecular tether". In some cases, the molecular tether can be electrically active, optically active, physically active, or chemically active. The inclusion of molecular tethers into a quantum dot structure is one novel aspect of the present invention.

Active species are used to precisely control the electrical, optical, transport, chemical and physical interactions between quantum dots and the surrounding matrix or the properties of single quantum dots. For instance, a conjugated bond covalently bound to the surface of one or more quantum dots may facilitate charge transfer out of the one quantum dot and into another. Similarly, a physically rigid active group bound in a geometry normal to the surface of a quantum dot can act as a physical spacer, precisely controlling minimum interparticle spacing within an engineered nonlinear nanocomposite material.

As described above, high-concentration collective phenomena are an important aspect of the current invention. This aspect can be further enhanced by allowing individual quantum dots to interact with one another using conducting molecular tethers. At sufficiently high number densities, the molecular tethers begin to make contact with molecular tethers from other quantum dots or with other quantum dots directly. This can serve to augment nonlinearity by controlling the interaction between quantum dots and thus increasing the degree of collective phenomena compared to single particle phenomena. Tethers may include, but are not limited to conjugated polymers, aromatic compounds, or molecules with donor-acceptor pairs. These tethers foster electron delocalization or transport and thus increase the interaction between quantum dots. Additionally, the molecular tethers can be selected to facilitate high quantum dot number densities without detrimental aggregation that universally plagues high concentration systems.

Molecular tethers can also be selected to impart stability of quantum dots under ambient conditions. Molecular tethers can optionally contain chemically active groups to allow quantum dots to be attached to polymer backbones, along with other active molecules. This provides a method for controlling the density of quantum dots within close proximity of molecules that influence a variety of functions such as carrier transport or delocalization.

An additional aspect of the present invention is the use of molecular tethers to physically connect two or more quantum dots in a 2D or 3D structure. Such quantum dot superstructures can be created to initiate multiple dot quantum interference interactions yielding new and useful properties such as enhanced, nonsaturating optical nonlinearities. The length and properties of these tethers can be tailored to enhance or generate specific quantum phenomena. These nanostructures can have the properties of single quantum dots or an ensemble of quantum dots, the degree to which will be determined by the nature of the molecular tethers.

The quantum dots described in this patent also exemplify microscopic embodiments of the conditions that enhance the nonresonant optical nonlinearity arising from local electric field effects described above. Whether the quantum dot surface is terminated with oxide or other molecular tethers, the result is a particle (the quantum dot) with dielectric constant $\epsilon_1$ surrounded by a matrix (the surface oxide layer or molecular tethers) with dielectric constant $\epsilon_2$ where $\epsilon_1 > \epsilon_2$. Therefore, the enhancement of the nonresonant optical nonlinearity can be engineered by the judicious choice of oxide or molecular tether without resorting to a surrounding bulk matrix. In other words, a single quantum dot as described in our patent should exhibit an enhanced nonresonant optical nonlinearity since the surface layer functions as the surrounding matrix with a lower dielectric constant. Optionally, molecular tethers can connect quantum dots together using. In this case, an extrinsic matrix is not required since the individual interconnected quantum dots exhibit an enhanced local electric field effect.

Our approach of attaching appropriate molecular tethers to a quantum dot surface can be thought of as essentially treating a quantum dot as a very large molecule (macromolecule) and the molecular tethers as derivatizations of this molecule. This creates a large three-dimensional structure with enhanced nonlinear optical properties resulting from the combination of quantum effects from the quantum dot and carrier polarization and delocalization effects from the molecular tethers, and from the interaction of these two effects. These properties can be tailored by the choice of molecular tethers. In addition, a quantum dot can also represent a large and stable reservoir of polarizable charge that also contributes to a large nonlinear optical response.

Macroscopic Quantum Dot Solids

While quantum dots can be dissolved in a variety of matrix materials, it has also been shown that macroscopic solids can be fabricated in which quantum dots form a close-packed material in the absence of any extrinsic matrix. These "quantum dot solids" can either be crystalline, polycrystalline or amorphous. While containing an extremely high density of quantum dots, quantum dot solids are still easily processed since, during formation, the quantum dots are dispersed in a solvent that is subsequently removed. Uniform solid quantum dot films, for instance, can be created using standard spin-coating techniques (Kagan et al., PRL 1997). In addition, surface ligands can still be selected to impart solvent compatibility and appropriate chemical stability to the final material. In contrast to the interconnected material described above, these macroscopic quantum dot solids are not held together by molecular bonds, but rather Van der Walls forces.

High-quality optical materials have been fabricated from quantum dot solids with substantially homogeneous optical properties throughout the material. The density of dots can be tuned by modifying the length and structure of the surface ligands. Careful selection of surface ligands can produce continuously tunable densities up to a maximum fill-factor of 74% when the ligand layer is removed completely by heating or chemical treatment after the solid is formed. By combining the ability to create density-controlled quantum dot solids with variable density quantum dots in a support matrix, the concentration of quantum dots, and therefore the index of refraction of the materials described herein, can be tuned over many orders of magnitude.

In the case of quantum dot solids, the surface ligands take the place of an extrinsic material as the "matrix" in the current invention. In the case of close-packed quantum dots, in which the ligands have been removed, the quantum dots themselves are considered to form their own "intrinsic matrix". It should be understood that the term "matrix", as used herein and in the appended claims, refers to both intrinsic and extrinsic matrices.

Quantum dot solids can be fabricated in a variety of ways, some of which are described in Murray et al, Science, 1995 and Kagan et al, PRL, 1997, both of which are included herein by reference. These materials can be fabricated with a variety of different quantum dot materials, sizes and size distributions. It is also possible to form mixed quantum dot solids comprising a plurality of materials, sizes and size distributions.

Engineerable Nonlinear Nanocomposite Materials

In one embodiment, the present invention comprises an engineered nonlinear nanocomposite material that combines the large nonlinear and size dependent optical properties of quantum dots with the processability and chemical stability of an independent matrix and/or chemically controlled quantum dot surface. By separately selecting the size and material of the quantum dot, the surface ligands, the matrix material and the density of quantum dots within the matrix, one can independently tune all significant materials characteristics in designing an ideal nonlinear optical material.

In particular, this aspect of the present invention comprises the following characteristics that, taken together, in part or in whole, provides a substantially improved nonlinear optical material over what is know in the art:

1) The effects of quantum confinement and the specific selection of quantum dot material is used to create extremely large $Re[\chi^{(3)}]$ in the wavelength range-ofinterest, while the energies of single- and multi-photon absorption features are selected to minimize absorptive loss and heating, and optimize near-resonant enhancement effects.

2) The matrix material is selected, independent of the quantum dot material and size, with the desired chemical and mechanical properties to impart physical and chemical compatibility with the specific device architecture and materials, as well as the method and process of incorporation into devices.

3) The surface ligands of the quantum dots are selected to facilitate homogeneous incorporation of the quantum dots into the selected matrix material, and are optionally selected to facilitate controlled aggregation of quantum dots within the selected material.

4) The density of quantum dots in the matrix material is selected to precisely tune the linear index of refraction to match the boundary conditions for a given device architecture (in the case of high-index materials, a quantum dot solid with an "intrinsic matrix" can be used).

EXAMPLE 1

As an example of how the current invention is used, we now describe a preferred embodiment in which an engineered nonlinear nanocomposite material is incorporated into a waveguide nonlinear directional coupler. In the current example, the waveguide core is fabricated from doped silica with an index of refraction of 1.52 at 1.55 $\mu$m. It will be obvious to one of skill in the art that doped silica can have an index of refraction over a wide range of values. The current example is not meant to limit the scope of the invention, and it will be understood that variations on this example can extend to waveguides with an arbitrary index of refraction.

In the case of a nonlinear optical coupler, light is evanescently coupled between two waveguides such that a signal entering one waveguide oscillates between the two as a function of the interaction length. By choosing an appropriate length, the light can be coupled completely into one or the other of the two output waveguides. By changing the index of refraction between the waveguides, it is possible to switch the output waveguide to which the light is coupled for a fixed length device. An index change from a $\chi^{(3)}$-based nonlinear material can yield extremely fast optical switching, however, so far no single material has been appropriate for a commercial switch based on this device.

The active material in this device must have a high nonlinear response in the wavelength range-of-interest. It is also desirable to maximize near-resonant enhancement, while simultaneously avoiding significant single-or multi-photon absorption. At the same time, the linear index of refraction must be less than that of the core material and be close to that of the rest of the cladding to avoid disruption of the optical mode as light is guided into the active region.

In this example, depicted in FIG. 6A, FIG. 6B, FIG. 6C, FIG. 6D, FIG. 6E, and FIG. 6F, the device comprises a doped silica waveguide core (n=1.52) fabricated on a doped silica substrate (n=1.515) (FIG. 6A). The other three sides of the waveguide core are initially surrounded by air (n=1), as is the space between the waveguide cores in the interaction region. The space around the waveguide cores is then filled with an engineered nonlinear nanocomposite (n=1.515) to match the waveguide boundary conditions of the substrate. By illuminating the interaction region with the trigger-pulse, only the index of refraction between the waveguide cores is changed, activating the switch.

A preferred engineered nonlinear nanocomposite material for this example comprises silicon oxide coated silicon quantum dots and a poly(methyl methacrylate) polymer matrix (PMMA; n=1.49). PMMA is chosen here due to its ideal optical properties for use in the 1.55 $\mu$m range and its ease of processing in waveguide devices.

In order to optimize switching at 1.551 μm, silicon quantum dots with a diameter of around 4 nm are used, placing the 2-photon absorption peak at higher energy than the spectral energy range-of-interest. This is sufficient to minimize 2-photon absorption that may result in signal loss and heating, while maintaining a significant resonance enhancement at the wavelength of the trigger pulse. This particular combination of material and size also yields a maximum in $\chi^{(3)}$ at 1.55 μm.

To facilitate incorporation of the quantum dots into the PMMA matrix, the silicon quantum dots are coated with a ligand layer comprising a long-chained hydrocarbon with a methacrylate functional group on the end. Alternatively, any functional group compatible with a PMMA matrix can be used. Quantum dots and PMMA are dissolved in an organic solvent such as toluene, and applied to the waveguide device (FIG. 6B). The concentration of PMMA is determined based on the desired thickness of the final material and the method of application. In the case of spin-coating, a 5% PMMA solution is appropriate. The concentration of quantum dots is selected such that the final material, after deposition, has a linear index of refraction of 1.515. This is determined by calibrating the initial concentration of quantum dots (as measured by the absorption characteristics) to the final index of refraction of a PMMA-quantum dot film deposited in the method to be used. The linear index of the film can be measured using ellipsometry or the like.

After spinning the polymer-quantum dot solution over the device, the solvent is allowed to evaporate, leaving an engineered nonlinear nanocomposite coated waveguide device (FIG. 6C). The index of refraction around all sides of the waveguide is matched and optimized for the specific device. At the same time, $\chi^{(3)}$ and the resonance conditions for 1.55 μm are independently tuned for optimum switching performance. As a final aspect of the current embodiment, based on the known intensity of the trigger-pulse, and the resulting nonlinear response of the engineered nonlinear nanocomposite material, the active length of the device is selected to provide optimal switching performance. This can be done by limiting the illumination area of the trigger-pulse to define the active area (FIG. 6D) or by designing the specific waveguide structure with the appropriate interaction length (FIG. 6E). The actual active length can be determined empirically or through simulation.

By increasing the index of refraction of the waveguide core, substantially larger concentrations of quantum dots can be incorporated into the active material while retaining functionality of the switch. This can yield substantially higher switching efficiency. For example, with a silicon-core having an index of refraction of ~3.4, the active material is restricted to having an index of refraction preferably less than 3.39 to achieve efficient waveguiding through the active region. This allows densities as high as those of close-packed quantum dot solids (either crystalline or amorphous) (FIG. 6F).

EXAMPLE 2

To highlight the flexibility of the current invention, a second preferred embodiment is included to demonstrate how the current invention may be used in a waveguide nonlinear Mach-Zehnder interferometer (MZI). In this case, the waveguide core is fabricated from partially oxidized silicon with an index of refraction of 2.4 at 1.55 μm. Once again, it will be apparent to one of skill in the art that partially oxidized silicon can have a range of indices of refraction, and that 2.4 is not meant to limit the scope of the invention. Variations on this example comprising other possible indices are expressly assumed and claimed under this patent.

In a nonlinear MZI, a data signal traveling along a waveguide core is split into two separate and uncoupled waveguide arms with a defined phase relation between them. The signals travel along the arms for a predetermined length and are then recombined. Phase differences resulting from the history of the light in each arm result in constructive or destructive interference of the signals in the output waveguide core. By modulating the index of refraction of one or both of the arms, the output signal can be switched on or off by creating a relative 0- to π-phase shift between the signals. An index change from a $\chi^{(3)}$-based nonlinear material would yield extremely fast optical switching, however, so far no single material has been appropriate for a commercial switch based on this device.

As with the example above, the active material in this device must have a high nonlinear response in the wavelength range-of-interest, near-resonant enhancement and no significant absorption. In this case, however, the nonlinear material is incorporated directly into the waveguide core. As such, the index of refraction of the engineered nonlinear nanocomposite must be greater than that of the cladding material and be close to that of the core to avoid disruption of the optical mode as light moves into the active region.

Figure 7A:
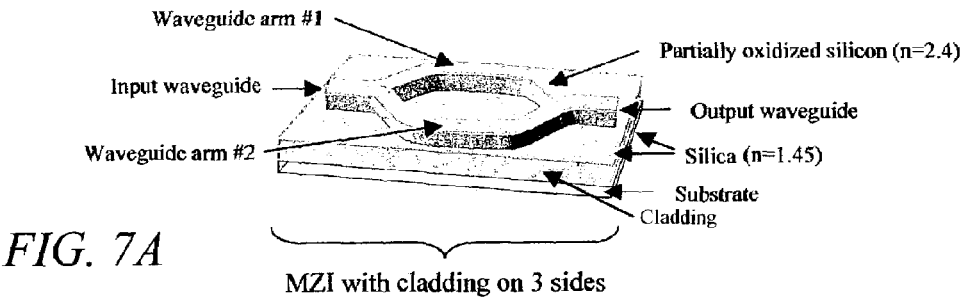
FIG. 7A, FIG. 7B, FIG. 7C, FIG. 7D, FIG. 7E, and FIG. 7F illustrate one embodiment of a nonlinear MZ interferometer comprising an engineered nonlinear nanocomposite material.
Figure 7B:
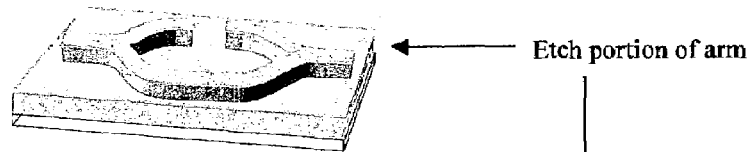

In this example, depicted in FIG. 7A, FIG. 7B, FIG. 7C, FIG. 7D, FIG. 7E, and FIG. 7F, the device comprises a partially oxidized waveguide core (n=2.4) fabricated on a silica substrate (n=1.45) and surrounded by silica on three sides (FIG. 7A). The top of the waveguide is bounded by air (n=1). A section of one of the waveguide arms is etched away (FIG. 7B), and then filled with an engineered nonlinear nanocomposite (n=2.4) to match the boundary conditions of the waveguide core. By illuminating the active region with the trigger-pulse, the index of refraction in one arm is changed, activating the switch. A preferred engineered nonlinear nanocomposite for this example comprises silicon oxide coated silicon quantum dots formed into a close-packed quantum dot solid with index of refraction tuned to 2.4.

In order to optimize switching at 1.55 μm, silicon quantum dots with a diameter of 4 nm are used, placing the 2-photon absorption peak at higher energy than the spectral energy range-of-interest. This is sufficient to eliminate 2-photon absorption that may result in signal loss and potential heating of the device by the trigger-pulse. This particular combination of material and size also yields a maximum in $\chi^{(3)}$ at 1.55 μm.

In order to achieve precise index of refraction control within the waveguide arm, surface ligands must be selected to yield a specific particle-to-particle spacing within the final quantum dot solid. This can be achieved by measuring the index of refraction of thin-films, formed by the method to be used, with quantum dots comprising each type of surface ligand. By using ellipsometry or the like, the index resulting from each surface ligand and deposition method can be determined and calibrated for determining the optimum conditions for the final device deposition. In the case of the present example, an index of 2.4 corresponds roughly to a packing density of 70%. A short-chained hydrocarbon is preferable in this case, such as a butyl- or a polybutyl-group.

The quantum dots, in a solvent of hexane or toluene, are spin-coated over the surface of the device, filling the open region of the waveguide arm. A slow spin speed is preferable, since the thickness of the material in the waveguide arm can be controlled by polishing the overflow off the surface (<1000 rmp). The concentration of quantum dots in the solution should be high, preferably in the range of 10 $\mu$M to 1 mM.

Figure 7C:
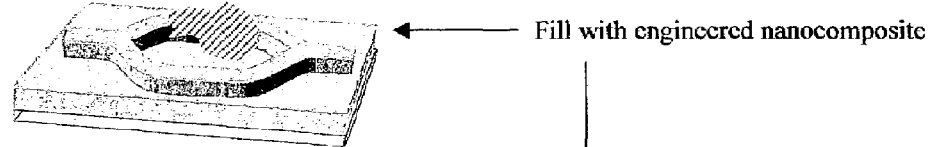
Figure 7D:
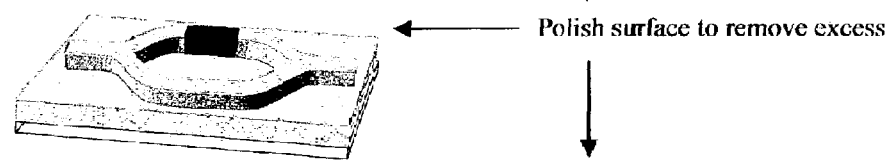
Figures 7E, 7F:
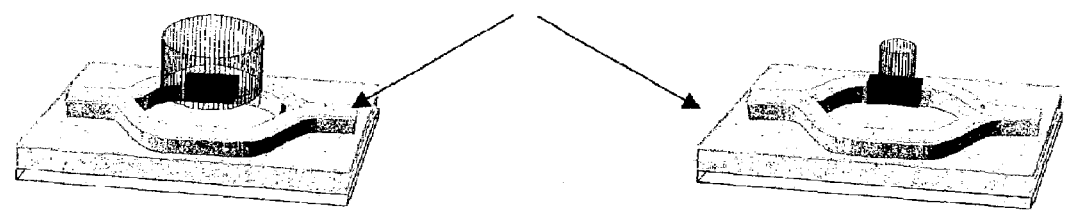

After spin-coating, the solvent is allowed to evaporate, creating a close-packed quantum dot solid, filling the open region of the waveguide arm (FIG. 7C). The surface is then polished to provide an optical-quality interface on the topside of the waveguide in the active region (FIG. 7D). The index of refraction of the engineered nonlinear nanocomposite is matched to that of the waveguide core of the arm, and optimized for the specific device. At the same time, $\chi^{(3)}$ and the resonance conditions for 1.55 $\mu$m are independently tuned for optimum switching performance. As a final aspect of the current embodiment, based on the known intensity of the trigger-pulse, and the resulting nonlinear response of the engineered nonlinear nanocomposite, the active length is selected to provide optimal switching. This can be done by designing the etched length of the waveguide arm to the desired active length (FIG. 7E) or by limiting the illumination area of the trigger-pulse (FIG. 7F). The specific active length can be determined empirically or through simulation.

Figure 8A:
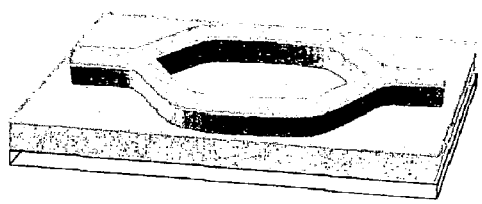
FIG. 8A, FIG. 8B, FIG. 8C, and FIG. 8D illustrate an alternative embodiment of a nonlinear MZ interferometer comprising an engineered nonlinear nanocomposite material.
Figure 8B:
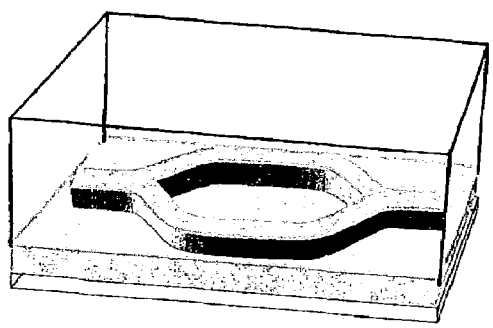
Figure 8C:
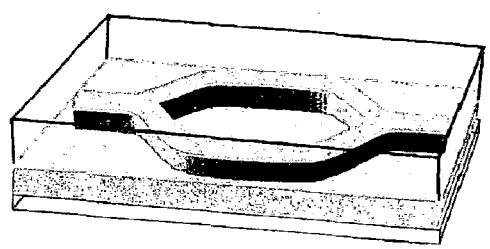
Figure 8D:
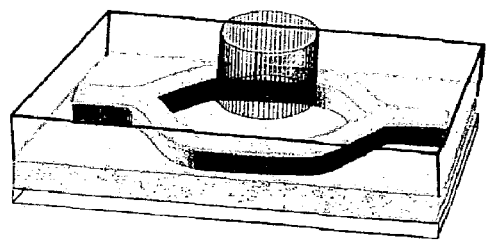

Alternatively, the nonlinear MZ interferometer described above can be fabricated without etching any portion of the waveguide core (FIG. 8A, FIG. 8B, FIG. 8C, and FIG. 8D). In this case, the engineered nanocomposite can simply be cast on top of the entire device (FIG. 8B), such that the active material is in evanescent contact with the signal passing through each of the arms (as well as everywhere else) (FIG. 8C). By illuminating only one portion of one or both arms, the active region can be defined (FIG. 8D). In this preferred embodiment, the engineered nonlinear nanocomposite must be designed to have an index of refraction that is compatible with waveguiding in the partially oxidized silicon core (e.g. n<2.4). Again, this nanocomposite is preferably a close-packed quantum dot solid.

Note: Had further chemical processing steps been required in either of the above examples, it would also be possible to select the matrix and/or surface ligands to impart stability of the engineered nonlinear nanocomposite under the required conditions.

The current embodiments not only provide a nonlinear material with a dramatically increased nonlinear response for use in these waveguide devices, they simultaneously provide materials that have been engineered to have optimum linear index of refraction, 2-photon absorption, near-resonance enhancement and processability for each application. This level of independent control of optical, chemical and mechanical properties does not exist in any presently known material.

Preferred Quantum Dot Materials

As described above, the present invention comprises substantially defect free quantum dots with a well-passivated surface. Preferred quantum dots also comprise a bandgap energy that is preferably greater than the wavelength range-of-interest, more preferably greater than twice the wavelength range-of-interest for its intended applications. While maintaining these requirements, the material and size of the quantum dots are interchangeable. The specific material and size are selected as necessary to engineer the optical characteristics for a particular application. There are, however, certain preferred characteristics:

a) Core-shell Quantum Dots:

Core-shell quantum dots are particularly preferred in the current invention because at the surface of a quantum dot core, defects can result in traps for electrons or holes. These traps can degrade the electrical and optical properties of the quantum dot, yielding, low-energy states within the bandgap of the material. An insulating layer at the surface of the quantum dot provides a rise in the chemical potential at the interface, which can eliminate energy states that serve as traps. Surprisingly, these trap states can actually interfere with efficient switching or decrease the FOM of a material by contributing to single or multi-photon absorption. Additionally, shells act to physically protect the core material from chemical interactions such as oxidation, reduction, or dissolution. For instance, one novel aspect of the present invention is the use of a shell to stabilize intrinsically unstable silicon quantum dots. Optionally, the shell can provide an appropriate chemical surface for covalent or non-covalent binding of molecules to the quantum dot, wherein the core material may or may not provide an appropriate surface for such binding.

Preferably, the core will be crystalline, and be substantially defect-free. By defect free, it is meant that within the crystalline core there is substantially fewer than 1 defect per quantum dot, preferably less than 1 defect per 1000 quantum dots, more preferably less than 1 defect per 106 quantum dots, more preferably less than 1 defect per $10^9$ quantum dots.

b) Size and Size-Distribution:

Another preferred characteristic of the quantum dots of the present invention is a substantially monodisperse size distribution. The reason for this is that size-dependent optical properties result in a broadening of spectral characteristics in the presence of a distribution of sizes. This can yield reduced FOM and switching efficiency. One novel aspect of the present invention is limiting the size distribution of quantum dots to be substantially monodisperse, which results in substantially improved switching efficiency over all prior art descriptions of quantum dots as a nonlinear materials. This prior art has not considered in detail the effects of size distribution and specifically how the FOM of switching depends on the quantum dot size.

c) Shape and Shape Distribution

Quantum dots have been fabricated in a plurality of shapes, including spheroids, rods, pyramids, cubes, and other geometric and non-geometric shapes. Since these structures are not spherically symmetric, a distribution of orientations results in an effective broadening of the size distribution as seen by incident light. To avoid the need for orientation of quantum dots within the matrix, the preferred quantum dot shape is spherical. Spherical quantum dots are also preferred for nanocomposites comprising oriented quantum dots. Alternatively, another preferred embodiment comprises spheroid quantum dots, with an aspect ratio restricted to between 1+/−(% size distribution). In this case, orientation plays an insignificant role in the inhomogeneous broadening of the spectral features. For similar reasons, the preferred quantum dot will also be substantially monodisperse in shape. These restrictions constitute an improvement over all prior art descriptions of quantum dots as a nonlinear material, which have not considered the importance of shape and shape-distribution.

In light of the current invention, it will be evident to one of skill in the art that an arbitrary shape may still be preferred as long as the relative orientation dependence of the broadening of the linear and nonlinear optical properties is less than the broadening resulting from the size distribution of the quantum dot sample.

d) Crystal Structure of the Core

For reasons similar to those described above for shape, preferred quantum dots will have a core with a crystal structure that is spherically symmetric, more preferably a cubic crystal structure. Alternatively, the crystal structure may be non-spherically symmetric, preferably cylindrically symmetric, more preferably a wurtzite crystal structure.

In light of the current invention, it will be evident to one of skill in the art that an arbitrary crystal structure may still be preferred as long as the relative orientation dependence of the broadening of the linear and nonlinear optical properties is less than the broadening resulting from the size distribution of the quantum dot sample. Once again, the limitations described here constitute an improvement over all prior art descriptions of quantum dots as a nonlinear material, which have not considered the importance of crystal structure.

e) Semiconductor Materials

There are a variety of preferred quantum dot materials for the current invention. For any given application, the preferred materials are determined based on the specific optical requirements for that application. These include but are not limited to inorganic crystals of Group IV compounds, including but not limited to Si and Ge; Group II–VI compounds, including but not limited to ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe and BaO; Group III–V semiconductor compounds, including but not limited to AlN, AlP, AlAs, AlSb, GaN, GaP, GaAs, GaSb, InN, InP, InAs and InSb; and tertiary or alloyed compounds of any combination between or within these groups, in particular, GeSe, SnS, SnSe, PbS, PbSe, PbTe ZnGeAs$_2$, ZnSnP$_2$, ZnSnAs$_2$, CdSiAs$_2$, CdGeP$_2$, CdGaAs$_2$, CdSnP$_2$, and CdSnAs$_2$.

Quantum dots of most semiconductor materials can be fabricated by a variety of methods known in the art. Some preferred synthetic methods include those described for Group III–V and Group II–VI semiconductors; described in U.S. Pat. Nos. 5,251,018; 5,505,928; 5,262,357 and 5,990, 479, and in Murray et al. (*J. Am. Chem. Soc.*, 1993, 115, 8706), and in the thesis of Christopher Murray, "Synthesis and Characterization of II–VI Quantum Dots and Their Assembly into 3-D Quantum Dot Superlattices", Massachusetts Institute of Technology, September, 1995, which are all hereby incorporated in their entireties by reference.

The fabrication of some types of shells on quantum dots is also known in the art. Preferred methods include those described in "Epitaxial Growth of Highly Luminescent CdSe/CdS Core/Shell Nanocrystals with Photostability and Electronic Accessibility", by Peng et al., published in the *Journal of the American Chemical Society*, Volume 119, No. 30. 1997, at pages 7019–7029, and "(CdSe)ZnS Core-Shell Quantum Dots: Synthesis and Characterization of a Size Series of Highly Luminescent Nanocrystallites", by Dabbousi et al., published in *The Journal of Physical Chemistry B*, Volume 101, No. 46, at pages 9463–9475; and Hines et al., the subject matter of which are hereby incorporated by reference.

Two preferred materials for use in the present invention are silicon and germanium. Both Si and Ge have energy gaps that are less than 1.6 eV, making them ideal materials from which to fabricate quantum dots that exploit quantum confinement to enhance optical nonlinearities at telecommunications wavelengths (0.8 eV). The ideal chemistry of Group IV materials (as discussed above) further solidifies these choices.

In addition, the electron affinity or ionization potential of Group IV materials (e.g., Si and Ge) makes them amenable to forming strong covalent bonds with organic surface ligands, making them ideal for this purpose. In addition, the chemical properties of Si are such that a stable oxide can be formed that serves to confine the carriers and to passivate the surface to mitigate surface traps.

A Novel Quantum Dot Material

In one embodiment, the quantum dots of the current invention are silicon oxide coated silicon quantum dots, herein referred to as SiQDs, a novel type of silicon quantum dot that is stable under ambient conditions (e.g. pressure: 1 atmosphere; Gases: 70% nitrogen, 30% oxygen; Temperature: 20–25 C.). A SiQD is a quantum dot material that is stable under ambient conditions for extended periods of time and additionally has the general chemical formula Si$_x$O$_y$R$_z$. The SiQD comprises a substantially defect free silicon crystal core of diameter between 1 and 10 nm, a SiO$_q$ shell surrounding the silicon core, with a thickness of between 0.1 and 5 nm, and q ranging between 0 and 2, potentially varying continuously throughout the shell, optionally varying discontinuously throughout the shell. The SiQD optionally comprises a ligand layer comprising organic molecules with a structure R. R can be any one of a plurality of hydrophobic, hydrophilic or amphiphilic molecules (a list of preferred molecules is included below), and ranges from a surface coverage of available silicon and oxygen binding sites from 0% to 100% surface coverage, with a maximum of a complete monolayer of organic ligands. R can optionally comprise a plurality of different organic molecules at a plurality of absolute and relative densities. Finally, a SiQD may optionally comprise additional R-groups that do not interact directly with the quantum dot surface, but rather indirectly through other R-groups interacting directly with the surface. In this case, a greater than 100% surface coverage is possible.

It has long been considered that the production of an ambient-stable silicon quantum dot with a defined oxide-shell could not be fabricated due to difficulties in growing a stable and trap-free surface oxide shell (ref Fauchet PRL: M. V. Wolkin, J. Jorne, P. M. Fauchet, G. Allan, C. Delerue, *Phys. Rev. Lett.* 82, 197 (1999).). Thus, the teachings of the present invention represent a substantial advance over the prior artMethods for fabricating SiQDs in accordance with the invention are discussed below. It should be noted, however, that the current invention refers to SiQDs synthesized by any method such that they substantially resemble the quantum dots of the current invention. The current invention has specifically contemplated every possible variation of composition of SiQD that could be made while retaining the general characteristics of a substantially crystalline Si core and a substantially noncrystalline oxide shell. All such variations are to be considered as being specifically disclosed herein.

One method of formation of a quantum dot of the invention is as follows:

Porous silicon (PSi) is formed by various standard and published methods that include, but are not limited to, anodic electrochemical etching of p-doped or n-doped silicon. One novel, preferred method includes starting with p-type (e.g., Borondoped) silicon (Si) wafers comprising a plurality of orientations, with the (100) orientation being preferred. The wafer resistivity preferably ranges from 0.01 Ω-cm to as high as 25 Ω-cm. The wafer is preferably 500–600 microns thick. Electrical contact to the wafer is made through a thin layer of metal (e.g., aluminum or platinum; preferably 100–500 microns thick) deposited on the backside of the wafer. Anodic electrochemical etching is performed on these wafers, which are placed in a solution comprising hydrofluoric acid (HF), ethanol, and water. The weight percentage of ethanol to HF ranges from 0% to 60%, preferably 45 to 55% in water. Various conducting materials can be used as the counter electrode in which metals are an example. Examples of such metals include, but are not limited to, aluminum, copper, brass, and platinum.

The metal layer making electrical contact with the silicon wafer may optionally be protected from erosion in the acidic solution by isolating the metal from the solution. This can be achieved by sealing the silicon surface with a gasket such that the etching solution is only in contact with the silicon side of the substrate. Alternatively, the electrode metal can be selected to be relatively inert under the selected etching conditions or can be selected with a thickness great enough to withstand the etching procedures described below.

Electrochemical etching of the Si wafer is carried out for various time durations (which can range from 2 to 200 minutes, depending on the starting parameters) using a constant current density ranging from 5 to 1000 mA/cm$^2$. After etching, the surface of the Si wafer is left with a thin layer of nanostructured material comprising PSi.

The PSi is optionally rinsed with deionized water, dried under a stream of nitrogen gas and placed in a vacuum chamber. The chamber is evacuated to a moderate pressure for several hours, preferably less than 1 Torr, more preferably less than 500 mtorr and most preferably less than 100 mTorr. The samples are then transferred to a solvent-free environment (e.g., a drybox). The nanostructured PSi layer is then mechanically removed or scraped (which can be accomplished, e.g., with a knife edge or scalpel) from the Si substrate and the removed material is collected. The nanostructured PSi layer can also be separated from the Si wafer through a second electrochemical etching process in which low concentration HF/H$_2$O (preferably between 0.5 and 2%) and a high current density (preferably greater than 160 mA/cm$^2$) is used for a few minutes to separate the anodized and nanostructured PSi layer from the Si substrate.

After the PSi layer has been separated from the silicon substrate, the PSi is ground into a fine powder (using, e.g., a motor and pestle or a mechanical agitator) and a solvent is added to the powdered PSi. Preferred solvents include, but are not limited to, acetonitrile, toluene, methanol, ethanol, and water. In the case of organic solvents, the solvent may be dried over a dehydrant (e.g., calcium hydride or magnesium sulfate), distilled and degassed prior to being added to the PSi. The resulting mixture of PSi and solvent is placed in an ultrasonic bath and sonicated for a period of time that ranges from 1 to 20 days with a preferred sonication time of 10 to 12 days. Upon removal from the ultrasonic bath, the mixture is allowed to settle, centrifuged, and the supernatant is filtered to remove any large particles. Preferred filters range between pore sizes of 20 nm to 450 nm. The resulting filtrate comprises a colloidal suspension of oxide terminated Si quantum dots (SiQDs) of various sizes that are stable in ambient conditions (room temperature, pressure, and atmosphere). The average size of the quantum dots in the mixture can be controlled by varying the duration of ultrasonication. In general, longer ultrasonication durations give smaller average quantum dots. The precise relationship between ultrasonication time and the average quantum dot size that results depends on several parameters that need to be calibrated with each specific fabrication setup and conditions. Examples of relevant parameters include the size distribution of the nanostructures in the PSi layer prior to ultrasonication, the solvent, and the power or strength of the acoustic energy of the ultrasonication device. In one example that may serve as a rough point of reference, an ultrasonication period of 12 days resulted in quantum dots with an average size of ~1.5 nm in diameter.

More precise size control of the final quantum dots can be achieved by irradiating the sample with light during ultrasonication. The light source can be a lamp (e.g., Tungsten, Xenon, Mercury), a light emitting diode (LED), a laser or any other light source capable of emitting light at the appropriate wavelengths, where "appropriate wavelengths" is described below. Alternatively, irradiation can be implemented during the electrochemical etching process (in which the etched surface of the Si wafer is irradiated). The size of the quantum dots that result is determined by a number of parameters including wavelength, intensity, spectral bandwidth, and duration of irradiation. Preferably, the wavelength of irradiation should be within the spectral region where the light is absorbed by at least a subset of the quantum dot sizes to be controlled. Specifically, within a size distribution of quantum dots, the longer the wavelength of the irradiation, the larger the size of the resulting quantum dots. This effect can be accentuated by increasing the duration and/or intensity of irradiation. For any specific set of synthesis parameters, the precise relationship between irradiation wavelength and quantum dot size needs to be calibrated.

The use of light to control the physical size of the quantum dots in this synthetic process is a particularly novel aspect of the present invention, and is specifically claimed herein. There has been no previous description of optical control over the physical parameters of quantum dots in any synthetic method. This aspect of the invention is also applicable to all other quantum dot synthetic procedures and is not limited to those described in this application.

Overall, the average size and size distribution of the resulting SiQDs can be precisely controlled by varying the duration of ultrasonic processing, the strength or intensity of the acoustic energy of the ultrasonication device, the photon wavelength (photon energy) of irradiation, the intensity of irradiation, and the duration of irradiation. We have shown that the average quantum dot size can be varied from ~1 nm to greater than 6 nm with this technique. These average sizes give rise to light emission from the infrared to the ultraviolet.

PSi can also be made with n-doped Si wafers. In this case, a process similar to that described above can also be used to fabricate PSi. However, the electrochemical etching process may be performed in the dark and the wafer illuminated with a light source (UV light being the preferred) during etching.

Alternatively, PSi can be fabricated using n-doped Si wafers. In this case, a process similar to that described above can be followed. However, the electrochemical etching process may be performed in the dark and the wafer must be illuminated with a light source (UV light being the preferred) during etching in order to generate "holes" (as opposed to electrons) needed in the etching process.

In the synthesis above, the reactants and starting materials can be replaced with the germanium counterparts for the formation of GeQDs.

The synthetic process described above is a particularly novel aspect of the present invention, and is specifically claimed herein. The uniqueness is manifested in, but is not restricted to, the following properties of the resultant quantum dots: (1) stability of the QDs in ambient conditions, (2) control over the size of the QDs such that the light emission can be size-tuned from the red to the ultraviolet, (3) control over the size of the QDs such that the nonlinear optical properties give large Figures-of-Merit for all-optical switching, (4) the nonlinear optical properties are such that all-optical switching occurs in a very short time (less than 60 fs switching time), (5) low switching energy (<1×10$^{-12}$ Joules), (6) non-degenerate all-optical switching where the wavelengths of the relevant beams can be de-tuned from each other over a very broad spectral range (>100 nm) and still maintain effective all-optical switching, (7) all-optical switching can occur throughout a broad wavelength range (nominally 700–1600 nm).

In an alternative embodiment, quantum dots of the present invention can be fabricated from chemical precursors. The present invention provides a general method for high yield, low temperature solution-based synthesis of functionalized silicon and germanium quantum dots. The invention avoids the severe conditions (e.g., high pressure and temperature) typically associated with such elemental synthesis known in the art. The method can be described by reference to the following:

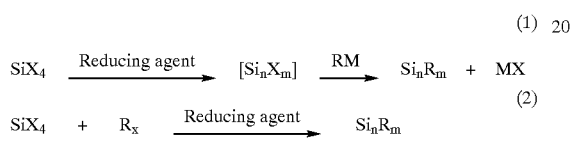

wherein
X=Cl, Br, I, OAc, R$_1$R$_2$N, RO, RS, etc.
Preferably, M=Li, Na, K, Mg, Zn or Cu salts
R=Alkanes, Alkenes, Alkyne, etc. (see the section on surface ligands)

Reducing agents and processes
1) Activated Metals
   Group IA (Li, Na, K, Rb, Cs)
   Group(IIA) Be, Mg, Ca, Sr, Ba
   Transition Metals (Ti, Zr, Mn, Fe, Co, Ni,Pd, Cu, Zn, etc.)
   lanthanides (Ce, Sm, etc.)
2) Hydrides
   Al=LiAlH$_4$, NaAlH$_4$, AlH$_3$, Red-Al, etc
   B=LiBH$_4$, NaBH$_4$, B$_2$H$_6$, Super-Hydride, L-Selectride, etc.
   Si=SiH$_4$, RSiH$_3$, R$_2$SiH$_2$, R$_3$SiH, etc.
3) Electrochemical reduction The basic strategy involves reduction of SiX$_4$ (or GeX$_4$) and subsequent substitution with organic nucleophiles. The functionalization of these quantum dots allows functional group inter-conversion at the surface with appropriate organic reagents (equation 1). The organic functionalization of these quantum dots imparts favorable solubility and compatibility in organic solvents and polymer base matrices.

The present invention is based on controlled chemical or electrochemical reduction of readily available molecular Si$^{4+}$ and Ge$^{4+}$ reagents and the quenching of the corresponding intermediate Si$_n$X$_m$ with different nucleophiles in an organic solvent. Two suitable families of reducing agents are activated metals and hydrides. Alternatively, an electrochemical method can be employed for the reduction of the group IV compounds. A nonaqueous medium must be used for the reduction of silicon and germanium reagents because of the large negative reduction potential and high reactivity with water of most of its compounds. After aqueous work up, the controlled addition of RM (R=alkyl, aryl, etc. and M=Li, Na, Mg, etc.) to the corresponding intermediate Si$_n$X$_m$ at low temperature produces the functionallized quantum dots in high yield.

In a further effort to control quantum dot particles and size distributions, capping methods have also been developed. The R group (in equation 2) in this method serves as the terminating agent for the clusters. Capping agents are typically aryl, heteroaryl, alkyl, or silyl halides that compete with SiX$_4$. Therefore, the ratio of R$_x$SiX$_y$ to the SiX$_4$ reagent in equation 2 can be used as a basic measure of the surface-to-volume ratio of the final particles.

Preferred Surface Ligands

The following are preferred surface ligands of the ligand layer. This list, which is not intended to be exhaustive, describes a number of surface ligands that satisfy the physical restrictions of the present invention:

Si-C
  A) Alkyls
    a. Simple aliphatic alkyl groups (methyl, ethyl, propyl, . . . )
    b. Branched alkyl groups (iso-propyl, tert-butyl, . . . )
    c. Substituted alkyl groups (butyronitrile, butyric acid, . . . )
    d. Perfluorinated alkyl groups
  B) Alkenes
    a. Simple isolated double bonds (1-hexene, 1-dodecene . . . )
    b. Substituted alkenes (6-Heptenenitrile, . . . )
    c. Conjugated polyenes (butadienes, hexatrienes, etc.)
    d. Polymerizable alkenes (methyl methacrylate, acrylonitrile, perfluoro ethylene, . . . )
  C) Alkynes
    a. Simple isolated alkynes (octyne, . . . )
    b. Substituted alkynes (acetylene carboxylic acid, . . . )
    c. Polymerizable alkynes
  D) Aromatics and Aromatic Heterocycles
    a. Phenyls, Pyridines, Quinolines, Thiophene, Furans, Pyrroles, Indoles, Carbazoles . . . .
    b. Substituted Aromatics and Aromatic Heterocycles
      i. Electron withdrawing groups (nitro, nitrile, fluoro, carboxylate . . . )
      ii. Electron donating groups (amino, alkoxy . . . )
  E) Conjugated Aromatics, Aromatic Heterocycles and Polyenes (poly is referred to well defined oligomers)
    a. Polyenes
    b. Poly(p-phenylene)
    c. Poly (diacetylene)
    d. Poly(triacetylene)
    e. Poly(p-phenylene vinylene)
    f. Poly(p-phenylene ethynylene)
    g. Polythiophene
    h. Polypyrrol
    i. Polyaniline
    j. Poly(phenylene sulfide)

Si—O
  A) Hydroxy, Alkoxy,
    a. Diol, triol, . . . polyol,
    b. Cholesteryl group
    c. Trisubstituted siloxy
  B) Carboxylate (salicylic acid)
  C) phenoxide Si—S
  A) Thioalkyl
  B) Thioaryl Si—Si
  A) Trisubstituted silyl group
  B) Trisubsituted silyl group with one or more functional groups Si—N
  A) Amino
  B) Mono and di-substituted amines QDs surface-terminated with various organic groups and dispersed in processible matrices such as organic polymers or sol-gels are particularly novel aspects of this invention. These QD nanocomposites enable new quantum phenomena that in turn enable a large variety of new applications (such as all-optical switching) and low cost processing (e.g., spin coating or dipping). We developed several novel synthetic schemes to fabricate these QDs and to functionalize their surfaces with molecular species that are chemically bonded to the surface for stability and robustness. Expensive and specialized fabrication equipment and facilities are not required. The synthesis of these nanostructures can be readily implemented in many laboratories.

As discussed above, the value of this QD nanostructure derives from the molecular tethers serving multiple functions. They may be active in a variety of ways, e.g., electrically, chemically, mechanically, or optically active. This enables precise control of the electrical, optical, transport, chemical and physical interactions between QDs and the surrounding matrix or the properties of single QDs. These molecular tethers are a key innovation needed to develop new devices and applications. Examples of particularly preferred embodiments of optically active molecular tethers are molecules with polarized or polarizable sections or with large polarizabilities, donor-acceptor molecules, hetero-molecules, and charge transfer molecules.

Another major innovation comes from collective phenomena resulting from coupled quantum systems such as coupled QDs. Currently, no method of doing this exists. The ability to attach active molecular tethers to the QD surface allows coupling QDs together in various one, two, and three-dimensional configurations to initiate multiple dot quantum interference interactions that may be applied towards novel devices. The length and properties of these tethers can be tailored to enhance or generate specific quantum phenomena. A large variety of nanostructures is possible:

(1) n QDs coupled in a linear structure
(2) n QDs coupled in an arbitrary 2-dimensional structure
(3) n QDs coupled in an arbitrary 3-dimensional structure (new lattice structure and new materials with tailorable properties.).
(4) QDs attached to a polymer backbone to give controllable densities of QDs. These QDs can be coupled with other species (e.g., electron donating or accepting molecules) onto a polymer backbone to generate other new phenomena and applications.

These nanostructures can have the properties of single QDs or an ensemble of QDs, which will be determined by the nature of the molecular tethers. This approach is key to exploiting collective excitations in QD systems towards innovative devices. These new nanostructures represent an important innovation in nanotechnology. Examples of particularly preferred embodiments of molecular tethers that can be used to interconnect QDs in this fashion and to generate controllable collective phenomena are conjugated species such as conjugated polymers (e.g., alkenes, alkynes, and aromatics).

Preferred Matrix Materials

The following are preferred matrix materials of the current invention:
  a. Poly(vinyl alcohol)
  b. Poly(vinyl butyral)—other
  c. Poly(vinylcarbazol)
  d. Poly(viny fluoride)
  e. Poly methyl vinyl ether
  f. Polyethylene
  g. polypropylene
  h. Polystyrene
  i. Poly(vinyl pyridine)
  j. Polyimides
  k. Poly(ethylene oxide)
  l. Sol-gel derived Glasses
  m. Spin-on-glass
  n. flow-glass
  o. Photoresist (positive or negative)
  p. Cyclotene
  q. PMMA
  r. Low K FlowFill™ of Trikon Industries
  s. Black Diamond™ of Applied Materials Preferred Methods of Use The engineered nonlinear nanocomposite materials of the present invention can be incorporated into an optical device by a variety of standard methods known in the art. This process flexibility, independent of the nonlinear optical properties, is a key benefit of the current invention. By selecting an appropriate matrix and solvent, engineered nonlinear nanocomposites can be deposited using spin-coating, spin casting, dip coating, and other methods commonly used in the process of standard semiconductor microfabrication.

While processes like spin-coating have been used in other contexts, the combination of tuning the optical and mechanical properties of an engineered nonlinear nancomposite material followed by spin-coating, or the like, is novel. Traditional nonlinear materials known in the art have chemical and mechanical properties that are directly linked to their optical properties. The processing techniques that can be used to incorporate these materials are therefore limited to those that are compatible with the material itself. For instance, LiNbO$_3$ is a crystal, and can therefore not be incorporated by spin coating.

The steps of incorporating a nonlinear material into a device by first selecting the desired optical properties, followed by independently selecting the chemical and mechanical properties to facilitate incorporation by a particular technique (e.g. spin-coating), and then incorporating the material using that technique is novel and represents a substantial improvement over incorporation methods of the prior art. While we have used spin-coating several times as an example of a standard method of materials incorporation, this was done strictly for exemplary purposes, and should not be considered to limit the scope of the invention in any way.

In addition to standard incorporation techniques, more controlled methods of deposition such as layer-by-layer growth using multifunctional polymers, as pioneered by Gero Decher, can be used to create any thickness of material with any density of quantum dots.

All of the same processing techniques are also possible for quantum dot solids, including the ability to perform layer-by-layer growth. Here again, the process of selecting the chemical properties of the surface ligands and solvent to facilitate incorporation by a particular technique, independent of the optical properties, represents a significant improvement over what has been disclosed in the art, and is claimed as a novel aspect of the present invention.

The following information provides some additional preferred methods of incorporating an engineered nonlinear nanocomposite material into a variety of devices:

i) The engineered nonlinear nanocomposite material can be dispersed in a polymer and subsequently dissolved in an appropriate solvent to create a fluid of sufficient viscosity to generate the desired thickness of the film. The film thickness can be easily tailored by varying the solvent content and therefore the viscosity. The specific quantum dot surface chemistry is selected for compatibility with the selected polymer and solvent to be used. Some preferred materials include: Dow Cemical's Cyclotene, which is B-staged divinylsiloxanebis-benzocyclobuten with Mesitylene and minor portions of other organic compounds; poly (methyl methacrylate) (PMMA); Photoresists used in Semiconductor manufacturing (both positive and negative), etc.

ii) The engineered nonlinear nanocomposite material is dispersed in a suitable fluid or solvent and applied evenly over the desired surface. Heat, vacuum, or carrier gas is then used to remove the carrier fluid leaving a film of the engineered nonlinear nanocomposite material on the device.

iii) The engineered nonlinear nanocomposite material is dispersed in a carrying gas, which is either reactive or inert. Appropriate carrier gasses include, but are not limited to; $SiH_4$, $N_2$, $H_2$, $O_2$, $N_2O$. The gases are allowed to react under appropriate conditions of heat and/or plasma to cause a CVD film to be deposited on the substrate of choice. In this embodiment, a preferred substrate is a silicon wafer, optionally comprising lithographic structures or patterns on the surface.

iv) The engineered nonlinear nanocomposite material is incorporated into a sputter target, optionally using procedure (i) above. Alternately, a pure target of the desired matrix material could be used (organic or inorganic targets, preferably $SiO_2$) and the engineered nonlinear nanocomposite material introduced in the gas in the sputter chamber. The engineered nonlinear nanocomposite material is then incorporated directly into the growing sputtered film v) The engineered nonlinear nanocomposite material is heated and caused to vaporize. The material vapors are then transported to the desired surface and condensed by keeping the surface at a suitable temperature. The result is a solid film deposited on the device.

vi) The same concepts can be used in systems that deposit Low K material such as Low K FlowFill™ of Trikon Industries or Black Diamond™ of Applied Materials, thus incorporating quantum dots into these low k films for even better control of the index of refraction and processability.

Preferred Nanocomposite Materials

The current invention comprises a nanocomposite with a controllable set of optical and mechanical properties, including: a matrix comprising a polymeric or glassy material, either doped or undoped with molecular species, with a density of quantum dots therein such that the index of refraction of the composite material falls between 1.3 and 5.0. Also disclosed are nanocomposite materials such that the density of quantum dots within the matrix is between 0.001% and 74% by volume. Optionally, the index of refraction of the nanocomposite material can be additionally tuned by selecting a matrix material with a specific index of refraction, and/or further doping the matrix to modify that index. This provides additional control over the optical characteristics. Optionally, the matrix can be a polymerizable material, and the index of refraction can be modified by cross-linking via UV illumination or radical initiators. The matrix material in which the quantum dots are dispersed may optionally have an intrinsically high $\chi^{(3)}$. The matrix material may optionally be an intrinsic matrix of a quantum dot solid.

The materials of the current invention are preferably optically pure; with a homogeneous distribution of quantum dots dispersed therewithin. These quantum dots may be homogeneously dispersed as individual dots or in small aggregates, as long as the material is optically homogeneous, so that scattering and/or mode disruption does not result from light passing through or past the material, as the specific application demands. Note that close-packed micron- or sub-micron-sized clusters of quantum dots dispersed in a polymer or other matrix material with a filling fraction optimized to enhance local field effects may be preferable (E. N. Lalanne, et al., "The Nonlinear Optical Properties of Silicon Nanoclusters Made by Laser Ablation and Ion Implantation," talk CTuE6 presented at CLEO 2001).

In addition, the current materials preferably have a $\gamma$ in the wavelength range-of-interest of between $10^{-12}$ and $10^{-8}$ $cm^2/W$, more preferably between $10^{-1}$ and $10^{-8}$ $cm^2/W$ and most preferably between $10^{-8}$ and $10^{-9}$ $cm^2/W$. Optical characteristics of the disclosed nanocomposite materials can be evaluated in a variety of configurations, and are not restricted by the specific embodiments described in this invention. One of skill in the art will appreciate that the linear and nonlinear optical properties of the current invention can be evaluated using methods such as Z-scan, FWM, cross-phase modulation, nonlinear phase shift in an interferometer, etc.

The mechanical properties of the current invention are preferably selected to be compatible with incorporation into devices selected from the list of: planar waveguides, non-planar waveguides, optical fibers, waveguide cores, wave guide claddings, free-space optics and hybrid optical devices. Such materials can be used in a variety of optical devices for switching, modulating and manipulating light in ways such as those producing an optical switch, an optical cross-connect, a wavelength converter and the like, as well as combinations thereof.

Alternative Applications for Engineered Nanocomposites

While we have emphasized the application of engineered nanocomposites as a nonlinear material, such materials will also find applications in a variety of areas such as engineered resonant nonlinear nanocomposite materials, engineered linear nanocomposite materials, engineered absorptive nanocomposite materials, engineered electro-optic nanocomposite materials, engineered themo-optic nanocomposite materials, engineered thermal nanocomposite materials, engineered gain nanocomposite materials, engineered magneto-optic nanocomposite materials, and engineered magnetic nanocomposite materials. In light of the present invention, it will be evident to one of skill in the art that the same tunable physical, chemical and optical properties of the materials described herein, as well as the methods of incorporation thereof, can be used to create materials with specific characteristics tailored to almost any application.

Preferred Structures, Devices and Systems:

Preferred Structures

Since the materials of the present invention are novel, there are a variety of articles of manufacture comprising these materials that will not be obvious to one of skill in the art, and will find use in a variety of application areas. These areas include but are not limited to optical switching and telecommunications. These articles of manufacture are specifically claimed under the present invention as a novel improvement over the prior art.

One aspect of the current invention comprises a film of an engineered nonlinear nanocomposite material. In a preferred embodiment, the film has a thickness of between 10 mm and 1000 nm. There are no restrictions on the width and length of the film, although these are preferably less than the size of a 16-inch wafer. In another preferred embodiment, the film is a thick film, with thickness ranging from 1 $\mu$m to 100 $\mu$m, more preferably between 1 $\mu$m and 20 $\mu$m and most preferably between 3 $\mu$m and 10 $\mu$m. Such thick films have not previously been described in the art, and are a particularly novel and preferred embodiment of the present invention.

Another aspect of the current invention comprises a substrate and an engineered nonlinear nanocomposite material, where the two are in physical and/or evanescent optical contact. By evanescent optical contact, it is meant that the two are separated by at most 3000 nm, preferably by at most 1500 nm more preferably by at most 500 nm. Substrates may include, but are not limited to, insulators, semiconductors, metals, glasses, polymers, plastics, a silicon wafer, a silica wafer, a glass wafer, an InP wafer, a GaAs wafer or any piece or fragment thereof. Substrates may optionally comprise multiple layers of different materials.

Another aspect of the current invention comprises a waveguide core and an engineered nonlinear nanocomposite material, wherein the two are in physical and/or evanescent optical contact. The waveguide core can include, but is not limited to an optical fiber, a planar waveguide, a silica waveguide, a silicon waveguide, a polymer waveguide, a liquid light guide and the like. In a preferred embodiment, the waveguide core comprises a bend. Optionally the bend is configured such that the present device acts as an optical limiter, wherein the output intensity of the limiter is defined, in part, by the density of quantum dots within the engineered nonlinear nanocomposite material.

Another aspect of the current invention comprises a free-space optic and an engineered nonlinear nanocomposite material, wherein the two are maintained in a fixed spatial relation to each other.

Another aspect of the current invention comprises a waveguide core fabricated from an engineered nonlinear nanocomposite material. Optionally, an engineered nonlinear nanocomposite material is placed in a strip over the region where the waveguide core is to be located. The waveguide core is then defined within the cladding by using patterned UV light to write waveguides directly into the nonlinear optical material to increase the index (via polymerization of the host polymer). For a nonlinear directional coupler, one possible means to avoid problems is to spin the nonlinear optical material down and etch away the material except where desired and subsequently growing the silica core waveguides around the nonlinear optical material. In addition, one could incorporate the nonlinear optical material in between two waveguides by growing one waveguide layer for one arm of a directional coupler, spinning the appropriate thickness of nonlinear optical material on top, and then growing another waveguide layer that forms the other arm of the directional coupler.

One final aspect of the present invention comprises a polymer waveguide structure and an engineered nonlinear nanocomposite material. Since an engineered nonlinear nanocomposite material optionally comprises a polymer matrix, there would be less material mismatch issues when using polymer waveguides with the nonlinear optical material. Using polymer-based waveguides, one can write all the waveguides directly (e.g., by using ultraviolet light). However, the switching beam illumination areas must be limited to the appropriate spots. Otherwise, one can envision performing etching and redeposition of polymers with or without quantum dots as appropriate.

Devices comprising an Engineered Nonlinear Nanocomposite Material

The materials and articles of manufacture of the current invention enable a variety of novel devices for high-speed light manipulation. These devices constitute novel articles of manufacture since the specific combination of these structures and an engineered nonlinear nanocomposite material has not been known in the prior art, and have not been suggested by the prior artis. The devices themselves constitute a novel machine, since the extremely large nonlinearity and fast response time of the materials of the present invention enable devices that are substantially smaller, faster and more efficient than devices previously know in the art. The results are novel devices with surprising advantages over those devices known in the art in terms of speed, size and efficiency.

Nonlinear Directional Coupler

Figure 9:
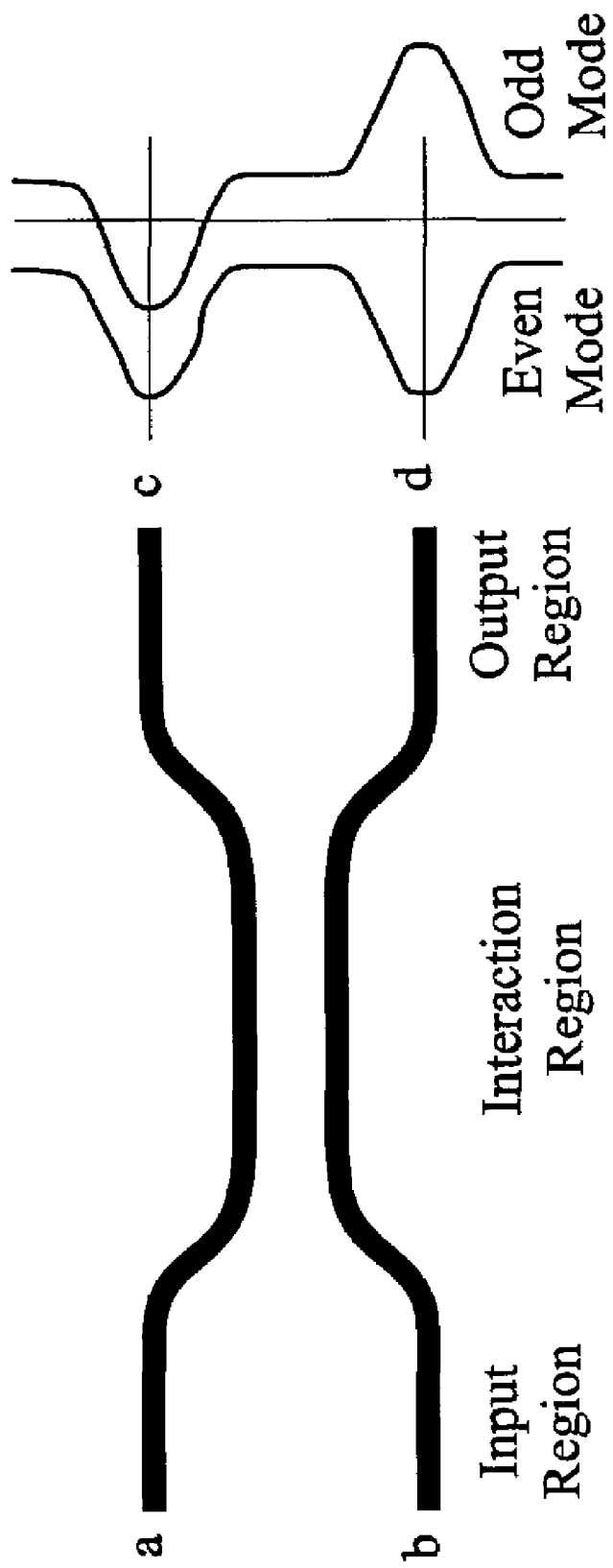
FIG. 9 illustrates a passive directional coupler known in the art.

The operation of a nonlinear directional coupler is best understood by examining the propagation of the joint optical-modes of the combined two-waveguide structure (FIG. 9). Any input to the directional coupler can be represented using the joint waveguide modes as a basis. A beam at input (a) can be represented as ½ the sum of the even and odd modes while a beam at input (b) is ½ the difference between the even and odd modes. When the separation between the waveguides is large, both even and odd modes propagate at the same rate. As the separation is decreased, however, the evanescent tails interact, causing the odd and even modes to propagate at different speeds. As the relative phases change, the intensity of the light in the interaction region modulates between the two waveguide cores.

If the length of the coupling region is such that the two joint waveguide modes are exactly out of phase at the end of the coupling region, the sum of the modes places the outgoing light in the opposite waveguide from the one in which it entered. This is the "full crossover" condition where a signal entering the coupler through (a) is transferred to (d) and a signal in (b) is transferred to (c). If the coupling region is half the "crossover length", the input is evenly split between the two output waveguides. If the coupling region is twice the "crossover length", the signals rephase and interfere constructively to place the full output signal back into the originating waveguide. By adjusting the length of the coupling region, any split ratio can be achieved. Similarly, by changing the index of refraction of the space between the waveguides, the space around the waveguides, or the waveguides themselves, the evanescent coupling, and therefore the relative speed of the even and odd modes, is changed. By varying the index, light can be switched from one output to the other without changing the coupling length.

The current invention comprises a directional coupler with an engineered nonlinear nanocomposite material in and/or around the coupling region, capable of switching at speeds up to 10 THz. In one preferred aspect of the present invention, the length of the coupling region is less than 1 mm, more preferably less than 0.75 mm and most preferably less than 0.5 mm. Such lengths are specifically enabled by the novel combination of a known directional coupler with an engineered nonlinear nanocomposite material of the present invention. This represents a significant and surprising improvement over the prior art and is claimed under the present invention.

The embodiment of FIG. 9 is merely one possible planar incarnation of the current invention. Any arrangement (e.g. vertical displacement of waveguides) in which a relative phase shift between the even and odd modes is induced by a refractive index change of an engineered nonlinear nanocomposite material is possible.

In general, the preferred characteristics of the present invention include a substantially rectangular waveguide core height less than 62.5 $\mu$m (preferably between 2 and 15 $\mu$m and more preferably ~5–7 $\mu$m) and core width less than 62.5 $\mu$m (preferably between 2 and 10 $\mu$m, more preferably 4 to 6 $\mu$m). The separation between waveguides in the Input and Output regions is typically >10 $\mu$m, more preferably >20 $\mu$m. In the coupling region, the separation is preferably between 2 and 8 $\mu$m, more preferably between 4 and 6 $\mu$m, and will vary depending on the width of the waveguide core. The active material comprising an engineered nonlinear nanocomposite fills the space between the waveguides in the coupling region, and extends beyond the coupling region without significant change in width. This is an additional novel aspect of the present invention. The active material preferably extends at least 50 micron on either side of the coupling region, more preferably 500 microns. The length of the coupling region is preferably between 100 and 10000 $\mu$m, more preferably between 500 and 5000 $\mu$m. The index of refraction of the engineered nonlinear nanocomposite material is preferably less than the index of refraction of the waveguide core, more preferably about halfway between the index of refraction of the waveguide core and the index of refraction of the cladding.

In a preferred embodiment, the nanocomposite used in the current aspect of the invention is engineered such that the average index of refraction between the active (illuminated) and inactive (dark) states is placed halfway between the index of the waveguide core and that of the cladding.

Figure 11:
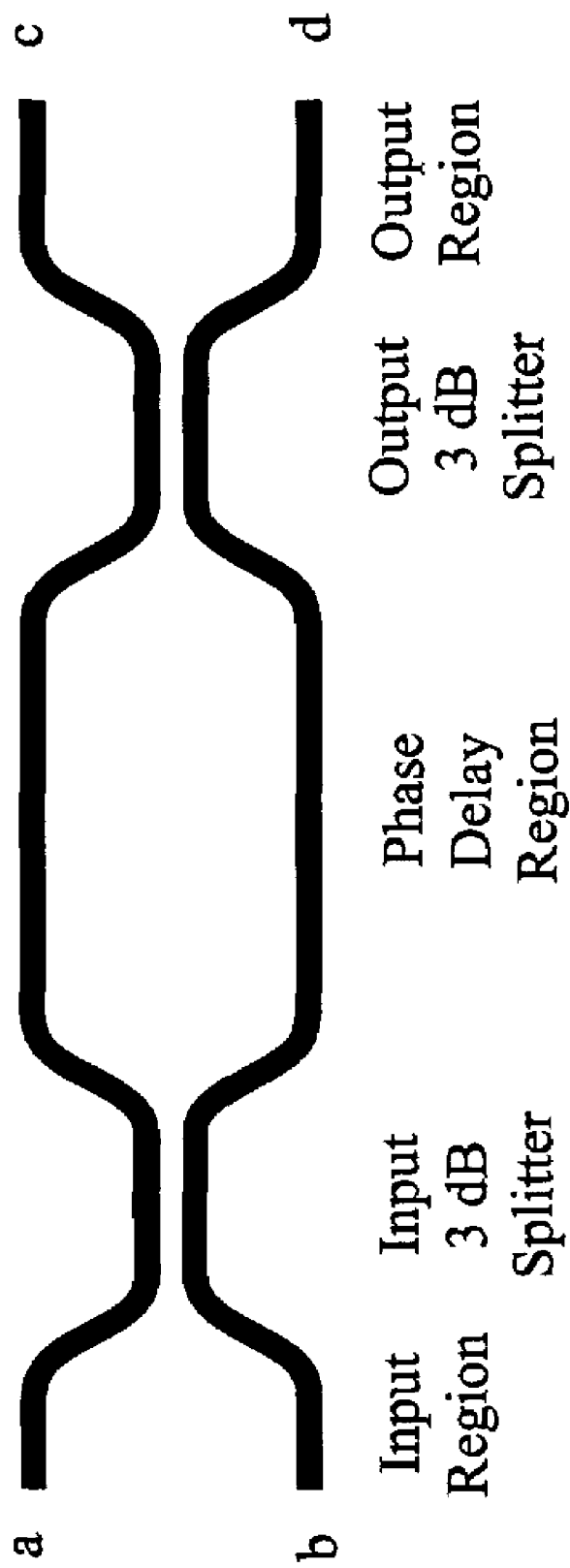
FIG. 11 illustrates a MZ interferometer known in the art.

The following examples constitute a subset of the preferred embodiments of this novel nonlinear directional coupler, but are not meant to limit the scope of the present invention:

a) Example 1
FIG. 10A.1 through FIG. 10B.3 show two switch states of one preferred embodiment of the present invention in which a directional coupler is formed with an engineered nonlinear nanocomposite material wedged between waveguides in the plane.

b) Example 2
Directional coupler with nonlinear material placed between waveguides separated vertically c) Example 3
Directional coupler with nonlinear material surrounding the waveguide (either in the plane or three-dimensionally)

d) Example 4
Use of silicon or other high index materials for waveguide core material e) Example 5
Write waveguides directly into nonlinear material layer and illuminate entire coupling region for switching Nonlinear MZ-interferometer A typical Mach-Zehnder switch comprises five regions (FIG. 11). The input region forms the input to the switch. For a 2×2 cross connect, (a) and (b) are both used (one for each input data stream). For a simple on/off switch, either (a) or (b) may be used as the input. The Input 3 dB Coupler ("splitter") effectively distributes the input signals between the two arms of the phase delay region (typically, but not necessarily, equally). Depending on the relative phase delay between the two arms, the signal entering the Output 3 dB Coupler interferes constructively or destructively. Depending on the interference, the switch can be either straight (a↔c, b↔d), or crossover (a↔d, b↔c), or anywhere in between. By modulating the index of refraction in one or both of the arms, it is possible to adjust the relative phase delay, and therefore the output of the MZ interferometer.

One common embodiment of the Mach-Zehnder architecture is in thermooptic switches, where index of refraction is modified as a function of temperature. Thermo-optic switches of this type have a switching speed of 1–3 ms; fast enough for protection and restoration purposes, but not for high-speed switching applications.

The current invention provides a nonlinear MZ interferometer comprising an engineered nonlinear nanocomposite material and capable of functioning at speeds as high as 10 THz. The nanocomposite is preferably incorporated into the core of one or both arms of the phase-delay region of a MZ interferometer. Alternatively, the nanocomposite may be incorporated into the cladding of the phase delay region. Cross-phase modulation is optionally used to introduce an index change in the nonlinear material. This index change is controlled by illuminating the nanocomposite material with a trigger pulse. In one preferred embodiment of the present invention, the active region of the MZ interferometer switch is less than 1 mm, preferably less than 0.75 mm and more preferably less than 0.5 mm.

The quantum dot material and size used in the engineered nonlinear nanocomposite material are selected to maximize nonlinearity and minimize loss in the wavelength range-of-interest. The concentration of quantum dots is separately selected to match the refractive index requirements determined by the specific waveguide material and architecture. For a nanocomposite incorporated into the waveguide core, the index of refraction is selected to be greater than the cladding material, and preferably equal to the waveguide core material. Alternatively, the nanocomposite may have an index of refraction that is greater than the waveguide core material. For a nanocomposite incorporated into the cladding, the concentration is selected so the index of refraction of the nanocomposite is less than the index of the waveguide core, and preferably equal to the index of the cladding material. Alternatively, the nanocomposite can have an index of refraction that is less than the cladding. Optionally, the nanocomposite can have an index of refraction that is greater than that of the cladding.

No symmetry restrictions are required in this general MZ interferometer. In fact, the device may optionally use an asymmetric design to induce an effective index of refraction bias between the two arms. For a planar waveguide device operating at wavelengths between 1500 and 1600 nm the waveguide core material is preferably silica and the cladding is preferably doped silica with an index difference less than 10%. The waveguide cross-section will preferably be rectangular with thickness less than 62.5 μm (more preferably between 2 and 15 μm, most preferably 5–7 μm) and width less than 62.5 μm (more preferably between 2 and 10 μm, most preferably 4 to 6 μm). The waveguide cross-section will preferably be rectangular with thickness and width between 2 and 10 μm (preferably with thickness from 4–7 μm and width from 4–6 μm). Typically, both input and output directional couplers will have a separation in the coupling region of less than 8 μm (preferably between 1 and 6 μm) and a length of the coupling region between 100 and 3000 μm (preferably between 200 and 2000 μm) with length depending strongly on the core dimensions, waveguide separation, and core-cladding index difference. In regions outside the interaction regions, waveguide separation is preferably greater than 10 μm, more preferably greater than 30 μm. The minimum separation is a strong function of core-cladding index change and decreases with increasing index difference.

The length of the phase delay region is determined by the strength of the cross-phase modulation induced by the trigger signal. The length of the device is preferably long enough to permit a full π-phase change for the range of trigger signal intensifies incident on the device ("π-length"). If the intensity of the control pulse is known for both pass-through and crossover conditions, an exact length of the interaction region can be determined from the dimensions of the device, the optical properties of the engineered nonlinear nanocomposite material, the location of the nonlinear material within the MZ structure, and the intensity profile of the trigger pulse. Optionally, a plurality of trigger-pulse intensities can be used, in which case the active length of the device is preferably increased by at least 20% over the π-length to provide dynamic reserve and allow for trim capability.

The following examples constitute a subset of the preferred embodiments of a novel MZ interferometer switch, but are not meant to limit the scope of the present invention:
a) Example 1
   FIG. 12A.1 through FIG. 12D.4 show two switch states of one preferred embodiment of the present invention, in which an engineered nonlinear nanocomposite material is placed in the core of one arm of a MZ interferometer.
b) Example 2
   Active material in both cores (push-pull)
c) Example 3
   Active material as core materials (trigger-pulse spot size defines active region or regions)
d) Example 4
   Active material in cladding (1 or 2)
e) Example 5
   Active material in all cladding and only illuminate phase-delay region
f) Example 6
   More than 1 engineered nonlinear nanocomposite material at different locations (push-pull).
g) Example 7
   Silicon or other high-index core
h) Example 8
   Write waveguide directly into nanocomposite and illuminate entire region for switching.

Optical Transistor

One novel aspect of the present invention relates to an optical transistor. In general, an optical transistor is an optical device that is analogous to an electrical transistor. An optical transistor comprises a "light ballast" that functions in the same capacity as the voltage supply for an electrical transistor. It also comprises a signal input and a signal output. In an electrical transistor, a small input signal modulates the flow of current from the voltage-source (or ballast) to the output port, typically in a nonlinear manner. In an optical transistor, an input optical signal modulates the intensity of light released from the optical ballast to the optical output. This can also have a nonlinear relationship. As will be described below, an optical transistor will have many potential applications such as optical signal regeneration, wavelength conversion and amplification.

Since no such device has previously been described, the optical transistor aspect of the present invention, and all of its embodiments and applications are novel and non-obvious and are herein claimed as part of this invention, whether or not they comprise an engineered nonlinear nanocomposite material. Devices comprising an engineered nonlinear nanocomposite material, however, are preferred.

Figure 13A:
FIG. 13A, FIG. 13B, FIG. 13C, FIG. 13D, and FIG. 13E illustrate several possible embodiments of an optical transistor comprising an engineered nonlinear nanocomposite material. Dark regions indicate the location of nanocomposite material.
Figure 13B:
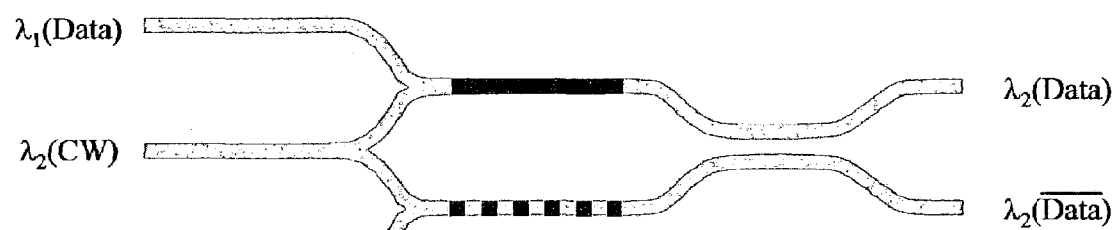
Figure 13C:
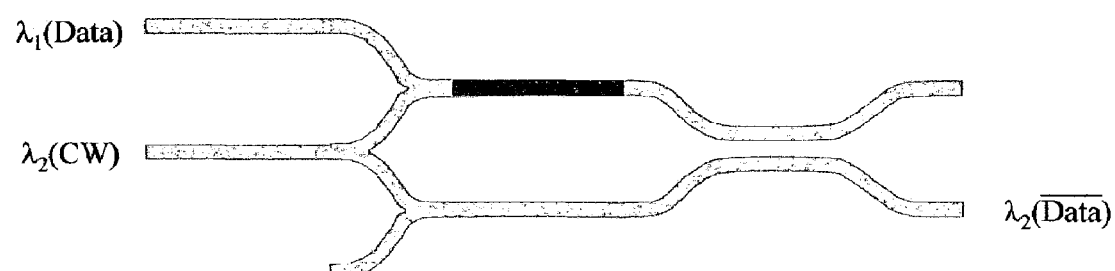
Figure 13D:
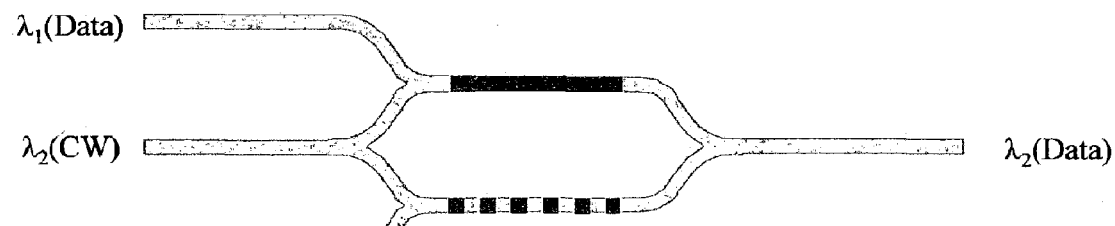
Figure 13E:
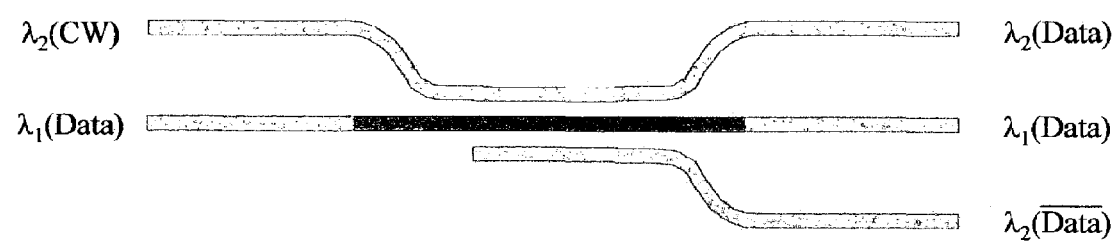

FIG. 13F.1 through FIG. 13I.4 depict several preferred embodiments of an all-optical transistor comprising an engineered nonlinear nanocomposite material. The first four are variations on a MZ interferometer in which the input signal induces a relative phase difference between the two arms by cross phase modulation (see description of MZ), resulting in a modulation of the transmission of the ballast signal to the optical output. The fifth is a variation on the nonlinear directional coupler in which the input signal feeds the center nonlinear material (either from the top or along the nonlinear region as shown), modulating the output of the ballast signal. In all cases, the dynamic range and "gain" of the optical transistor can be controlled by the intensity of the light ballast.

For each of the embodiments of FIG. 13A through FIG. 13E, two inputs are provided. The first input is the data input. In this case, the input signal is also the trigger-signal. The second input is a CW signal, corresponding to the ballast signal. Alternatively, either the input signal or the ballast signal or both may be pulsed. The wavelengths of the input and ballast signals can be the same or different. The response time of the optical transistors of the present invention are optionally as fast or faster than 60 fs.

In each of these embodiments, the design parameters are preferably similar to those described in the preceding sections for each individual component. Many alternative embodiments can be envisioned using the devices and materials of the current invention, as will be recognized by one of skill in the art.

Wavelength Converter

In general, wavelength converters allow higher efficiency in the use of the wavelength resources of an optical network by enabling a substantial increase in reconfigurability. They have the ability to convert data at one wavelength into a different distinct wavelength in the optical domain. Presently, first generation designs implement opto-electronic wavelength conversion through signal detection and regeneration at a different wavelength. The current invention comprises methods and devices for performing all-optical wavelength conversion at speeds up to 10 THz using an engineered nonlinear nanocomposite material.

The wavelength converters of the present invention comprise an optical transistor, and represent a novel improvement over wavelength converters known in the art. The wavelength converters of the present invention, and all of their embodiments are novel and non-obvious and are claimed as part of this invention, whether or not they comprise an engineered nonlinear nanocomposite material.

Wavelength converters comprising an engineered nonlinear nanocomposite material, however, are preferred.

In one preferred embodiment of the present invention, a wavelength converter comprises an optical transistor with different input and ballast wavelengths. In this case, the output signal is modulated from zero to some finite signal as a function of the input signal intensity. A series of data pulses at $\lambda_1$ results in an identical series of output pulses at $\lambda_2$. By modifying the optical transistors of FIG. 13A through FIG. 13E to depict the input and ballast signals at different wavelengths, several preferred embodiments of an all-optical wavelength converter are produced. The first four are variations on a MZ interferometer in which the incoming data stream at $\lambda_1$ induces a relative phase difference between the two arms by cross phase modulation (see description of MZ). The fifth is a variation on the nonlinear directional coupler in which the data stream feeds the center nonlinear material (either from the top or along the nonlinear region as shown).

For each of the preceding embodiments, two inputs are provided. The first input is a data-signal at wavelength ($\lambda_1$) that is to be converted to a different wavelength ($\lambda_2$). In this case, the data-signal is also the trigger-signal. The second input is a CW signal at $\lambda_2$ that is modulated by the data-signal. Alternatively, the second signal is a pulsed signal, synchronized to the data-signal frequency.

In each of these embodiments, the design parameters are preferably similar to those described in the preceding sections for each of the individual components. Many alternative embodiments can be envisioned using the devices and materials of the current invention, as will be recognized by one of skill in the art.

Optical Regeneration System

With current WDM systems, optical regeneration [either 2R (reamplification and reshaping) or 3R (2R with retiming)] is primarily performed using optical to electronic conversion. After this conversion, the signal can be retransmitted (via an electronic to optical conversion) at the appropriate amplitude (reamplification) once the signal has been reformed with the appropriate characteristics (reshaping) and phase-locked to the local oscillator (retiming).

The optical transistor of the present invention can be configured to provide 2R and 3R regeneration. The optical regeneration systems of the present invention represent a novel and unexpected improvement over other methods known in the art, and are claimed as part of this invention, whether or not they comprise an engineered nonlinear nanocomposite material. Optical regeneration systems comprising an engineered nonlinear nanocomposite material, however, are preferred.

In one preferred embodiment of the present invention, an optical regeneration system comprises an optical transistor with the input and ballast wavelengths either the same or different (in the case of different wavelengths, the regeneration system also acts as a wavelength converter). In either case, the ballast signal is pulsed and synchronized with the local clock (for retiming). The pulse width of the ballast signal is selected to match the desired output pulse shape (reshaping). The input signal is the data signal to be regenerated. The intensity of the ballast signal is preferably 10 times higher than that of the data signal, more preferably 100 times higher than the data signal, and can be selected depending on the desired output signal (reamplification). The data signal is optionally pulsed.

Wavelength Conversion comprising 4-Wave Mixing

Wavelength conversion can also be achieved through 4-wave mixing using the engineered nonlinear nanocomposite materials of the present invention. The device uses the high optical nonlinearity of the present materials to provide efficient frequency conversion of the data signal using non-degenerate four-wave mixing. During this process, the data signal with carrier frequency $f_1$ interacts with a control beam of frequency $f_2$ in an engineered nonlinear nanocomposite material to form beams with frequencies $2f_1-f_2$ and $2f_2-f_1$ in addition to the incident frequencies. This allows one to generate a frequency shifted data beam in any other of the ITU grid frequencies by appropriately tuning the control beam frequency. The undesired beam can then be separated from the new data beam using appropriate frequency splitters and/or filters. Since the intensity of the frequency-shifted beam depends on the nonlinearity of the nanocomposite film, it is desirable to engineer a nonlinear nanocomposite with as large nonlinearity as possible. In addition, it is also desirable to reduce Fresnel losses in the film by having the linear index of the film be as low as possible or be matched to the index of the waveguide material transporting the beams to the film. These factors should be optimized such that the net output at the desired frequency is maximized.

A wavelength converter and even an optical transistor using an engineered nonlinear nanocomposite material is novel and unexpected advance over the prior art.

Optical Limiter

A novel embodiment of an optical limiter uses the nonlinear optical absorption of the materials of the present invention to provide a means of limiting the optical power that passes through the material. A general description of this effect and previous embodiments can be found at D. J. Hagan, "Optical Limiting," in Handbook of Optics, Vol. IV, M. Bass, Ed, (Optical Society Of America 2000), which is herein included by reference. For ultrafast (<1 ps) optical limiting, we utilize the large two-photon absorption (TPA) provided by the quantum dots of the present material. Alternatively (or perhaps in combination with TPA), we can enhance scattering losses under higher intensity illumination (due to increased index change) caused by aggregates of quantum dot of a size comparable to the wavelength of light in question. Ideally, the matrix material is such that the matrix index matches the groups of quantum dots, so that there are initially no scattering losses. Finally, the use of nonlinear refraction could be used to form an induced lens in the nonlinear optical material as a means of reducing the throughput through an aperture with increasing intensity. This may either be ultrafast (if no thermal effects are present) or relatively slow, depending on whether significant optical absorption occurs to heat the material and induce thermal lensing (via the thermo-optic effect). Each of these embodiments is novel and an unexpected advance over the prior art.

A 1×N Controllable/configurable Switch comprising a Saturable Absorber

This device uses the linear optical properties (absorption in particular) of the engineered nonlinear nanocomposite material of the present invention to provide a saturable absorber, i.e., a material whose absorption can be "bleached" with the appropriate optical intensity (i.e., fluence in a period that is shorter than the excitation lifetime in the quantum dots). A switch using such a saturable absorber is optimized such that a beam of light used for transmitting data is absorbed to a level that is below the threshold for detection.

A control beam, of either the same or different wavelength, with pulses that are either just sufficient for saturation (for the same wavelength) or are greater than or equal to the saturation threshold (for different wavelengths) impinging on the same spot as the data beam would allow transmission of the data beam. If different wavelengths are used, the control beam can be filtered out. Besides the switching function, this acts as an optical AND logic gate. By splitting a data stream N ways using either a demultiplexer (for different wavelengths) or a power splitter (for broadcasting purposes) and having one switch per N routes, one can create a 1×N controllable/configurable switch. Such a device, comprising an engineered nonlinear nanocomposite material has not been previously described or suggested in the prior art.

Optical Spatial Light Modulator

The present invention can also be used to create a novel and surprisingly fast optically addressable spatial light modulator. This is achieved through the optically induced phase shift that can be created in spatial locations on the nanocomposite where a control beam is incident on the film. The spatial configuration of the phase shift is then specified by an array of lasers that is imaged onto the nanocomposite, thus providing a phase shifting spatial light modulator that is optically addressed, with all of the bulky electronics and lasers being placed remotely from the modulator element itself. This can be made into an amplitude modulator by placing the nanocomposite in an interferometer. Such a spatial light modulator can operate at speeds as fast as 10 THz.

Tunable Waveguide Bragg Gratings and Filters

By taking advantage of the fast response time, high nonlinearity and ease of processing of the materials of the present invention, a novel class of devices are enabled, utilizing the index change caused by light interacting with an engineered nonlinear nanocomposite material to allow for either the modulation of the effective grating period or the complete formation and/or erasure of a Bragg grating in a waveguide. This functionality allows for either tunable filters or optical modulators. In the case of a switchable Bragg-grating, this is similar to that of DigiLens, who uses liquid crystals to modulate the effectiveness of a liquid crystal based fiber Bragg grating. In the present invention, however, light rather than electric field is used to modulate the index. The result is a surprising improvement in switching speeds, up to 10 THz. In addition, liquid crystal technology cannot produce a tunable Braggg-rating.

Figure 14:
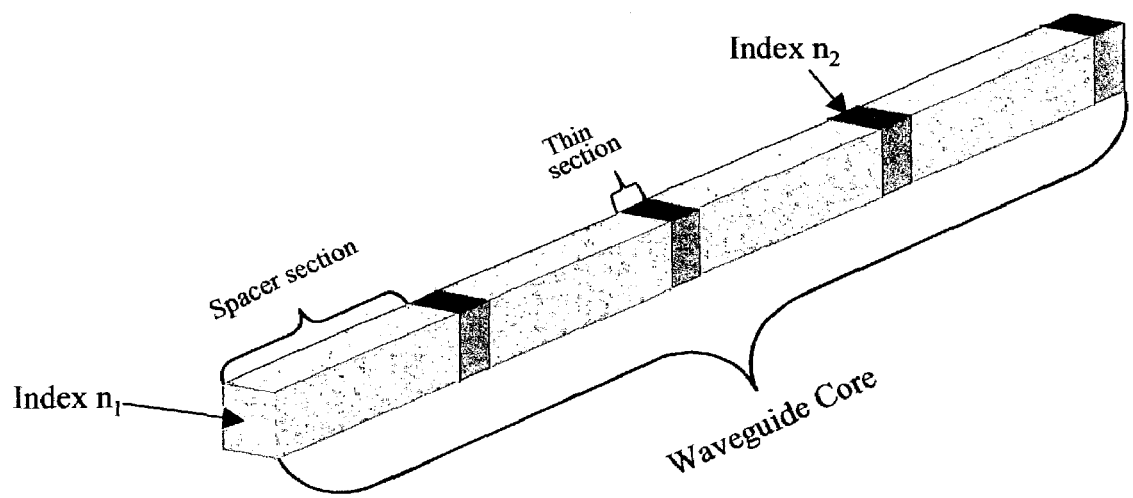
FIG. 14 illustrates a schematic drawing of a waveguide Bragg-reflector known in the art.

A waveguide Bragg-grating, as known in the art, can be described as a waveguide core comprising alternating sections of high and low index of refraction (FIG. 14). Typically, a series of thin sections of one index are separated by thick sections of a second index (note that the terms "thin" and "thick" are used here to distinguish two different regions of the grating, and do not imply that one of these sections is necessarily thicker or thinner than the other—in fact these sections are optionally the same width). The thin sections of a waveguide Bragg-grating will herein be referred to as "thin sections" and the thick sections will be referred to as "spacer sections". The high index material can be in either the thin sections or the spacer sections. Alternatively, the multi-layer stack within the waveguide core can comprise a plurality of indices and a plurality of widths.

Figure 15A:
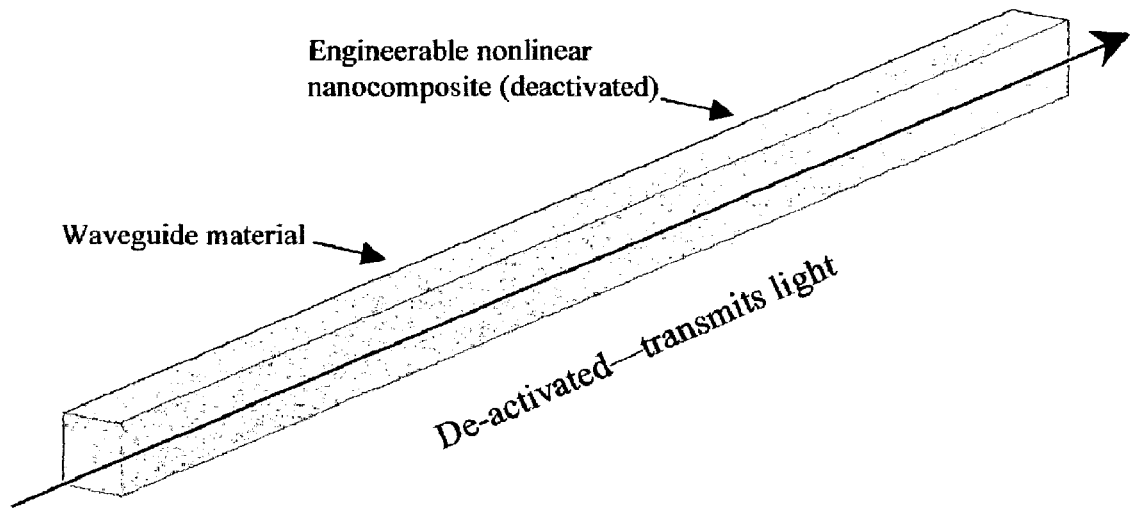
FIG. 15A and FIG. 15B illustrate a schematic drawing of an activatable nonlinear waveguide Bragg-reflector comprising an engineered nonlinear nanocomposite material in the activated and non-activated states.
Figure 15B:
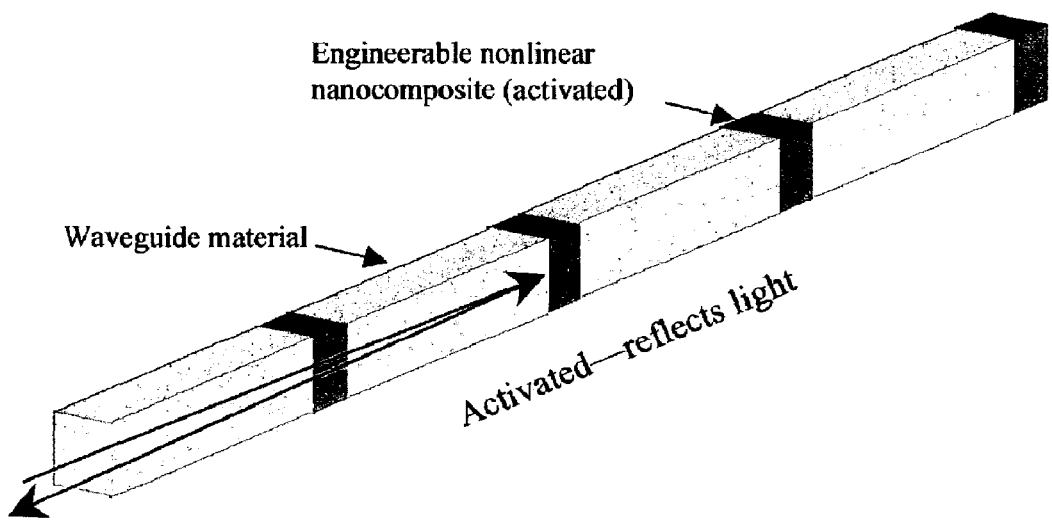

In a novel preferred embodiment of the present invention, a waveguide grating is formed by removing equal length sections of an optical waveguide, each section corresponding to a thin section of the waveguide Bragg-grating. The removed sections are then replaced with an index matched engineered nonlinear nanocomposite material (or any other index-matched nonlinear material). In the absence of a trigger-signal, light passing through the modified portion of the waveguide experiences no change in index, and passes through unimpeded (FIG. 15A). In the presence of a trigger-signal, a periodic index change is formed, and a fiber Bragg-grating appears, manipulating the signal light (FIG. 15B).

The spectral characteristics of the grating can be tailored by selecting the specific series of widths and spacings of the waveguide core material and the engineered nonlinear nanocomposite material. Note that the length of the thin sections, as well as the width of the spacers can be chosen to create any dielectric stack. The stack can be either periodic or nonperiodic, and can have all layers with the same width or different widths. It is also possible to configure the current invention such that the grating is present in the absence of a pulse-signal, and disappears when the trigger is present.

Figure 16A:
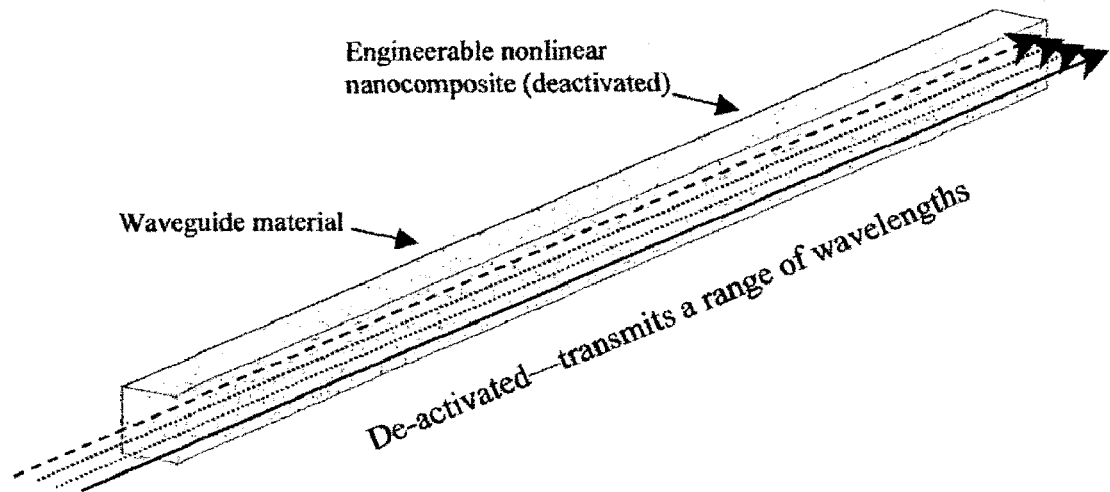
FIG. 16A and FIG. 16B illustrate a schematic drawing of a tunable nonlinear waveguide Bragg-reflector in two states of activation.
Figure 16B:
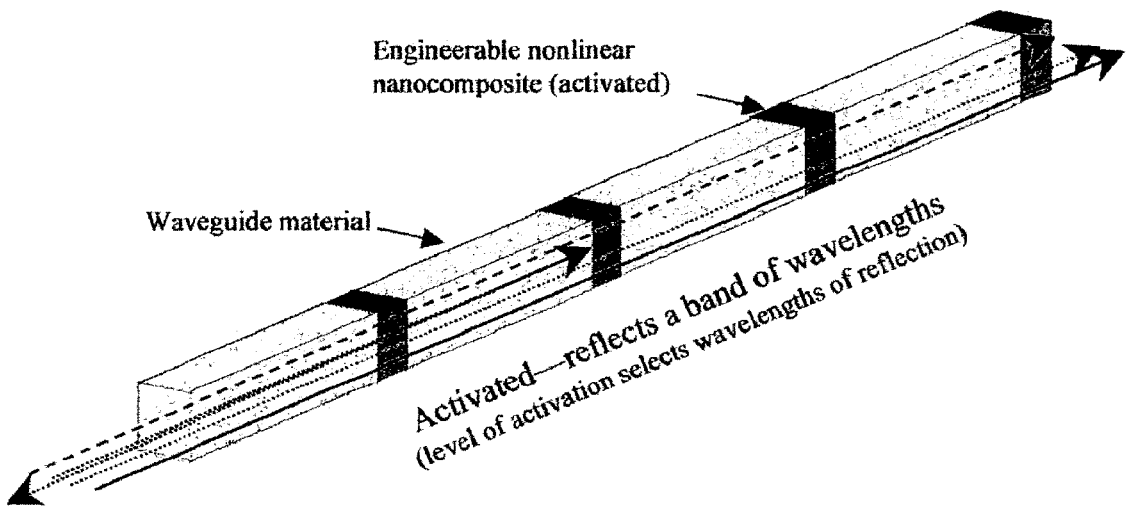

In an alternative novel embodiment, the grating is formed with the engineered nonlinear nanocomposite material comprising the spacer sections (FIG. 16A and FIG. 16B). In this case, modulating the index of the spacer sections reduces the speed with which light travels through the waveguide, creating an effective change in the distance between the thin sections. The result is that the wavelength characteristics of the Bragg-grating will be strongly dependent on the change in index and therefore the intensity of the trigger-pulse. In this embodiment, a wavelength-tunable, optically controlled waveguide Bragg grating is formed. No such device is currently known or suggested by the prior art.

The current invention also provides a method for illuminating a tunable waveguide Bragg-grating with a trigger-pulse. Preferred methods include:

a) Transverse illumination of the entire Bragg grating structure.
b) Longitudinal illumination through the waveguide, where the trigger-pulse is either broad in duration relative to the transit time of the data-signal, or where the trigger-pulse is synchronized with the data-signal.
c) Transverse illumination with only part of the grating illuminated and/or different parts illuminated under different conditions, to create a chirped grating out of a normal grating
d) Transverse or longitudinal illumination of the entire grating, with the initial grating structure formed intrinsically chirped.

Possible applications of a tunable waveguide Bragg-grating include:

a) All-optical switching—modulate between the Bragg diffracting state and the non-diffracting state using a trigger pulse.
b) Tunable grating—vary the intensity of a trigger-signal to tune the spectral response of the Bragg-grating.
c) Wavelength converter—combination of 1 and 2 above: Multiple wavelengths enter the waveguide, but all are reflected. The data-pulse triggers the formation of a Bragg-grating, and the intensity selects the wavelength that is transmitted.
d) Variable optical attenuator.
e) Tunable dispersion compensation using chirped Bragg gratings—selectively adjust sections of a chirped Bragg grating to fine tune the appropriate dispersion characteristics to compensate for PMD, chromatic dispersion, etc.

Reconfigurable Integrated Optical System

Another novel and surprising device that is enabled by the materials of the present invention is a reconfigurable integrated optical system. A reconfigurable integrated optical system consists of a thin film of an engineered nonlinear nanocomposite material, sandwiched between two dielectric layers with linear indices of refraction that are lower than that of the nanocomposite. Optionally, one of the dielectric layers comprises a patterned array of surface emitting lasers. The surface emitting lasers are optionally separated from the nanocomposite layer by an additional layer or layers of dielectric materials, one or more of which may optionally have an index of refraction that is substantially the same as the dielectric layer on the other side of the nanocomposite layer.

Light guided into the nanocomposite from the edge of the film is trapped within the nanocomposite layer by total internal reflection. By illuminating the film in the 2D pattern of a desired waveguide, an index change is created via cross-phase modulation. By selecting the correct illumination pattern, a temporary waveguide can be patterned into the nanocomposite layer. Light guided into the temporary waveguide can be directed to any output location that would be accessible by a traditionally formed waveguide.

Figure 17A:
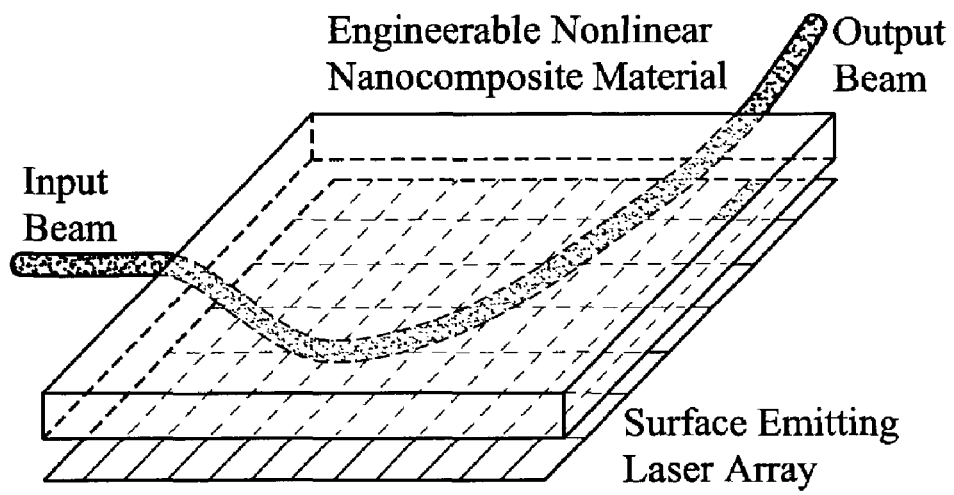
FIG. 17A and FIG. 17B illustrate two preferred embodiments of a Reconfigurable Integrated Optical System.
Figure 17B:
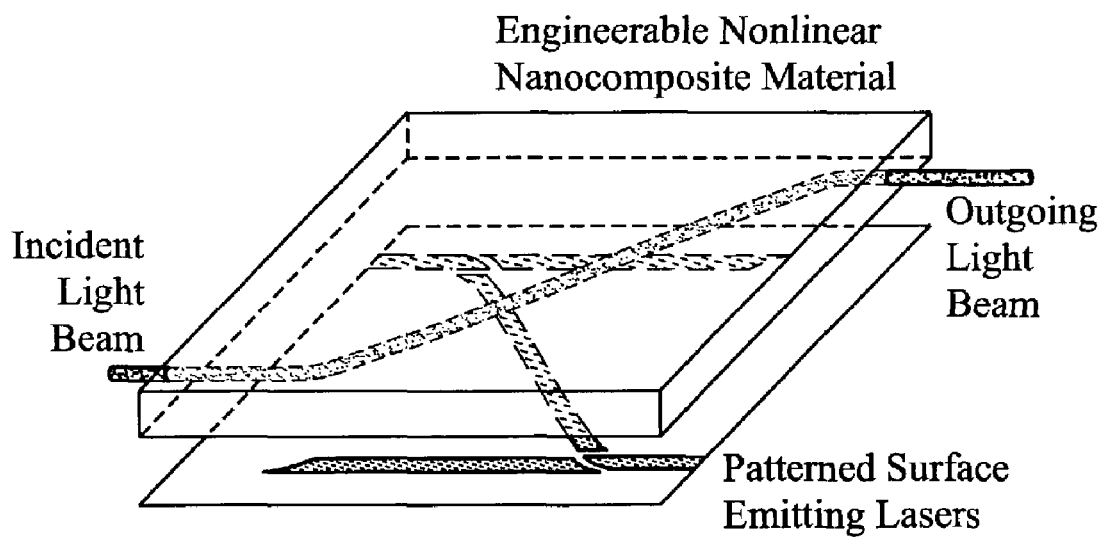

The system may be reconfigured by electronically changing the pattern of illumination. The illumination pattern can be generated by the surface emitting lasers or by an external light source. FIG. 17A and FIG. 17B show two possible configurations of reconfigurable integrated optical systems, including an optical pattern of surface emitting lasers and one possible light-path through each device.

The concept of a reconfigurable optical device as described above is a novel and unexpected advance over the prior art.

Figure 18:
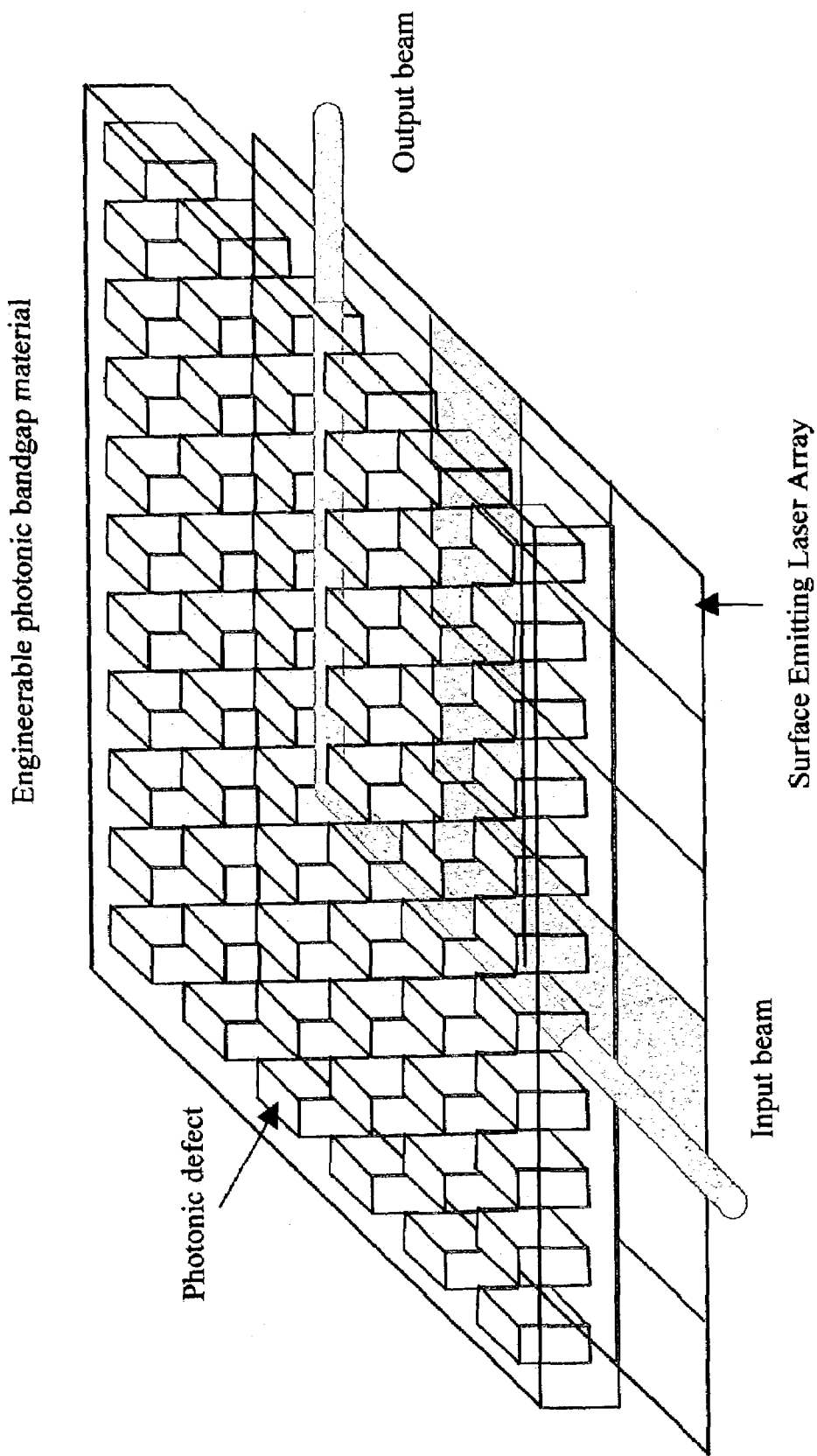
FIG. 18 illustrates one preferred embodiment of a reconfigurable photonic bandgap integrated optical system.

Reconfigurable Photonic Bandgap Integrated Optical System (FIG. 18)

A photonic crystal is a material with a periodic index modulation that restricts the transmission of light to a defined set of wavevectors or "bands". This is similar in nature to the periodic arrangement of ions in a lattice that gives rise to the energy band structure of semiconductors, and controls the movement of electrons through a crystal. In a photonic crystal, the periodic arrangement of refractive index variation controls how photons move through the crystal.

Photonic bandgaps were first predicted in 1987 by Eli Yablonovitch and Sajeev John. An array of 1 mm holes milled into a slab of material of refractive index 3.6 was found to prevent microwaves from propagating in any direction. This was analogous to how electrons cannot travel through a material if their energy does not match that of the electronic bandgap.

Breaking the periodicity of a photonic crystal by enlarging, reducing or removing some of the voids introduces new energy levels within the bandgap (similar to dopant atoms adding energy levels within the electronic bandgap of a semiconductor). This creates photonic crystals that propagate light in only very specific ways.

Many structures can be realized in photonic crystals by modifying the pattern of defects and breaking the symmetry of the pseudo-crystal. For instance, waveguides can be formed by modifying a series of adjacent defects. With the proper defect pattern, light can be guided around corners at very nearly right angles. Wavelength selective structures can also be formed with the careful selection of symmetry and spacing.

A novel device enabled by the materials of the present invention is a reconfigurable photonic bandgap material in which the periodic lattice of index modulations can be electronically controlled to allow creation or modification of defects at any desired location. This aspect of the current invention consists of a 2D photonic bandgap structure created (at least in part) from an engineered nonlinear nanocomposite material. The nanocomposite material may be restricted to either the high or low index regions of the lattice. Optionally, the nanocomposite can fill the entire region, and an illumination pattern can define the index modulations necessary. Alternatively, two or more different nanocomposite materials with differing optical properties can be used. In this embodiment, the nanocomposites may optionally react to incident light in an opposing fashion (i.e. incident light increases the index of refraction of one material, but decreases the index of refraction of the other).

The 2D photonic bandgap material is sandwiched between two dielectric layers such that light entering from the edge of the photonic bandgap material is guided within the 2D structure. Optionally, one or both of the dielectric layers comprise a patterned array of surface emitting lasers for modifying the nonlinear material through cross-phase modulation.

Cross-phase modulation in the nanocomposite materials, by the surface emitting lasers or an external light source, induces a change in the index of refraction at different locations within the photonic bandgap material. As a result, the structure of defects changes, affecting the photonic properties of the device. By separately varying the intensity of each source element, the photonic structure can be selectively modified and the function of the device controlled with great precision. By changing the pattern of illumination, it is possible to arbitrarily control the path of light guided into the device. In an alternative embodiment, the photonic bandgap material of the present invention can be a 3D photonic bandgap comprising an engineered nonlinear nanocomposite material. Illumination of the periodic index modulations changes the 3D photonic characteristics. Illumination in the case of a 3D photonic bandgap material can be performed using one or more confocal optical systems.

Systems comprising an Engineered Nonlinear Nanocomposite Material

The novel devices and structures enabled by the materials of the current invention can be further combined to produce a variety of novel optical sub-systems, capable of high speed optical processing.

Figure 19:
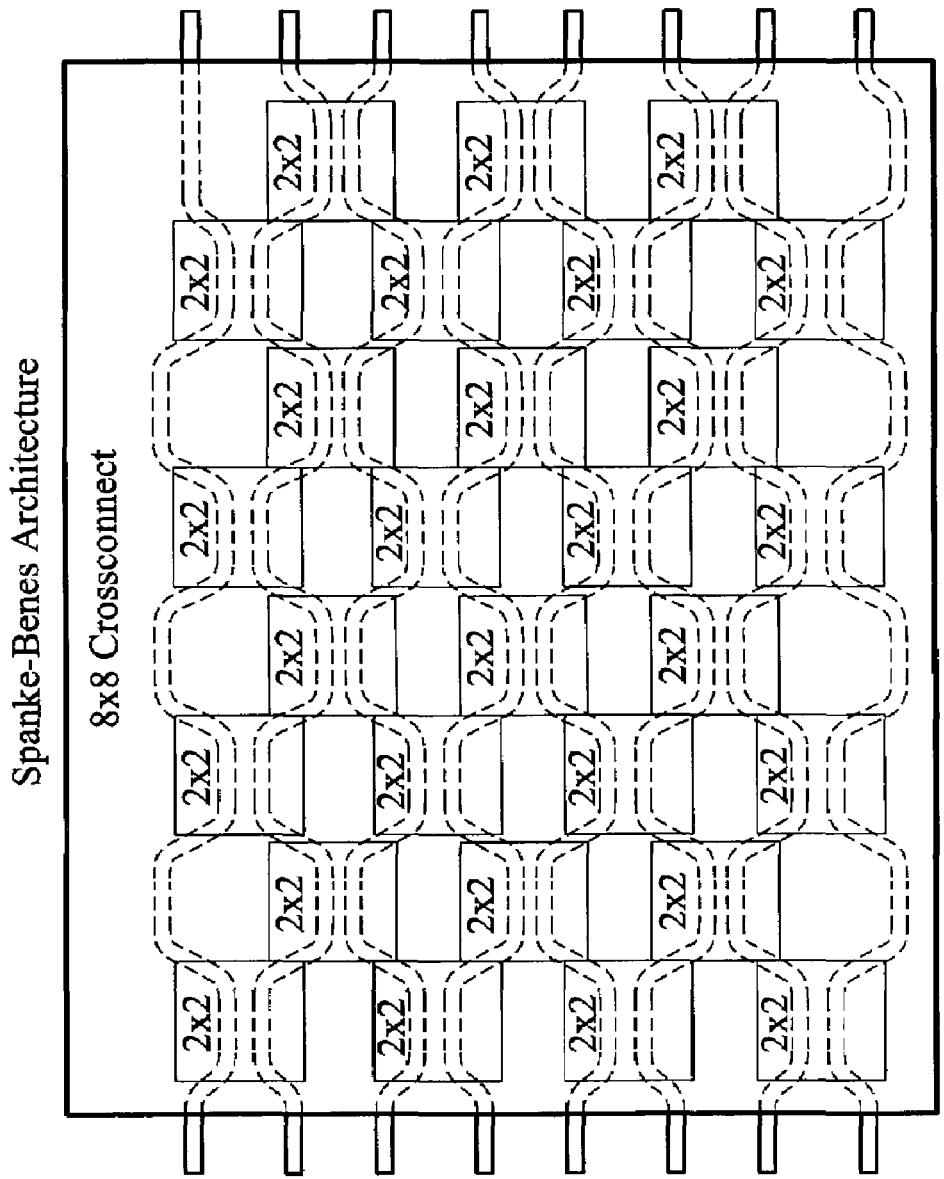
FIG. 19 illustrates a schematic drawing of a 8×8 reconfigurable optical cross-connect.

N×M High-speed Optical Cross-connect (FIG. 19)

All-optical cross-connects are critical for high-speed data transmission through an optical network. Currently, cross-connects function with switching times on the order of milliseconds, appropriate for reconfiguring fixed pathways but not for dynamic data-packet switching. By combining the devices of the current invention, a novel high-speed optical cross-connect is enabled, allowing all-optical reconfiguration at speeds greater than 10 THz.

Two particularly preferred configurations are Benes and Spanke-Benes architectures, however, many other potential architectures are known and will be apparent to one of skill in the art. A list of alternative architectures can be found in "Optical Networks, a Practical Perspective", by Ramaswami and Sivarajan, section 3.7 (1998), which is included herein by reference.

A novel aspect of the present invention relates to a 2×2 optical cross-connect comprising either a MZ interferometer switch or a directional coupler of the present invention. The device is preferably embodied in a planar waveguide, more preferably a monolithic waveguide (optionally pseudo-monolithic, comprising several die) with silica or doped silica as the waveguide core material.

A further aspect of the present invention is an N×M optical cross-connect comprising a plurality of 2×2 optical switches in one of the architectures described above. This novel cross-connect can be operated at speeds as fast as the individual switches (up to 10 THz). In this case, N and M preferably range independently between 1 and 10000, more preferably 1 and 1000, most preferably between 1 and 100. One or more switches can be fabricated on a single substrate to form an entire switching network on a chip. In a preferred embodiment, the current invention comprises a 2×2 cross-connect fabricated on a single chip. In alternative preferred embodiments, the invention comprises a 4×4, an 8×8, a 16×16, a 32×32 or a 64×64 cross-connect fabricated on a single chip. Optionally, one or more chips can be combined to further increase the node cross-connect size and dimensions accessible with the current invention. Each multi-switch structure preferably comprises a nonlinear directional coupler, a MZ interferometer or a combination thereof.

N×Mλ High-speed Wavelength Converting Optical Cross-connect

An all-optical wavelength converting cross-connect is not known in the art. A wavelength converting optical cross-connect comprises a plurality of high-speed optical cross-connects with a plurality of high-speed wavelength converters. The materials and devices of the present invention enable this novel device. The specific embodiment of each component can be selected from a list of those described above. This aspect of the present invention is novel and is an unexpected advance over the prior art.

Figure 20:
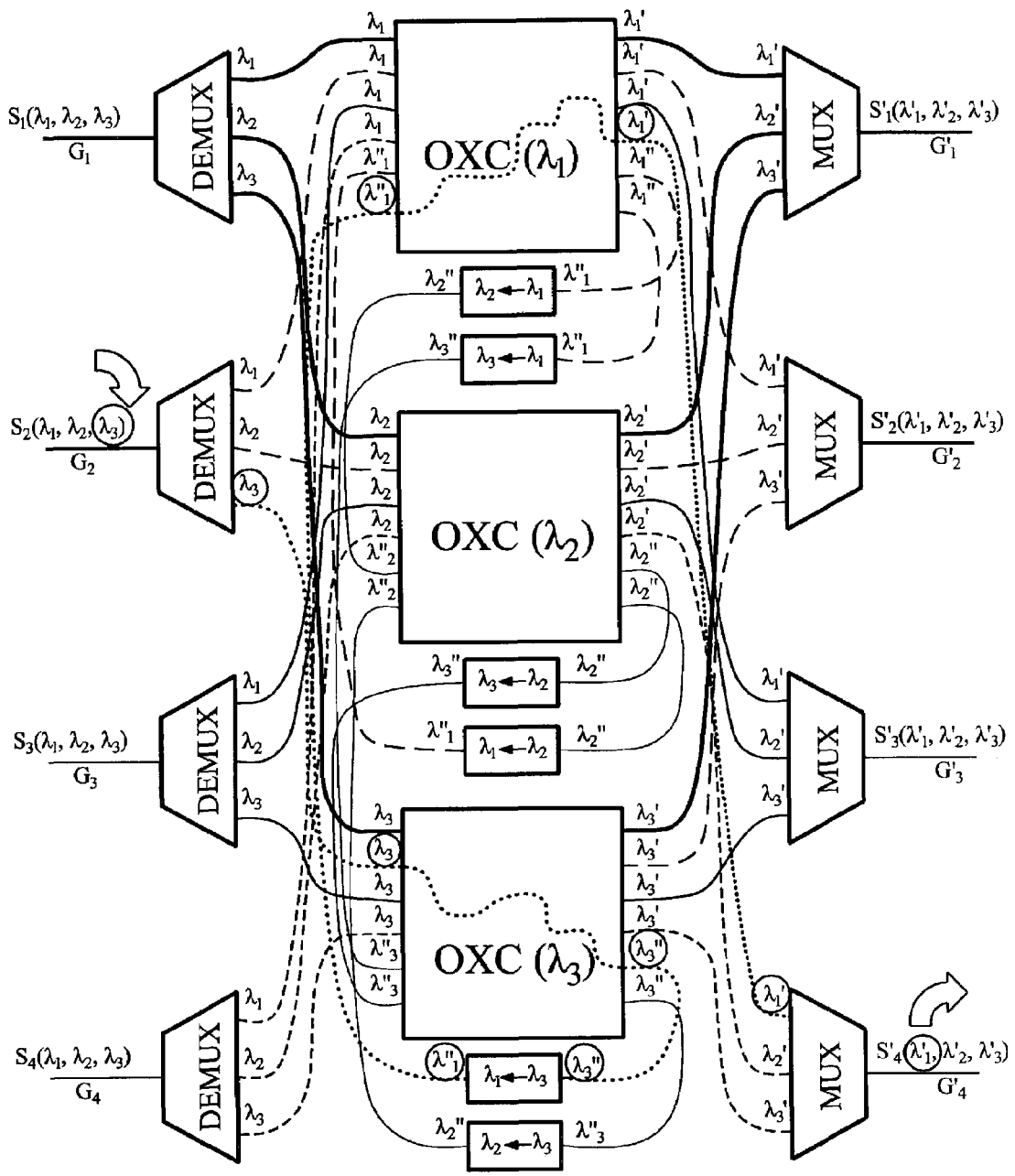
FIG. 20 illustrates a wavelength converting optical cross-connect subsystem in accordance with an embodiment of the invention.

In a preferred embodiment, multiple WDM signals $S_1$, $S_2$, $S_3$ . . . $S_N$, arrive at the wavelength converting optical cross-connect along multiple different waveguides ($G_1$, $G_2$, $G_3$ . . . $G_N$); each signal comprising multiple wavelengths ($\lambda_1$, $\lambda_2$, $\lambda_2$ . . . $\lambda_M$) carrying data. FIG. 20 shows a simple embodiment of a wavelength converting optical cross-connect capable of switching between 3 wavelengths, 4 inputs and 4 outputs. One of skill in the art will recognize that similar sub-systems can be created that are capable of processing higher numbers of wavelengths, inputs and outputs. Similarly, while the embodiment of FIG. 20 is an N×N×λ cross-connect, it will be apparent that an N×M device can also be designed.

Each signal ($S_n$) from each fiber ($G_n$) is demultiplexed into the component single-wavelength signals ($\lambda_{n,1}$, $\lambda_{n,2}$, $\lambda_{n,3}$ . . . $\lambda_{n,m}$) Each of the M individual wavelengths is input into a different (M+N−1)×(M+N−1) optical cross-connect (OXC$_1$, OXC$_2$, OXC$_3$ . . . OXC$_M$), such that the first N inputs of cross-connect OXC$_1$ receive input signals ($\lambda_{1,1}$, $\lambda_{2,1}$, $\lambda_{3,1}$ . . . $\lambda_{N,1}$) from waveguides $G_1$, $G_2$, $G_3$ . . . $G_N$, the first N inputs of OXC$_2$ receive input signal from ($\lambda_{1,2}$, $\lambda_{2,2}$, $\lambda_{3,2}$ . . . $\lambda_{N,2}$) from waveguides $G_1$, $G_2$, $G_3$ . . . $G_N$, etc. Note that in this design, all of the signals arriving at each individual optical cross-connect have the same wavelength.

The first N output ports of each cross-connect, follow the inverse path as the input ports, combining the signals from the first output port of cross-connects OXC$_1$–OXC$_M$ ($\lambda'_{1,1}$, $\lambda'_{1,2}$, $\lambda'_{1,3}$ . . . $\lambda'_{1,M}$) into output guide G'$_1$, and repeating the same for each output port 2−N to output guide G'$_2$–G'$_N$. This allows any single wavelength in input $G_1$–$G_N$ to be switched to any single output G'$_1$–G'$_N$.

To facilitate transparent wavelength conversion, the remainder of the N+M−1 inputs and outputs are used to change the wavelength. A signal to be wavelength converted must be switched to an output port for the appropriate wavelength converter. After conversion, the signal must be transported to the appropriate cross-connect for the new wavelength. For instance, output port N+1 of OXC$_1$ may take a signal with wavelength $\lambda_1$ to a $\lambda_1 \rightarrow \lambda_3$ wavelength converter. The output of the converter is then routed to input N+1 of OXC$_3$. The signal can then be switched to any output port. The same is repeated for the remaining M−1 output ports, and for each cross-connect. The result is one embodiment of the present invention.

As an example of how data is transmitted through a wavelength converting cross-connect, consider the case in FIG. 20 in which data of wavelength $\lambda_3$ arrives by input guide $G_2$ (left-hand arrow) is to be converted to wavelength $\lambda'_1$ and switched to output guide G'$_4$. The following actions are required: $S_2$ in $G_2$ is demultiplexed and separated into individual component wavelengths ($\lambda_{2,1}$, $\lambda_{2,2}$, $\lambda_{2,3}$ . . . $\lambda_{2,M}$). Wavelength component $\lambda_{2,3}$ is routed to port 2 of cross-connect OXC$_3$. Through the appropriate interconnections of the cross-connect, the signal $\lambda_{2,3}$ is routed to output port 5, which is connected to a $\lambda_3 \rightarrow \lambda_1$ wavelength converter. The output of the wavelength converter leads to input 6 of cross-connect OXC$_1$. The signal (now $\lambda''_{2,1}$) is routed to output 4 and is then multiplexed into G'$_4$. The total conversion $\lambda_{2,3} \rightarrow \lambda'_{4,1}$ is complete. An identical procedure can be used to convert and connect any other input signal to any output signal. It will be apparent to one of skill in the art that the specific labels and locations of the input and output ports of the current invention are arbitrary labels, and that a plurality of alternative configurations are possible while maintaining the functionality of the embodiment of FIG. 20. This figure is presented for illustrative purposes only and is not meant to limit the scope of the current invention.

In an alternative embodiment, some or all of the components of the above example can be incorporated into a single chip. For instance, a single chip may comprise all of the circuits for wavelength conversion to $\lambda_1$, a second chip could then comprise all of the circuits for wavelength conversion to $\lambda_2$, etc. Alternatively, all wavelength conversion can be contained within a single structure, as can all of the cross-connects. Similarly, wavelength conversion and cross-connects can be incorporated into a single chip, as can the entire device. In light of the current invention, one of skill in the art will recognize that there is a plurality of configurations consistent with the current invention, all of which are expressly assumed and claimed under this patent.

Presently, an all-optical wavelength converting cross-connect is not known in the art. This aspect of the present invention is a novel and surprising improvement over the optical system currently known, and is claimed specifically under this invention, as are all other related configurations.

Terahertz TDM Mux/Demux

The use of Time Division Multiplexing (TDM) in communication systems is a well-known method of combining several low-bandwidth data streams into a single high-bandwidth stream. Currently, multiplexers and demultiplexers for TDM are limited by the available speed of switching, and are therefore limited in the bandwidth that they can provide. One novel aspect of the current invention relates to a high-speed optical communication system operating TDM at up to 10 THz. The basic system comprises a 'TDM mux' to bit-interleave several low-data-rate sources into one high data rate signal for aggregate transmission over optical fiber to a 'TDM demux' that then deinterleaves the pulses and bit-fills down to the slower data rates. Both the TDM mux and demux comprise the materials and devices of the present invention.

Figure 21:
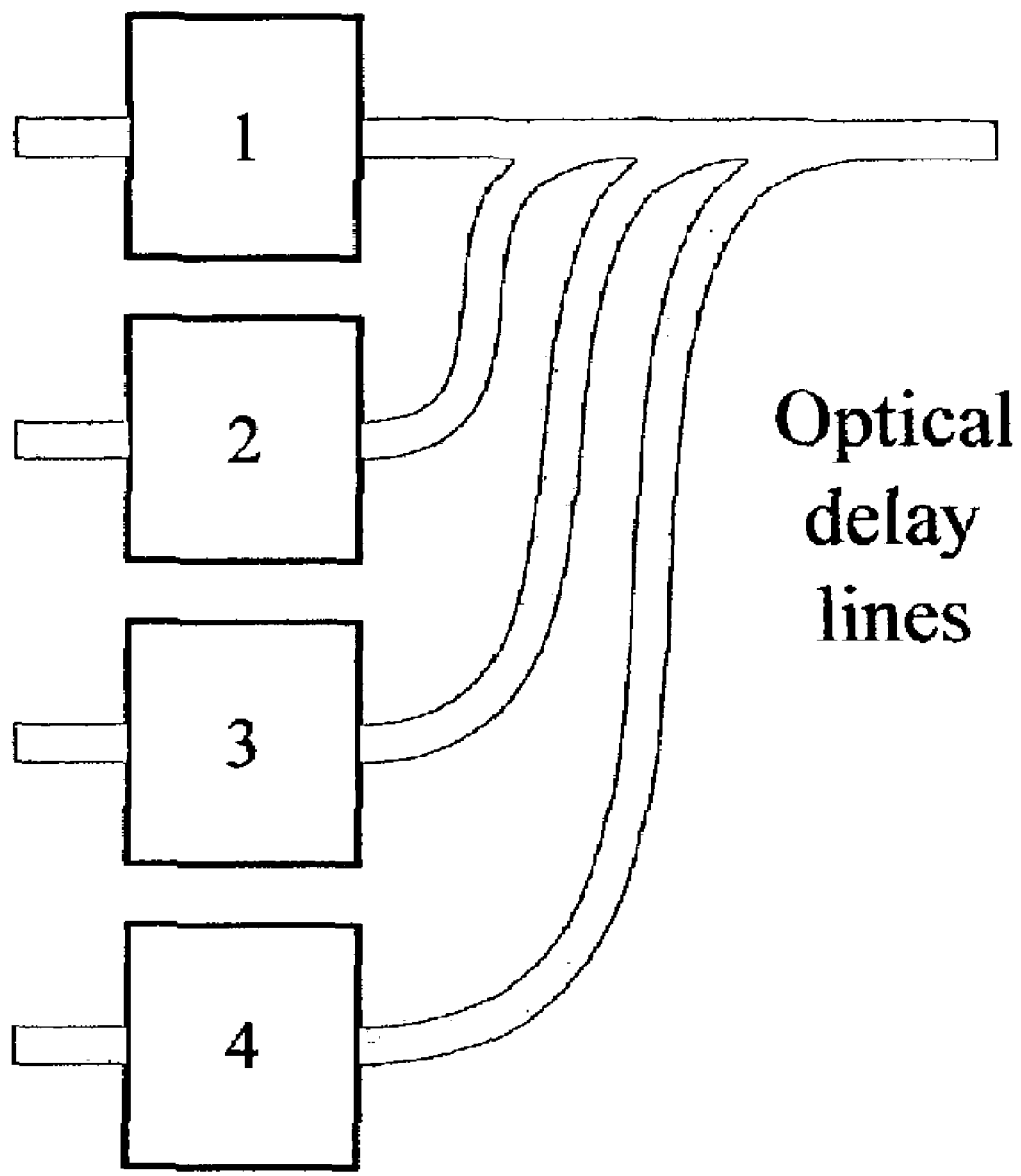
FIG. 21 illustrates an all-optical TDM multiplexer in accordance with an embodiment of the invention.

The TDM mux has two parts (FIG. 21): The first is a bank of All-Optical Data Samplers that sample the edge of slow optical data streams (in parallel), resulting in a short duration pulse that is synchronous with the data edge. The second part is a series of optical delay lines that serve to interleave the fast pulses created by the bank of optical edge-samplers. The number of channels that can be interleaved is determined solely by the shortest pulse that can be generated by the all-optical samplers.

Two possible embodiments represent novel aspects of a novel all-optical sampler: One preferred embodiment is a MZ structure of the present invention (either symmetric or asymmetric), optionally followed by an all-optical switch of the present invention to remove the after-pulse. A second preferred embodiment is an asymmetric ring resonator comprising an engineered nonlinear nanocomposite material.

Figure 22:
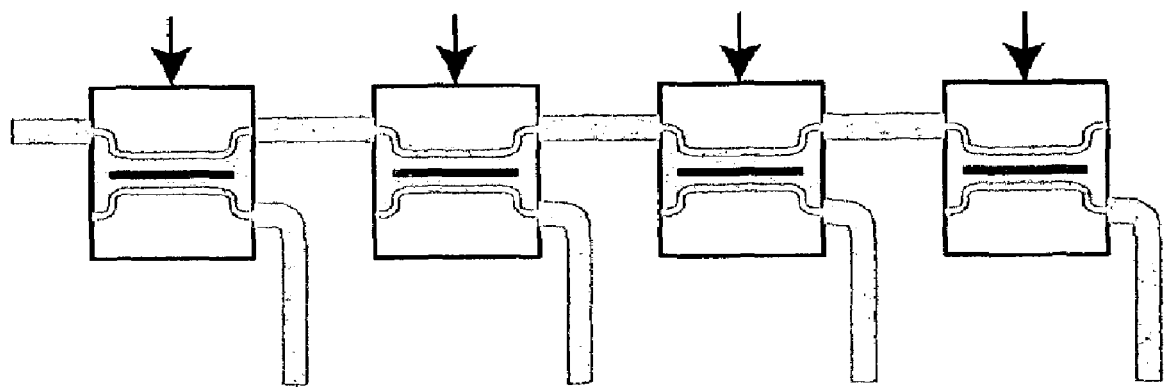
FIG. 22 illustrates an all-optical TDM demultiplexer in accordance with an embodiment of the invention.
Figure 23A:
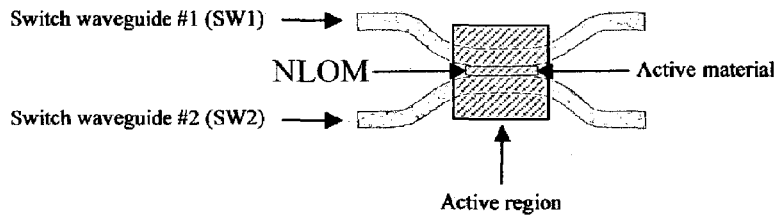
FIG. 23A, FIG. 23B, FIG. 23C, FIG. 23D, FIG. 23E, and FIG. 23F illustrate methods of introducing a trigger pulse into an optical device.
Figure 23B:
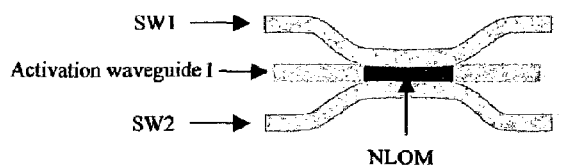
Figure 23C:
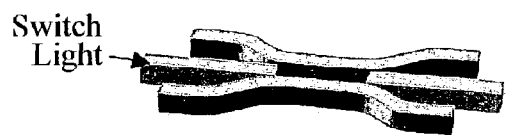
Figure 23D:
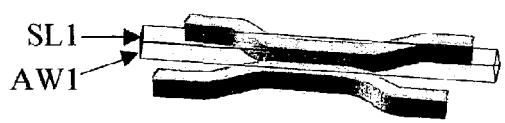
Figure 23E:
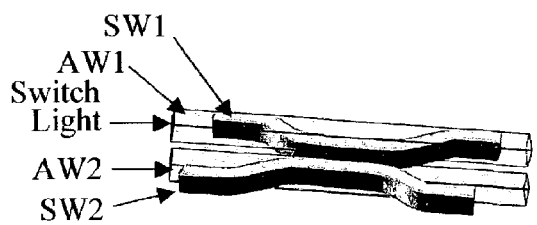
Figure 23F:
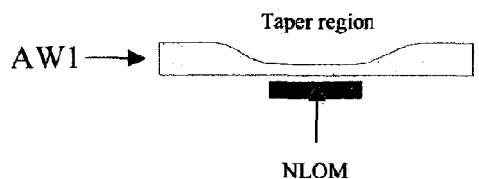
Figure 24A:
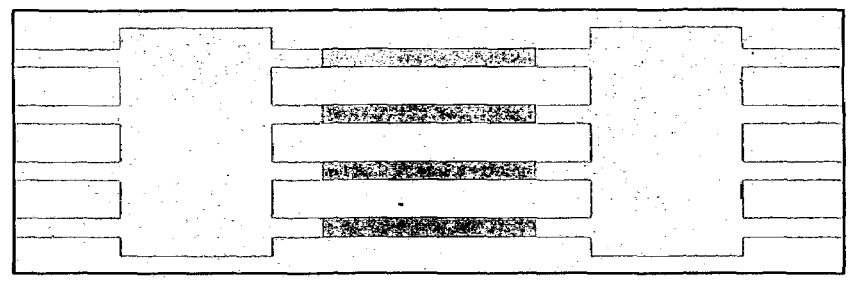
FIG. 24A, FIG. 24B, FIG. 24C, and FIG. 24D illustrate three preferred embodiments of a generic optical device with one example of a possible illumination pattern for one of these embodiments.
Figure 24B:
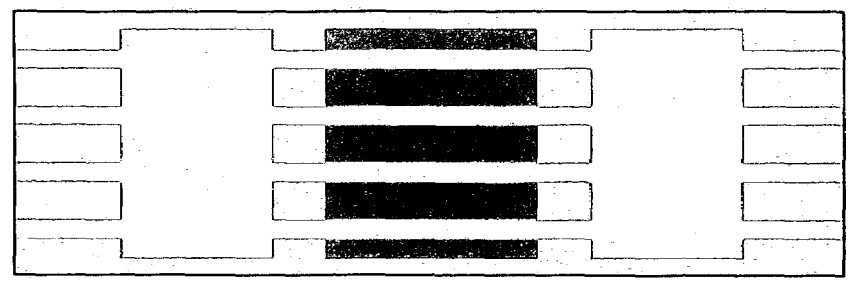
Figure 24C:
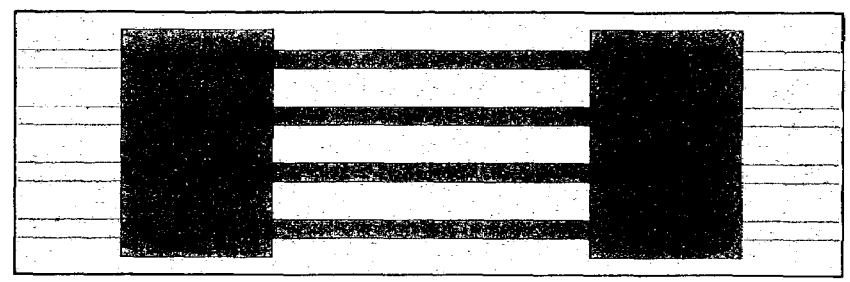
Figure 24D:
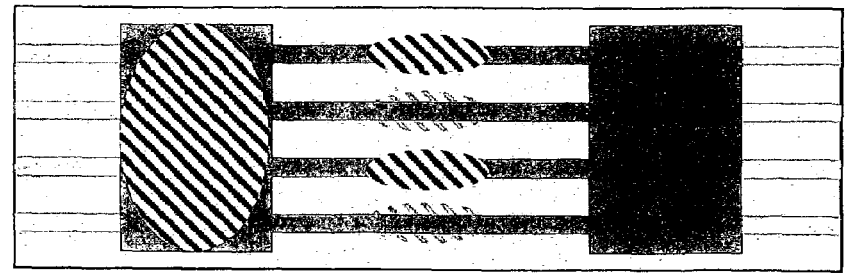

There are several ways to implement a novel TDM demultiplexer using the materials and devices of the present invention. One preferred embodiment is a synchronous readout from a block of nonlinear switches of the present invention (FIG. 22). The operation of this device is much the same as a shift register with parallel readout. The high-speed data-stream passes into the switch. When external timing determines that the data frame is fully within the system (or about to be), the control pulse fires and the fast bits are de-interleaved in parallel.

High-speed mux and demux elements comprising the materials of the present invention are novel, both in structure and function, and are claimed herein.

Pulse-narrowing and CW-to-Pulsed Conversion

Another system that is enabled by the materials and devices of the current invention is one that reduces the pulse width of an optical signal. Such devices are required for converting slow, broad optical pulses to fast, narrow pulses prior to TDM multiplexing, or for regeneration, retiming and pulse reshaping. Output pulses of less than 100 fs are achievable using this novel invention.

Using either the MZ or directional coupler described above, the signal to be pulse-narrowed is input into one of the input waveguides simultaneously with a synchronous trigger-pulse applied to the active region. The input signal, modulated by the trigger is output containing the same data-stream, but pulse-widths comparable to those of the trigger-pulse. The output pulse width is determined by the trigger-pulse width, and can be varied from CW to <100 fs. Since the wavelengths of the data and trigger-pulses need not be the same, the same device can perform simultaneous pulse narrowing and wavelength conversion.

The same device can also be used to convert a CW signal into a pulsed signal, with a pulse width comparable to the trigger-pulse width. This method of generating a pulsed signal from a CW source is another novel aspect of the current invention.

Both pulse narrowing devices and CW-pulsed conversion devices with the capacity to function at rates as high as 10 THz are novel and claimed under the present invention.

Methods of Introducing a Trigger-Pulse

There are a variety of methods for introducing the trigger-signal to the nonlinear optical material of the current invention. Currently, two methods of illumination are used in the art with nonlinear optical switches. The most common method is to launch the switch signal down one of the two waveguides such that it reaches the interaction region simultaneously with the signal pulse to be switched. This is described in detail in U.S. Pat. No. 5,642,453, which is included herein by reference. The evanescent illumination of the nonlinear material by the switching pulse as it travels through the interaction region can be enough to activate the switch. Due to the relatively high intensity of the evanescent field at distances as much as 1 to 2 microns beyond the waveguide interface, such illumination results in high-intensity, uniform illumination across the entire interaction length, yielding efficient switching. The disadvantage of this method of illumination is that the switching pulse travels between the two waveguides at the same time as the signal pulse, potentially contaminating the signal data-stream. In the case where the switching pulse is the same wavelength as used in a WDM signal, this can interfere with the data being transferred. In the case where the switching wavelength is selected to be a specific "header" wavelength, leakage into the pulse train can disrupt the timing of future switching for this particular data-stream. Either way, it is desirable to minimize the amount of switching light that is allowed to contaminate the signal pulse.

An alternative method of illumination is to use a third beam-path that results in orthogonal illumination of the interaction region, for instance, from above or from the side. Such a device is described in U.S. Pat. No. 5,136,669, which is included herein by reference. By illuminating from a direction that is perpendicular to the waveguide, intense illumination of the interaction region can be achieved without coupling directly into the guided modes of the switch. As a result, minimal cross-talk occurs. While cross-talk is minimized in this configuration, the disadvantage is that considerable optical power is required to produce the relatively high intensity illumination required over the entire interaction region. In addition, complicated beam-shaping optics may be required if homogeneous illumination is desired over the entire interaction length (rather than, for instance, Gaussian illumination).

Uniform, high-intensity illumination of the active region of a nonlinear waveguide switch will further reduce the required interaction lengths of the current invention, resulting in smaller switches, and lower activation intensities. This could eventually lead to telecommunication devices capable of direct-switching using an optical header-pulse, as well as all-optical logic circuits functioning as speeds up to 10 THz. The current aspect of this invention solves the existing problems related to efficient switching of light in a non-linear waveguide switch. Combined with the use of an engineered nonlinear nanocomposite material, this invention can substantially improve the performance characteristics of future all-optical switches.

Described herein are several novel methods of activating a nonlinear material in a nonlinear waveguide switch such that the activation is uniform, high-intensity and with minimal cross-talk between the activation pulse and the data-stream. These novel inventions are not limited to devices comprising an engineered nonlinear nanocomposite material, and can be used to activate any $\chi^{(3)}$-based optical device.

a) In a first preferred embodiment, uniform, high-intensity illumination of the nonlinear material between the switching waveguides is produced by illuminating longitudinally through the material. For instance, activation light can be applied through a waveguide that is parallel to the switch waveguides and in the same plane as the active material. In this case, the active material simply replaces the waveguide material within the interaction region.

There is a potential problem with this type of configuration. One primary requirement for a waveguide structure is that the light with the waveguide must be total internally reflected at the interface between the waveguide core and the material surrounding it. This requirement can only be met in the case where the index of refraction of the waveguide material is greater than that of the surrounding material. This is true of a typical waveguide structure, which has a core region frabricated from a material with a higher index of refraction than the cladding.

This must remain true within the interaction region in order for the switch to function properly as a waveguide. In this case, one requirement for an acceptable active region is that the index of refraction of the active material is less than that of the waveguide. Given this condition, activation light launched through the center of the active region, parallel to the waveguides, would necessarily experience the opposite relative index interface. As such, light launched into the active region would leak strongly into the waveguides, producing the opposite of the desired response.

b) In an alternative preferred embodiment, the trigger-signal is introduced along a waveguide that is parallel to the interacting waveguides, but located above or below the plane of the active material. In this case, activation is similar to that for light launched through the waveguides of the switch (i.e. evanescent, uniform and intense), but does not couple efficiently into the switch waveguides, which are oriented orthogonal to the dielectric interface between the activation waveguide and the active material.

Due to the relatively long wavelength of light used in telecommunications (~1500 nm), the penetration depth of the activation light within such a structure would be as much as 1–2 microns at high intensity. This activation could be further increased by incorporating a vertical taper to the activation waveguide, as described below. The result of such a taper is to increase the coupling, and therefore intensity, of the activation light into the activation region.

In one preferred embodiment, the invention comprises an optical-coupler waveguide switch as described above, with a third waveguide core located above the active region, and parallel to the switch waveguides as in FIG. 23A through FIG. 23F. This core may comprise the same material used in the switch waveguides, or it may be different. The core-material of the activation waveguide is preferably $SiO_2$ or may preferably be Si (either crystalline, polycrystalline or amorphous), or can be any combination therebetween (i.e. $SiO_{2-x}$). The activation-core-material preferably has an index of refraction that is greater than the index of refraction of the active material, and is preferably within the range of 1.45 and 4.0.

As will be appreciated by those skilled in the art, the dimensions of the activation waveguide will be selected depending on the specific choice of core and active material indices of refraction. In many cases, the core will have an index of refraction of between 1.45 and 1.55. In this case, the waveguide will preferably have a rectangular cross-section with a height and width less than 50 microns, more preferably less than 20 microns and most preferably less than 10 microns. The height and width can either be the same or different. In many preferred embodiments, the height will be less than the width. In one preferred embodiment, the width will be between 3 and 6 microns while the height will be between 1 and 3 microns.

In an alternative embodiment, further improvements can be achieved by incorporating a second waveguide, positioned parallel to the first activation waveguide, but on the opposite side of the active region from the first. This allows the activation light to travel between the two waveguides, increasing the penetration of the activation light to 1–2 microns within each of the waveguides (i.e. activating from both sides). In such a configuration, much of the active region of the switch can be efficiently illuminated in a uniform and intense manner across the entire length of the active region. In this embodiment, the activation waveguides should be spaced apart by a distance between 1 micron and 20 microns, more preferably between 1 and 10 microns and most preferably between 4 and 10 microns. In a preferred embodiment, the activation waveguides are spaced apart by a distance equal to or greater than the width of the signal-waveguides. The two activation waveguides are preferably mirror images of each other. Alternatively, each waveguide can be configured differently.

It is not necessary that the activation waveguide(s) be oriented in any particular way relative to the switch waveguides, merely that the evanescent electromagnetic field extending from the core of one or both of the waveguides interacts with the nonlinear material in the active region. As will be obvious to one of skill in the art, such a structure can be made in a variety of ways, including both symmetric and asymmetric configurations, with regard to the location of the activation waveguides, the active region and the switch waveguides. It is preferable, however, that the coupling region between the activation waveguides and the active material (or eachother), be oriented orthogonal to the interaction direction between the switch waveguides.

In a preferred embodiment, the trigger signal can be a header-pulse split from a data-stream for optical routing. Alternatively, this pulse can be any type of optical pulse traveling between switches in an optical network. Alternatively, the activation light, which is not substantially attenuated during the transit across the active region can be recovered after switching and either be recombined with the data-packet, or be routed to activate an additional switch.

Each of these 3D waveguide structures and devices are a novel improvement over other devices known in the art, and are claimed in accordance with the invention.

c) In an alternative embodiment, the trigger signal can be provided by a light-source such as a diode or laser resulting in an illumination of the nonlinear material of the switch from the top, bottom or sides. The timing and sequence of the trigger-pulse are controlled by logical electronic signals.

In one preferred embodiment, the light-source is a VCSEL (vertical cavity surface emitting laser). In a particularly preferred embodiment, the VCSEL is fabricated on a substrate separate from the waveguide. The VCSEL substrate is then positioned upside down over the optical switch, such that the VCSEL is located over the active region. Alternatively, the VCSEL may be fabricated and the optical switch fabricated directly on top of it (i.e. with the VCSEL as the substrate).

Alternatively, the previous embodiments can comprise of an array of VCSELs and an array of switches (n×m where n denotes the number of inputs and m denotes the number of outputs) such that an entire optical circuit is created. In this implementation, the location of the switching elements in the array and the VCSELs in the array are positioned such that each of the VCSELs illuminates an active region directly from the top or bottom. Each VCSEL can be activated independently or together, controlled by logical signals, to create the desired optical path. The implementation of these arrays of both the active regions and the VCSELs can be application specific.

An identical design can be used with any of the devices and systems of the current invention, such that each individual device is combined with 1 or more VCSELs to act as the trigger-pulse.

The use of a VCSEL or VCSEL array in direct or indirect contact with an optical switch of the present invention is novel and claimed under the present invention.

In the above embodiments, it is possible to provide feedback to the VCSELs such that dynamic trimming and control are provided. For instance, the switch could be designed to incorporate a photodiode at each output of the device such that a small amount of the light passing out each output is detected. This could be achieved by using a 99:1 splitter in front of the photodiode. If the relative signal along one of the outputs is higher than the other, feedback can be applied to the VCSEL such that the intensity is modulated to maximize the signal in that output, or minimize the signal in the other. On the other hand, if the signal in the other output is higher, the signal is optimized the other way around. In this way, the exact intensity of the VCSEL for each switch position does not need to be known before hand; it is determined each time the switch is used. Alternatively, part of the assembly process can be to run every switch in both positions, and manually or automatically tune the VCSEL for optimum discrimination at each position. This would only need to be done once. Using this procedure, an identical set of switches can each be independently tuned for perfect function at a variety of different wavelengths. Dynamically controlled optical switching in a nonlinear optical switch is a novel and non-obvious process and is claimed under the present invention.

Generic Optical Device (FIG. 24A through FIG. 24D)

Another novel device enabled by the materials of the present invention is a device that acts as an arbitrary, generically configurable switch. This is a single optical component that can be fabricated on a large scale, and then be used in a variety of different ways to produce different devices. By having a single generic device, significant savings are realized in keeping appropriate levels of stock available for every part of an optical network.

The generic device comprises a generalized MZ switch, comprising two multimode-interaction devices (MMIs). The device comprises N single-mode input waveguides, that each lead into the first MMI at different locations along one side. On the opposite side of the first MMI, M single-mode connecting waveguides lead from the first MMI to the second MMI, each entering at different locations along one wall of the MMI. Finally, on the opposite wall of the second MMI, O single mode output waveguides lead away from the device. N, M and O, as well as any combination thereof may be equal or unequal in value. The widths of the input, connecting and output waveguides may be equal or unequal, as can the waveguides within each category. The lengths of the connecting waveguides may be the same or different.

In a preferred embodiment, an engineered nonlinear nanocomposite material is placed within at least one segment of each of one or more of the connecting waveguides. Alternatively, the nanocomposite may be placed around one or more of the connecting waveguides. Optionally, nanocomposite material may be placed within some or all of the first or second MMI or both.

By selecting the lengths and spacing of the MMIs and the connecting waveguides, it is possible to create a generic device capable of acting as an NxO cross-connect, an optical filter, a wavelength demultiplexer, and a variety of other devices. Control of the device can be achieved by illuminating the active material in any one or all of the connecting waveguides, modulating the interference of the different outputs into the second MMI. The effective length of the first and/or second MMI can be changed by illuminating the active material in those regions.

By sending a single multi-wavelength signal into one of the input waveguides, the wavelengths can be separated in a way similar to an Arrayed Wave Guide (AWG). Rather than using differences in connecting length, differences in illumination intensity in the connecting region can be substituted. By connecting only one of the output waveguide to an outside device, modulation of the phase in the connecting regions can be used to control which wavelength is routed to the active output waveguide. In this way, the system acts as a tunable optical filter.

By sending a single wavelength into one input waveguide, the single can be modulated to any combination of output waveguides by controlling the phases in the connection region. Similarly, multiple signals can be sent to two or more of the input waveguides, and switched to any of the output waveguides in a similar manner. By independently controlling the index of refraction in the MMI regions and in the connecting regions, it is possible to create an arbitrary configuration for this generic optical device.

Tunable Waveguide Filter

The above-defined generic device can also be designed with a single input to act as a wavelength demultiplexer. The operation of a traditional AWG is based on the recombination of phased versions of equal splits of the input signal. Full control of the phase of each individual split (in the phased array) is sufficient to separate one single wavelength from the rest at the output free propagation region. This type of tunable wavelength filter is novel and claimed under the present invention.

Optical Regenerator

This novel apparatus utilizes the intensity dependence of spectral broadening due to self-phase modulation to perform optical reshaping. Information on the spectral changes due to self-phase modulation can be found in "Self-phase-modulation in silica optical fibers," R. H. Stolen and Chinlon Lin, *Physical Review A* 17, 1448 (1978). Assuming the majority of the pulse energy is in the undistorted portion of the data pulse, one can use a high-pass (low-pass) filter to separate the self-phase modulation shifted spectra due to the desired portion of the data pulse and block the less-shifted spectral components due to the lower intensity distortions in the data pulse.

Mintera uses silica fiber as a means of producing self-phase modulation. Due to the relatively low $n_2$, at typical intensities used in telecommunications this requires relatively long lengths of fiber. Using an engineered nonlinear nanocomposite material, one can increase $n_2$ and thus decrease the length of nonlinear material required to produce self-phase modulation. Thus, this type of signal regenerator can be incorporated into photonic integrated circuits. A preferred planar waveguide self-phase modulation device comprising an engineered nonlinear nanocomposite material represents a substantial improvement over the prior art, which required kilometers of fiber to produce the same effect. Even in a fiber-optic based self-phase modulation device, lengths can be dramatically reduced relative to those known in the art.

Micro-ring Array Switches

This apparatus utilizes field enhancement due to constructive interference of fields and an effective interaction length enhancement using a micro-ring structure to make all-optical switching using quantum dots more effective. The enhancement is primarily due to multiple round trips (cavity lifetime) in the ring resonator [see, e.g., "Enhanced all-optical switching by use of a nonlinear fiber ring resonator," John E. Heebner and Robert W. Boyd, *Optics Letters* 24, 847 (1999)]. Use of nonlinear optical materials with large $n_2$ will allow the resonator size to become smaller, thereby improving the temporal response of the all-optical switch, which is determined by the number of round trips. In addition, smaller devices allow for integration of devices of multiple functionality.

In an alternative embodiment, a micro-ring can be combined with an engineered nonlinear nanocomposite to form a tunable filter. This novel device comprises a micro-ring with an engineered nonlinear nanocomposite material incorporated into the coupling region between the transmission waveguide and the micro-ring. Alternatively, an engineered nonlinear nanocomposite can additionally be incorporated into the ring itself. In this case, the nanocomposite may either be located within the waveguide core of the ring or in the ring cladding. By changing the index of refraction of the nanocomposite in the coupling region, the finesse of the ring can be modified, increasing or decreasing the bandwidth of the optical filter. By changing the index of the nanocomposite within the ring, the effective ring-size is changed, adjusting the center wavelength of the filter.

Digital Optical Switch

Due to the inherent sensitivity of interferometers, they tend to be wavelength, polarization, temperature, and dimension sensitive. An alternative is to use a digital optical switch, i.e. a switch that is ideally fully on with the application of an input signal. In general, this class of switch requires more switching power (or the devices are longer) and may be higher loss than interferometric optical switches, due to the need for adiabatically coupling light from one waveguide to another. One example is to use an adiabatic Y-branch, whereby an appropriate index increase at the junction can cause light to propagate into one of two waveguides after the junction. Another example is to use an asymmetric nonlinear directional coupler, where one arm of the nonlinear directional coupler experiences an increase in index, which makes that arm preferentially guiding. Both of these examples require illumination of the nonlinear optical material from the top. As a result, there is little leakage light. Alternatively, one can envision bringing in a control pulse with a waveguide in close enough proximity to the Y-branch such that the evanescent tails of the control beam can affect the cladding layer of one arm of the Y-branch so as to cause preferential guiding into the appropriate arm. One can also envision using a similar approach using an arrayed waveguide by affecting the cladding of one of the arms to cause switching.

Absorptive Modulator

It has been known in the art that quantum dots have extremely large intraband absorption cross-sections (Guyot-Sionnest, 1997). An intraband transition occurs when a quantum dot is resonantly excited, and the resulting electron-hole pair is subsequently excited by a photon into a higher excited state. Due to the quantized nature of the excited states in quantum dots, the materials described herein enable a novel type of tunable absorptive modulator. This application of the materials of the present invention enables a novel type of modulator with an extremely large dynamic range. This represents a substantial and surprising improvement over absorptive modulators previously described in the art.

One novel aspect of the current invention relates to using resonant optical excitation to modulate the level of absorption of a light beam. In this aspect, photons that are higher in energy than the bandgap of the engineered nanocomposite material are used to excite electron-hole pairs that subsequently absorb photons at the wavelength of the second beam. The size and material of the quantum dots used in this aspect of the present invention are selected so as to minimize direct absorption of the second beam by quantum dots in the ground-state. As the intensity of the resonant excitation increases, the level of absorption of the second beam increases. Due to the extremely large intraband cross-sections, extremely large modulations are obtainable. In a preferred embodiment, the engineered nanocomposite is selected such that the energy of at least one intraband transition from the lowest excited state matches that of the wavelength range-of-interest for the second beam. Optionally, the size distribution can be selected such that the distribution of intraband transition energies covers a large wavelength range-of-interest, preferably greater than 100 mm around 1550 nm and 1300 nm. Alternatively, the size distribution is optionally selected such that only a small subset of wavelengths are absorbed, preferably less than 50 nm, more preferably less than 25 nm around 1550 nm or 1300 nm.

In one embodiment, the engineered nanocomposite material is incorporated into a waveguide core such that a second beam transmitted along the core is attenuated in the presence of the resonant beam, with the level of attenuation related to the intensity of the resonant beam. Optionally, the second beam is not significantly attenuated in the absence of a trigger signal, preferably less than 10% attenuation, more preferably less than 5%.

In an alternative embodiment, the nanocomposite material is incorporated into an optical fiber core. Alternatively, the material is incorporated into the cladding of a waveguide or fiber optic. Alternatively, the material is incorporated into a free-space optical system.

In a preferred embodiment, the resonant light and second beam are independently selectable from the list of a trigger signal a data signal and another signal. The resonant and/or second beam are independently selectable from the list of a CW signal, a non CW signal and a pulsed signal. In a particularly preferred embodiment, the device corresponds to a wavelength converter.

Preferably, the resonant beam is of shorter wavelength than the second beam. Optionally the wavelength of the resonant and second beam are the same. Alternatively, the resonant beam is longer than the second beam, such that the resonant beam results in significant 2-photon absorption of the active material.

Alternatively, the quantum dots within the engineered nanocomposite material are excited electrically, such that attenuation of the second beam is related to the level of quantum dot charging within the nanocomposite. Optionally, the matrix of the engineered nanocomposite comprises a conducting material. Conducting matrix materials include, but are not limited to conducting polymers, conducting glasses, semiconductors, metals, or clear conductors such as indium tin oxide.

Alternatively, the quantum dots are excited thermally, resulting in attenuation of the second beam. Optionally, the quantum dots are excited by cathodo-excitation. Alternatively, the quantum dots are excited chemically.

Integrated Optical Pump for Quantum Dot Lasers and Amplifiers

Quantum dot based lasers and amplifiers currently suffer from a lack of an efficient means of electrical excitation. One means around this problem is to find efficient and inexpensive means of optically exciting quantum dots for use as lasers and amplifiers. Others have demonstrated this in integrated self-assembled InP quantum dots pumped by an integrated laser. A novel type of SOA comprises a well-established, inexpensive pump laser (e.g., 980 nm pump lasers for EDFAs) a means of focusing the pump beam, and the quantum dot nonlinear optical material. These could potentially find application wherever SOAs are currently being considered (e.g., inexpensive multi-wavelength amplifiers, all-optical switches and wavelength converters, etc.). Additionally, an optically pumped quantum dot laser would require a pulsed laser source (to overcome fast Auger recombination) and a means of producing a laser cavity.

Resonant Index Change

Many of the optical switching applications being considered for the engineered nonlinear nanocomposite material can be used close to the one-photon resonance as well, however, one has to deal with losses due to absorption. One means around this is to utilize the nonlinearity in the presence of gain, i.e., use inverted quantum dots. Ideally, one would have an efficient means of injecting and extracting charge from the quantum dots. This may be performed by altering the surface chemistry by directly attaching conducting polymers or molecular wires. Alternatively, optical excitation may be used to utilize the resonant index change.

Preferred Waveguide Structures

The following devices and structures are novel structures for use in optical waveguides:

2D and 3D Tapered Waveguides

In order for a waveguide system to be coupled into an optical network, it is generally necessary to attach a traditional cylindrical fiber to the edge of the planar circuit. To minimize coupling losses between the cylindrical fiber modes and the rectangular waveguide modes, the planar waveguide at the interface is preferably square with dimensions similar to that of the fiber (the absolute dimensions for optimal coupling depend on the index difference between the waveguide core and cladding). For telecom single mode fiber (with core diameter between 8 and 9 $\mu$m) and a typical planar waveguide index difference of ~7%, the optimal waveguide dimension to match the fiber is around 6 $\mu$m×6 $\mu$m.

In the devices of the present invention, device length is typically the fundamental limit to the number of devices that fit on a single chip (and hence sets the maximum optical circuit complexity that can be achieved). Depending on the structures used, waveguide width can have a dramatic impact on device length, as it significantly impacts the amount of evanescent coupling into the surrounding cladding. A directional coupler created with 6 $\mu$m wide waveguide cores will be more than twice as long as one made with 4 $\mu$m wide cores (assuming a uniform core height of 6 $\mu$m and separation distance of 4 $\mu$m).

Equally important for devices based on engineered nonlinear nanocomposite materials is the fact that smaller waveguides concentrate optical energy, increasing intensity and enhancing the nonlineamonlinear response of the devices of the present invention.

To address this situation, we propose a novel waveguide structure: a waveguide taper (a region in which the waveguide dimensions are slowly (adiabatically) transitioned from one set of dimensions to another). Horizontal tapers can be manufactured using standard lithographic techniques. Vertical tapers, however, are another matter.

One novel aspect of the present invention is the vertical taper, and methods for formation thereof. Another aspect of the present invention is a 3D taper comprising a vertical taper, and methods of fabrication thereof.

In a preferred embodiment, a vertical taper is fabricated by imprinting a tapered mask onto the waveguide and then transferring it into the silica to create a vertically tapered waveguide. In combination with a taper in the mask-width, a 3D tapered waveguide is formed.

In another preferred embodiment, vertical tapers are manufactured using a "graded etch" (partially expose a layer of photoresist such that it will have higher resistance to etching in areas that should be thicker. A graded etch can be achieved by exposing resist through an aperture grid, with the aperture size and/or grid spacing defining the grade and exposure levels. In this embodiment, the mask may optionally be defocused to create a uniform gradation between the apertures. Then a "uniform" etching process will remove more material from regions in which the resist is less resistant, leading to horizontal gradients in layer thickness.

In yet another preferred embodiment, a standard resist is used with a mask with a variable density of non-imaging structures in the waveguide area. This results in a difference in the photon flux reaching the resist, yielding a differential rate of dissolution in the developer. The result is a taper in the vertical direction. This taper can then be transferred to the underlying silica using either etch techniques or implant etch techniques. In the etch technique, the etch rate of the photoresist and the underlying silica are adjusted to be equal using various process parameters that may include but are not limited to pressure, composition, power and temperature. Hence, when this stack is etched under the above conditions, a tapered waveguide is formed. Using an implant technique, the taper is used to implant a species to different depths within the layer. Subsequently the layer is etched and the taper of the mask is transferred to the underlying silica.

Tapered & Graded Claddings

Transitioning from one cladding material to another is critical in many of the devices of the present invention. For instance, a doped silica cladding might be used for efficient coupling at a fiber-waveguide interface, and then be transitioned to an air cladding in order to minimize losses due to tight waveguide bends. This cladding may then transition to a third material comprising the active material for a device. Abrupt transitions in index of refraction in either the cladding or waveguide core can lead to excitation of higher-order optical-modes that degrade the performance of many integrated optical devices. Current fabrication techniques make it very difficult to introduce a longitudinal gradient in the index of refraction of the cladding.

Figure 25B:
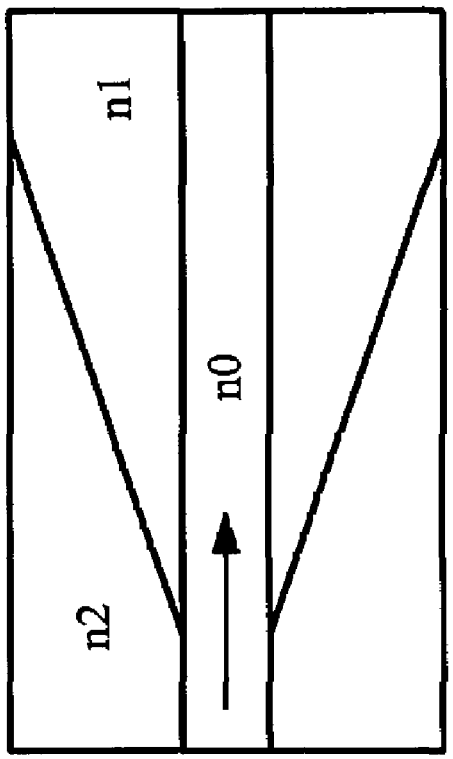
FIG. 25A and FIG. 25B illustrate a schematic drawing of tapered claddings. In both figures, the arrow signifies the direction of propagation of the light.
Figure 25A:
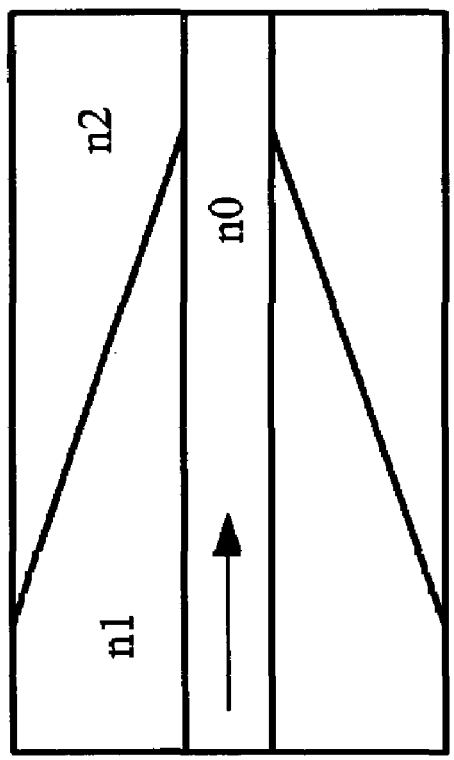

To facilitate such transition, we propose a novel waveguide structure, a tapered cladding, to transition between cladding regions of different materials (FIG. 25A and FIG. 25B). The direction of the taper is chosen such that the lower index cladding resides farthest away from the core. The taper must be sufficiently long for adiabatic coupling (between 200 and 10000 $\mu$m, preferentially $\geqq$500 $\mu$m). Vertical cladding tapers may be achieved using the same techniques described for vertical waveguide core tapers above. Neither the waveguide, nor the taper need be straight, however it is recommended that the taper thickness be varied monotoically with distance.

Alternatively, it is possible to combine cladding tapers with waveguide core tapers to facilitate much shorter taper lengths while retaining an adiabatic transition. By properly selecting the initial and final waveguide sizes, the initial and final cladding indices of refraction and using a simultaneous tapering of the core and cladding, it is possible to create a perfectly adiabatic transition over distances far shorter than are achievable using either a waveguide core or cladding taper alone. In a preferred embodiment, the tapered core and cladding are designed so that the evanescent leakage of an optical mode within the core remains unchanged as light travels from one end of the taper region to the other. In one embodiment, the transition can be substantially abrupt.

A Bragg Antireflective Waveguide Grating

There are many benefits of using silicon as the waveguide core material. The primary one is that much sharper bends are possible with minimal losses. This can yield substantially smaller devices and therefore more devices per chip. One problem is that a signal will usually originate from a silica-core fiber. The Frenel-reflection from a silica/silicon dielectric interface ($n_{sio2}$:$n_{si}$=1.45:3.4) is equal to $[(3.4-1.45)/(3.4+1.45)]^2$=16%. This can be prohibitive if multiple switches must be interconnected by silica fibers.

To reduce reflection losses we propose a novel antireflective coating at the silica/silicon interface, formed by creating a Bragg grating in the silicon waveguide just inside the interface. In a preferred embodiment, such a Bragg-grating can be formed by creating a periodic spacing that creates an antireflective coating for the wavelength range-of-interest by etching and filling the waveguide with a series of lower- or higher-index layers. This is similar to what is described for the tunable waveguide grating above; however, it is unnecessary to use a nonlinear material. For instance, it may be possible to simply oxidize alternating sections of a silicon waveguide core to form the thin- or spacer-sections of an antireflective waveguide core.

Monolithic Micro-Optical-Bench

Another novel aspect of the current invention is a micro-scale free-space optical bench fabricated from monolithic silicon. This structure, methods of fabrication, and related devices are all novel and claimed under the present application. This aspect of the present invetion comprises a piece of monolithic silicon or other substrate material that can be anisotropically etched. By etching into the substrate, 3D structures can be formed, creating a plurality of angles and shapes; each forming an individual optical component. The material of the substrate is optionally reflective in the wavelength of interest, and optionally can be coated selectively to produce reflectivity with desired properties on specfic structures. In certain cases it is desirable for the material to be transparent to the wavelength desired, and when a coating of the appropriate thickness is applied, various ratios of the reflected to transmitted beam can be realized, including but not limited to a 3 dB splitter. By combining the elements of the micro-optical bench, a plurality of free-space optical configurations can be created, including but not limited to an anti-resonant ring.

Linear Arrayed Wave Guide

Another aspect of the present invention is a novel arrayed waveguide device in which the lengths of all of the connecting waveguides are the same. For a typical arrayed waveguide, the lengths of the connecting waveguides are varied to create phase differences in each guide (FIG. 26A). In the present embodiment (FIG. 26B through FIG. 26D), different effective lengths are created within same-length waveguide cores by inserting different lengths of a second index of refraction. By substituting a segment of each waveguide with a higher index material, the effective length is changed. To replicate the phase change of a standard arrayed waveguide, segments of different lengths can be inserted into each waveguide, such that the effective lengths of the waveguides match the actual lengths in a traditional arrayed waveguide device. In one preferred embodiment, this is achieved by doping the waveguides with a material such as germanium, and illuminating only a defined region of each waveguide, such that the largest illuminated segment is in the top waveguides, the next longest is the second waveguide, etc. Alternatively, a segment of silicon can be inserted into a silica waveguide structure in order to make the device very short. In this case, significant reflection loss may occur due to the index change at each interface, however, the loss along each channel is the same, yielding a device with the same performance as a traditional device.

One of skill in the art will recognize that there is a variety of ways in which to modify the index of refraction such that the length of each of the connecting waveguide remains the same, but the effective lengths are different. With such a device, it is possible to make an arrayed waveguide device that is substantially shorter, and can be fabricated in a strait line within an optical circuit. This is a substantial and surprising improvement over arrayed waveguides of the prior art.

Additional Data

Figure 27:
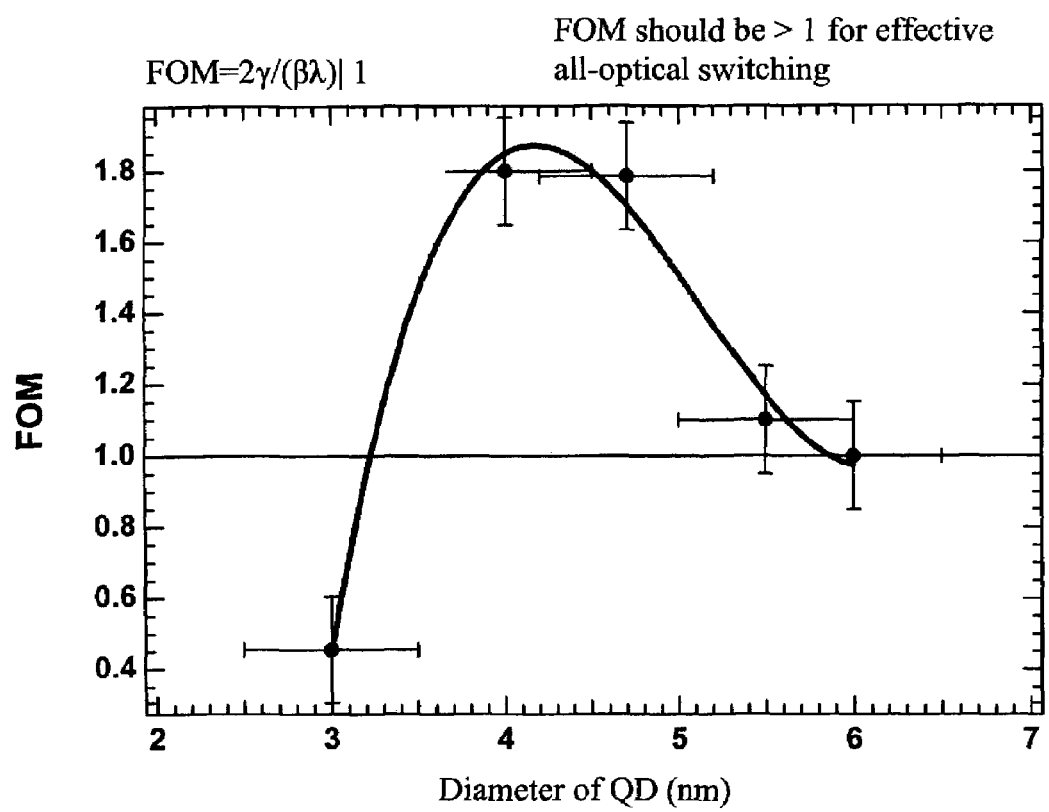
FIG. 27 illustrates figure-of-merit for all-optical switching with an engineered nonlinear nanocomposite material as a function of quantum dot size.

FIG. 27 shows the figure of merit (FOM) as a function of size for a nonlinear nanocomposite of the current invention. The present invention has been reduced to practice, and this data demonstrates one aspect of the tunable nature of the materials described herein. FIG. 4A and FIG. 4B demonstrate a second aspect of the present invention.

Figure 28:
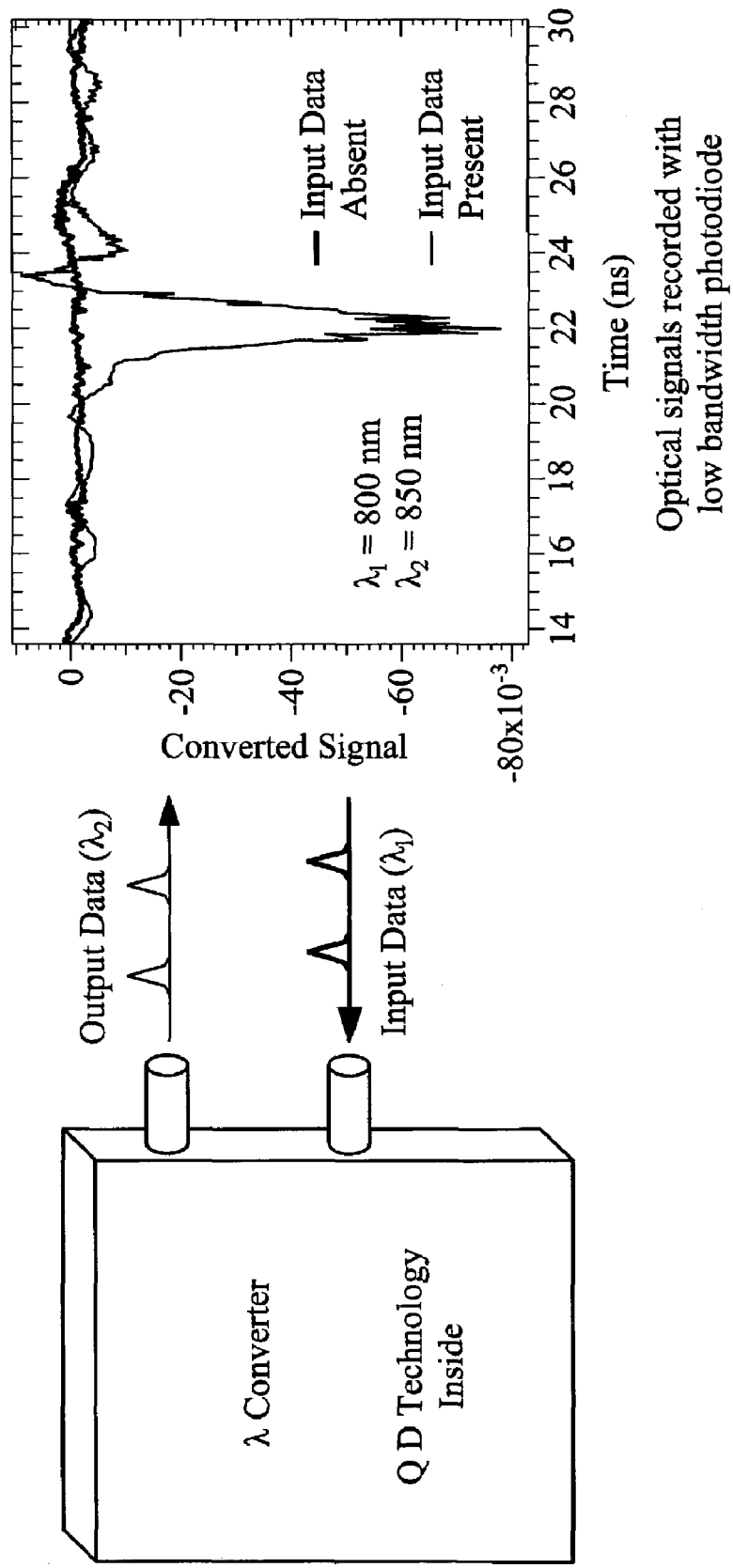
FIG. 28 illustrates demonstration of ultrafast all-optical wavelength conversion using an engineered nonlinear nanocomposite material of the invention.

FIG. 28 demonstrates the use of the materials and devices of the present invention for application as an ultrafast all-optical wavelength converter.

Figure 29:
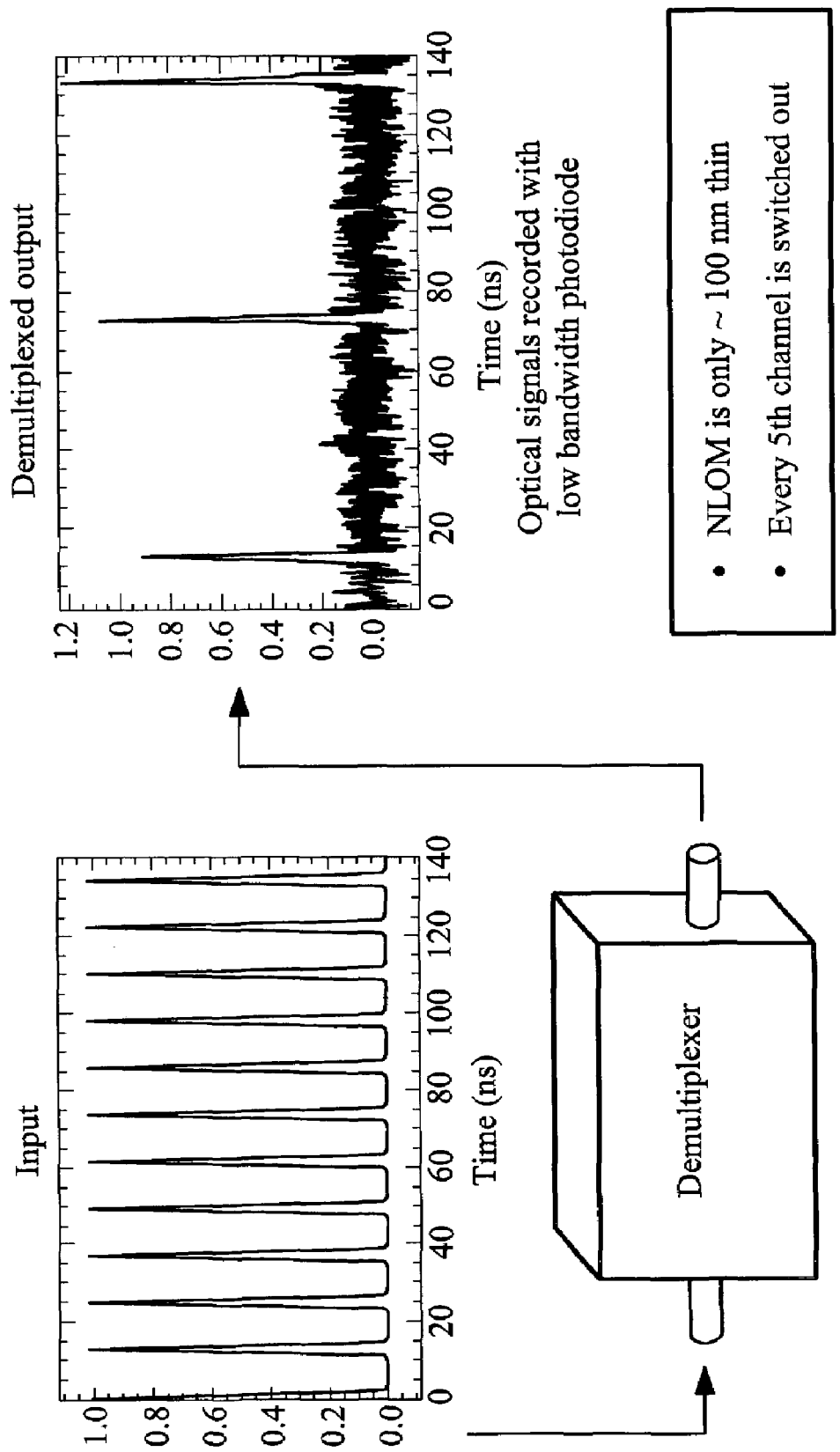
FIG. 29 illustrates demonstration of ultrafast all-optical demultiplexing for TDM systems using an engineered nonlinear nanocomposite material of the invention.

FIG. 29 demonstrates the use of the materials and devices of the present invention for application as an ultrafast all-optical demultiplexer for TDM systems.

Figure 30:
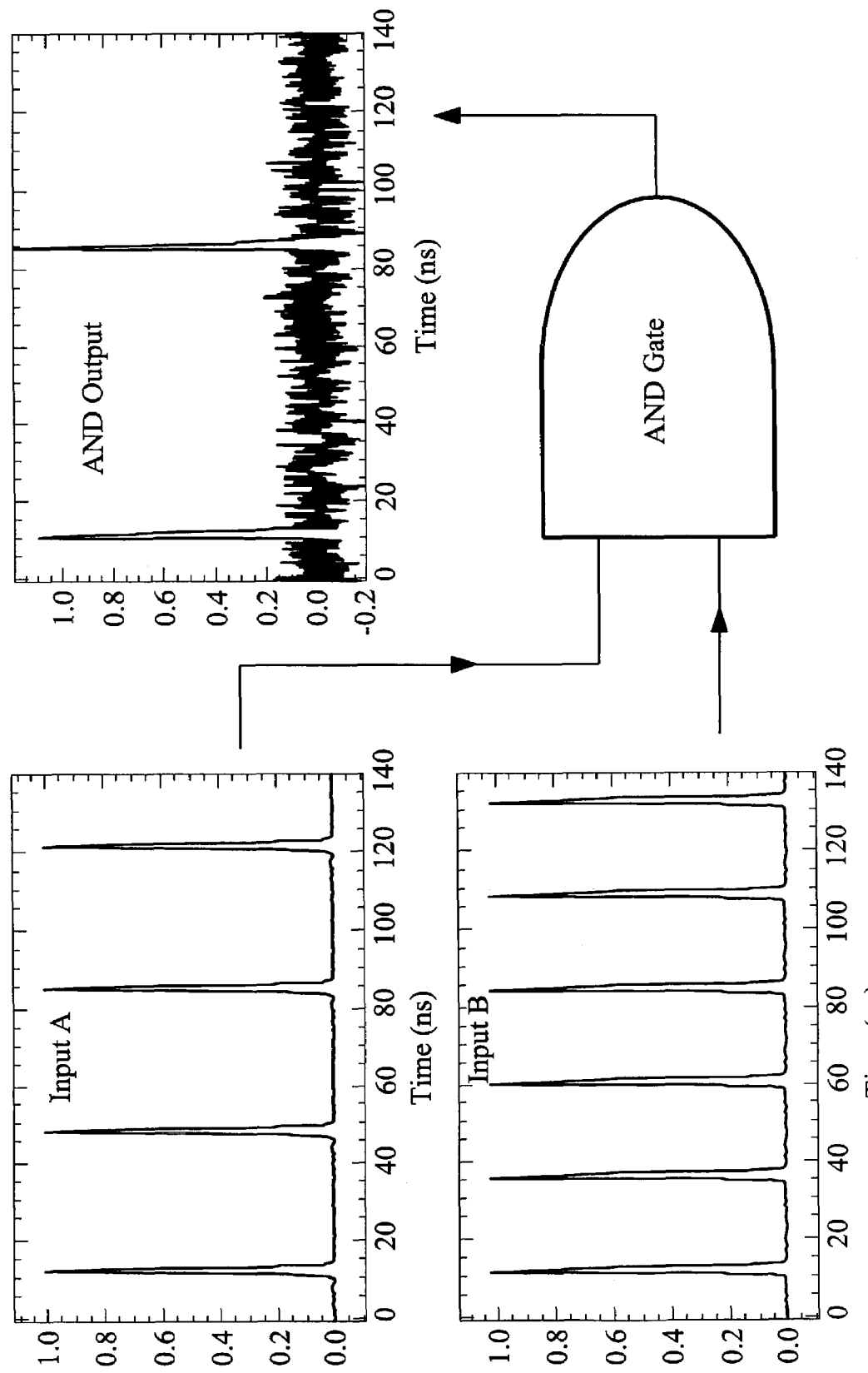
FIG. 30 illustrates demonstration of ultrafast all-optical AND logic gate (also wavelength converter) using an engineered nonlinear nanocomposite material of the invention.

FIG. 30 demonstrates the use of the materials and devices of the present invention for application as an ultrafast all-optical 'AND' logic-gate (also wavelength converter).

What is claimed is:

1. An engineered nonlinear nanocomposite material comprising:
   a matrix material; and
   a semiconductor quantum dot comprising a shell, the nanocomposite material having a nonlinear index of refraction that is greater than $10^{-9}$ cm$^2$/W.

2. The nanocomposite material of claim 1, wherein the semiconductor quantum dot is a silicon quantum dot.

3. The nanocomposite material of claim 1, wherein the semiconductor quantum dot is a germanium quantum dot.

4. The nanocomposite material of claim 1, wherein the shell is $SiO_x$ where x is selected between the range of 0 to 2.

5. The nanocomposite material of claim 1, wherein the shell is $GeO_x$ where x is selected between the range of 0 to 2.

6. The nanocomposite material of claim 1, wherein the semiconductor quantum dot further comprises a substantially defect free silicon crystal core with a maximum dimension between 1 and 10 nm, and the shell is a substantially noncrystalline silicon-oxide shell surrounding the silicon crystal core, with a maximum dimensional width between 0.1 nm and 5 nm, such that the average molecular formula of the silicon-oxide shell is characterized by $SiO_r$, with r between 0 and 2.

7. The nanocomposite material of claim 6, wherein the semiconductor quantum dot further comprises a set of comprising one or more different organic molecules R(R) bound to the outer surface of the silicon-oxide shell such that the average surface density of R ranges from 0 to 4 molecules per $nm^2$ across the outer surface of the silicon-oxide shell.

8. The nanocomposite material of claim 1, wherein the semiconductor quantum dot further comprises a substantially defect free germanium crystal core with a maximum dimension between 1 and 10 nm, and the shell is a substantially noncrystalline germanium-oxide shell surrounding the germanium crystal core, with a maximum dimensional width between 0.1 nm and 5 nm, such that the average molecular formula of the germanium-oxide shell is characterized by $GeO_r$, with r between 0 and 2.

9. The nanocomposite material of claim 8, wherein the semiconductor quantum dot further comprises a set of organic molecules R bound to the outer surface of the germanium-oxide shell, and imparts nonlinearity.

* * * * *